US007487117B1

(12) United States Patent
Tamura et al.

(10) Patent No.: US 7,487,117 B1
(45) Date of Patent: Feb. 3, 2009

(54) SALES SUPPORT SYSTEM

(75) Inventors: Toshio Tamura, Kanagawa (JP); Hitoshi Asaba, Kanagawa (JP); Yoshinori Onobori, Kanagawa (JP); Masahiro Nishioka, Kanagawa (JP); Yukio Fukui, Kanagawa (JP); Atsushi Nagai, Kanagawa (JP); Kiyotoshi Honda, Kanagawa (JP)

(73) Assignee: Amada Company, Limted, Kanagawa (JP)

( * ) Notice: Subject to any disclaimer, the term of this patent is extended or adjusted under 35 U.S.C. 154(b) by 0 days.

(21) Appl. No.: 09/807,965

(22) PCT Filed: Oct. 27, 1999

(86) PCT No.: PCT/JP99/05946

§ 371 (c)(1),
(2), (4) Date: Aug. 31, 2001

(87) PCT Pub. No.: WO00/25243

PCT Pub. Date: May 4, 2000

(30) Foreign Application Priority Data

Oct. 27, 1998 (JP) ................................ 10-306007
Nov. 11, 1998 (JP) ................................ 10-320971

(51) Int. Cl.
*G06F 17/30* (2006.01)

(52) U.S. Cl. ............................. 705/27; 705/26; 705/28

(58) Field of Classification Search .................. 705/22, 705/28, 29, 26, 27
See application file for complete search history.

(56) References Cited

U.S. PATENT DOCUMENTS 4,931,929 A * 6/1990 Sherman ..................... 705/500
5,117,354 A * 5/1992 Long et al. ..................... 705/27
5,168,445 A * 12/1992 Kawashima et al. .......... 705/10
5,197,001 A * 3/1993 Mukherjee ................... 705/29
5,210,686 A * 5/1993 Jernigan ...................... 705/29
5,237,495 A * 8/1993 Morii ............................ 705/8

(Continued)

FOREIGN PATENT DOCUMENTS

EP 0466089 1/1992

(Continued)

OTHER PUBLICATIONS

White, Ron, How Computers Work, 4th Ed., Que Corporation, Sep. 1998.*

(Continued)

*Primary Examiner*—Michael Cuff
(74) *Attorney, Agent, or Firm*—Greenblum & Bernstein, P.L.C.

(57) ABSTRACT

The object of this invention is to provide a sales support system of sales subjects by which the date of delivery (delivery date) of sales subjects including commodities, products or service may be shortened.

In order to achieve the object, the sales support system of this invention has a terminal system 51 which is provided with input means to input information related to the sales subject received from the customer and a display means which may display information related to the sales subject to the customer and an information management section 53 which is connected and may communicate with the terminal system and includes information related to the sales product and purchase order for the sales product and receives the purchase order of the sales subject from the terminal system and determines the facility which may provide the ordered sales subject.

36 Claims, 34 Drawing Sheets

U.S. PATENT DOCUMENTS

| | | | | |
|---|---|---|---|---|
| 5,260,883 | A * | 11/1993 | Wilson | 703/1 |
| 5,295,067 | A * | 3/1994 | Cho et al. | 705/29 |
| 5,307,261 | A * | 4/1994 | Maki et al. | 705/29 |
| 5,357,439 | A * | 10/1994 | Matsuzaki et al. | 700/96 |
| 5,434,394 | A * | 7/1995 | Roach et al. | 235/375 |
| 5,515,269 | A * | 5/1996 | Willis et al. | 705/29 |
| 5,603,419 | A * | 2/1997 | Peterson | 211/195 |
| 5,630,070 | A * | 5/1997 | Dietrich et al. | 705/8 |
| 5,664,115 | A * | 9/1997 | Fraser | 705/37 |
| 5,796,614 | A * | 8/1998 | Yamada | 700/106 |
| 5,802,493 | A * | 9/1998 | Sheflott et al. | 705/1 |
| 5,884,300 | A * | 3/1999 | Brockman | 707/2 |
| 5,940,807 | A * | 8/1999 | Purcell | 705/26 |
| 6,023,683 | A * | 2/2000 | Johnson et al. | 705/26 |
| 6,324,522 | B2 * | 11/2001 | Peterson et al. | 705/28 |

FOREIGN PATENT DOCUMENTS

| | | |
|---|---|---|
| JP | 1-92125 | 4/1989 |
| JP | 2-240767 | 9/1990 |
| JP | 5-146945 | 6/1993 |
| JP | 5-298339 | 11/1993 |
| JP | 6-4553 | 1/1994 |
| JP | 6-23443 | 2/1994 |
| JP | 6-139252 | 5/1994 |
| JP | 8-249380 | 9/1996 |
| JP | 9-231170 | 9/1997 |
| JP | 10-27198 | 1/1998 |
| JP | 10124584 | 5/1998 |
| JP | 10316211 | 12/1998 |

OTHER PUBLICATIONS

Greene, James H, Editor-in-Chief, Production and Inventory Control Handbook, 3rd Ed., McGraw-Hill Companies, Inc., 1997.*
Muller, Nathan J., Desktop Encyclopedia of the Internet, Artech House, Inc., 1998.*
Dobler, Donald W. and Burt, David N., Purchasing and Supply Management, Text & Cases, 6th Ed., The McGraw-Hill Companies, Inc., 1996.*
Danish, Sherif, and Gannon, Patrick, Building Database-Driven Web Catalogs, McGraw-Hill Companies, Inc., 1998.*
Borland's Paradox for Windows User's Guide, Borland International, Inc, 1994.*
New Website Links Car Buyers Directly to Invoice Pricing, Eliminating Negotiation and Middlemen, Business Wire, Apr. 6, 1998.*
English Language Abstract of JP 5-146945.
English Language Abstract of JP 6-4553.
English Language Abstract of JP 5-298339.
English Language Abstract of JP 6-23443.
English Language Abstract of JP 2-240767.
English Language Abstract of JP 1-92125.
English Language Abstract of JP 10-316211.
English Language Abstract of JP 8-249380.
English Language Abstract of JP 10-27198.
English Language Abstract of JP10-124584.
English Language Abstract of JP 6-139252.
English Language Abstract of JP 9-231170.

* cited by examiner

FIG.11

(a) MANUFACTURE FACTORY DECISION INDEX $\beta i$

| MANUFACTURE FACTORY NAME | PRESENT LOAD INDEX | MATERIAL INDEX | PROCESS CAPABILITY | COST INDEX . . . . |
|---|---|---|---|---|

(b) PROCESS ADVANCEMENT MASTER FILE LAYOUT

| FACTORY NAME | PROCESSED PRODUCT NAME | (MACHINE A) PROCESS | START, COMPLETION TIME | (MACHINE B) PROCESS, START, COMPLETION TIME . . . . |
|---|---|---|---|---|

(c) SHIPPING AGENT MASTER FILE LAYOUT

| SHIPPING AGENT | LOCATION | AVERAGE SHIPPING NUMBER OF DAYS | . . . . |
|---|---|---|---|

(d)

| DATE | MANUFACTURE FACILITY DECISION INDICES $\beta i$ | FACTORY NAME | ADDRESS | PHONE NUMBER |
|---|---|---|---|---|
| | $\beta a$ | A | | |
| | $\beta c$ | B | | |
| | $\beta d$ | C | | |
| | $\beta h$ | D | | |

FIG.14

ORDER DATA (FOR STANDARD PRODUCTS)

Ci

| | |
|---|---|
| ORDER INFORMATION | |
| INFORMATION CLASSIFICATION | INSTALLMENT NO= '1' WHEN "01", OTHERS "2" |
| RECORD CLASSIFICATION | VALUE= '1' |
| COMPANY NAME CODE | CMPNY CD |
| ORDER SECTION CLASSIFICATION | VALUE= '2' |
| ORDER MADE PLACE CODE | PRCHS TO CD |
| ORDER NO | ORDR NO |
| PAYMENT BY INSTALLMENTS NO | DVD DLVRY NO |
| INSTRUCTED DATE OF DELIVERY | CMD DLVRY DT |
| ORDER PLACED CODE | PRCHR CD |
| SK | SK |
| CATALOG NO | CTLG NO |
| SK NAME | TRAB SK.NAME_KANA |
| AMOUNT ORDERED | INSTALLMENT NO= "01" PO_QTY |
| AMOUNT DELIVERED | INSTALLMENT NO= "01" PO_QTY-PO_QTY |
| AMOUNT NOT DELIVERED | PO_QTY |
| UNIT PRICE | PO_UNNIT_PRC |
| AMOUNT | PO_AMNT |
| NAME OF PRODUCT | TRAB_TOOL_PRDCT.JPN_PRDCT_NAME_KANA |
| SHAPE CODE | PTRN CD |
| A SIZE | |
| B SIZE | |
| PRIVATE KEY | |
| CORENER R | |
| SPACE | SPACE |
| LIAISON ITEMS | CNCT_MNTN |
| CONSUMPTION TAX | CNSMP_TAX |
| ORDER PLACED DATE | PO_DT |

FIG.15

ORDER DATA (FIXED TYPE)

| | | |
|---|---|---|
| | ORDER INFORMATION | |
| | INFORMATION CLASSIFICATION | INSTALLMENT NO= '1' WHEN "01", OTHERS "2" |
| | RECORD CLASSIFICATION | VALUE= '1' |
| | COMPANY NAME CODE | CMPNY CD |
| | ORDER SECTION CLASSIFICATION | VALUE= '2' |
| | ORDER MADE PLACE CODE | PRCHS TO CD |
| | ORDER NO | ORDR NO |
| | PAYMENT BY INSTALLMENTS NO | DVD DLVRY NO |
| | INSTRUCTED DATE OF DELIVERY | CMD DLVRY DT |
| | ORDER PLACED CODE | PRCHR CD |
| | SK | SK |
| Ci | CATALOG NO | CTLG NO |
| | SK NAME | TRAB SK.NAME_KANA |
| | AMOUNT ORDERED | INSTALLMENT NO= "01" PO_QTY |
| | AMOUNT DELIVERED | INSTALLMENT NO= "01" PO_QTY-PO_QTY |
| | AMOUNT NOT DELIVERED | PO_QTY |
| | UNIT PRICE | PO_UNNIT_PRC |
| | AMOUNT | PO_AMNT |
| | NAME OF PRODUCT | TRAB_TOOL_PRDCT.JPN_PRDCT_NAME_KANA |
| | SHAPE CODE | PTRN CD |
| Ki | A SIZE | A_SIZE*100 |
| Ki | B SIZE | B_SIZE*100 |
| Ki | PRIVATE KEY | FIX_KEY*100 |
| Ki | CORENER R | CRNR_R*100 |
| Ki | SPACE | SPACE |
| | LIAISON ITEMS | CNCT_MNTN |
| | CONSUMPTION TAX | CNSMP_TAX |
| | ORDER PLACED DATE | PO_DT |

FIG. 16

ORDER DATA (NON-FIXED TYPE)

| | | |
|---|---|---|
| | ORDER INFORMATION | |
| | INFORMATION CLASSIFICATION | INSTALLMENT NO= '1' WHEN "01", OTHERS "2" |
| | RECORD CLASSIFICATION | VALUE= '1' |
| | COMPANY NAME CODE | CMPNY CD |
| | ORDER SECTION CLASSIFICATION | VALUE= '2' |
| | ORDER MADE PLACE CODE | PRCHS TO CD |
| | ORDER NO | ORDR NO |
| | PAYMENT BY INSTALLMENTS NO | DVD DLVRY NO |
| | INSTRUCTED DATE OF DELIVERY | CMD DLVRY DT |
| | ORDER PLACED CODE | PRCHR CD |
| | SK | SK |
| | CATALOG NO | |
| | SK NAME | TRAB SK.NAME_KANA |
| | AMOUNT ORDERED | INSTALLMENT NO= "01" PO_QTY |
| | AMOUNT DELIVERED | INSTALLMENT NO= "01" PO_QTY-PO_QTY |
| | AMOUNT NOT DELIVERED | PO_QTY |
| | UNIT PRICE | PO_UNNIT_PRC |
| | AMOUNT | PO_AMNT |
| | NAME OF PRODUCT | TRAB_TOOL_PRDCT.JPN_PRDCT_NAME_KANA |
| | SHAPE CODE | PTRN CD |
| Ki | A SIZE | |
| Ki | B SIZE | |
| Ki | PRIVATE KEY | |
| Ki | CORENER R | |
| Ki | SPACE | SPACE |
| | LIAISON ITEMS | CNCT_MNTN |
| | CONSUMPTION TAX | CNSMP_TAX |
| | ORDER PLACED DATE | PO_DT |
| mi | | NO1010 |

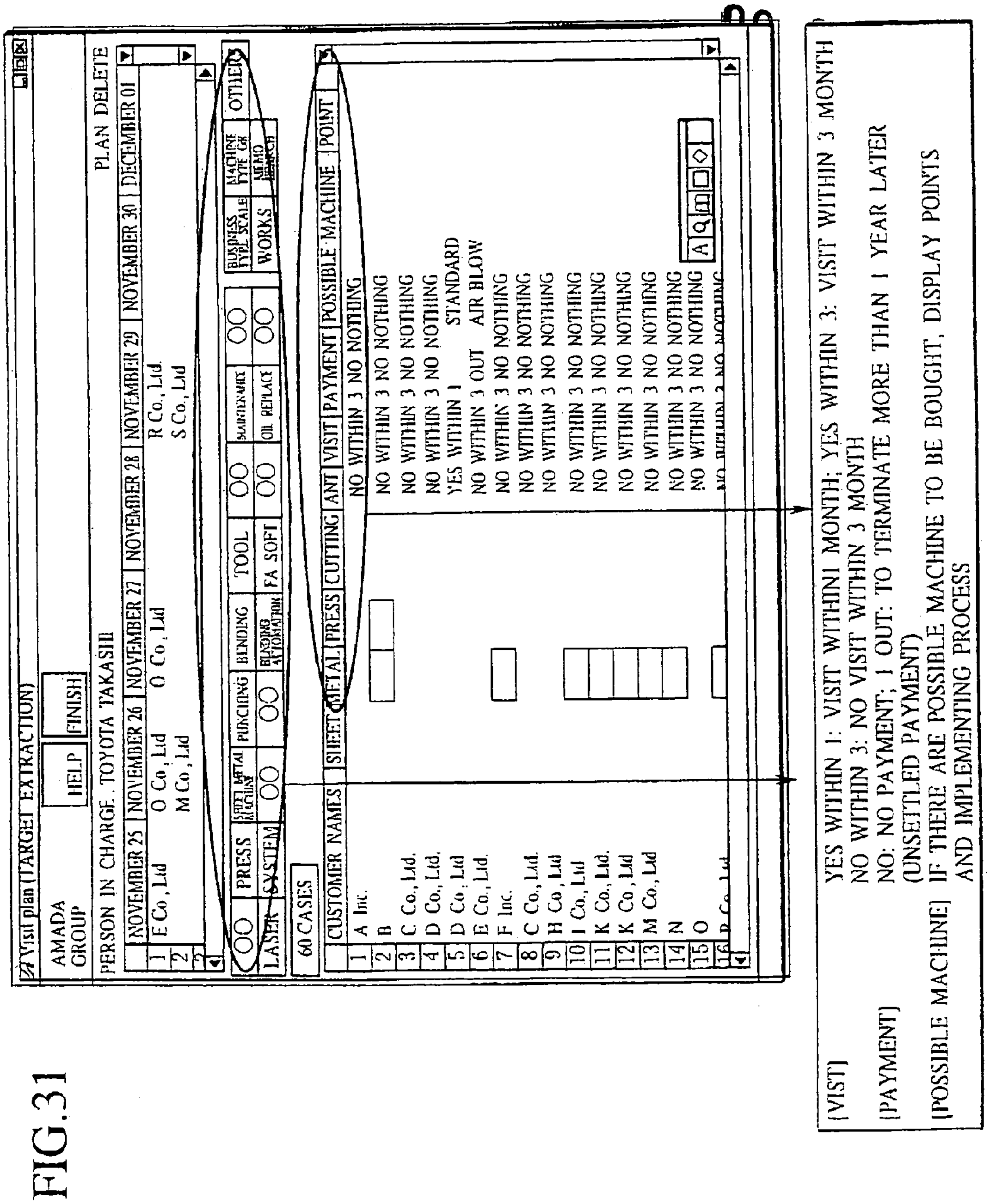

FIG.31

| | PRESS | SHEET METAL MACHINE | PUNCHING | BINDING | TOOL | | | BUSINESS TYPE SCALE | MACHINE TYPE OR |
|---|---|---|---|---|---|---|---|---|---|
| | ○○ | | | | | | | WORKS | MEMO |
| LASER | SYSTEM | ○○ | | BENDING AUTOMATION | FA SOFT | | OIL REPLACE | ○○ | |

60 CASES

| | CUSTOMER NAMES | SHEET METAL | PRESS | CUTTING | ANT | VISIT | PAYMENT | POSSIBLE MACHINE | POINT |
|---|---|---|---|---|---|---|---|---|---|
| 1 | A Inc. | | | | | NO WITHIN 3 | NO NOTHING | | |
| 2 | B | | | | | NO WITHIN 3 | NO NOTHING | | |
| 3 | C Co., Ltd. | | | | | NO WITHIN 3 | NO NOTHING | | |
| 4 | D Co., Ltd. | | | | | NO WITHIN 3 | NO NOTHING | | |
| 5 | D Co., Ltd. | | | | | YES WITHIN 1 | STANDARD | | |
| 6 | E Co., Ltd. | | | | | NO WITHIN 3 | OUT AIR BLOW | | |
| 7 | F Inc. | | | | | NO WITHIN 3 | NO NOTHING | | |
| 8 | C Co., Ltd. | | | | | NO WITHIN 3 | NO NOTHING | | |
| 9 | H Co., Ltd. | | | | | NO WITHIN 3 | NO NOTHING | | |
| 10 | I Co., Ltd. | | | | | NO WITHIN 3 | NO NOTHING | | |
| 11 | K Co., Ltd. | | | | | NO WITHIN 3 | NO NOTHING | | |
| 12 | K Co., Ltd. | | | | | NO WITHIN 3 | NO NOTHING | | |
| 13 | M Co., Ltd. | | | | | NO WITHIN 3 | NO NOTHING | | |
| 14 | N | | | | | NO WITHIN 3 | NO NOTHING | | |
| 15 | O | | | | | NO WITHIN 3 | NO NOTHING | | |

[VISIT] YES WITHIN 1: VISIT WITHIN1 MONTH; YES WITHIN 3: VISIT WITHIN 3 MONTH
NO WITHIN 3: NO VISIT WITHIN 3 MONTH
[PAYMENT] NO: NO PAYMENT; 1 OUT: TO TERMINATE MORE THAN 1 YEAR LATER
(UNSETTLED PAYMENT)
[POSSIBLE MACHINE] IF THERE ARE POSSIBLE MACHINE TO BE BOUGHT, DISPLAY POINTS
AND IMPLEMENTING PROCESS

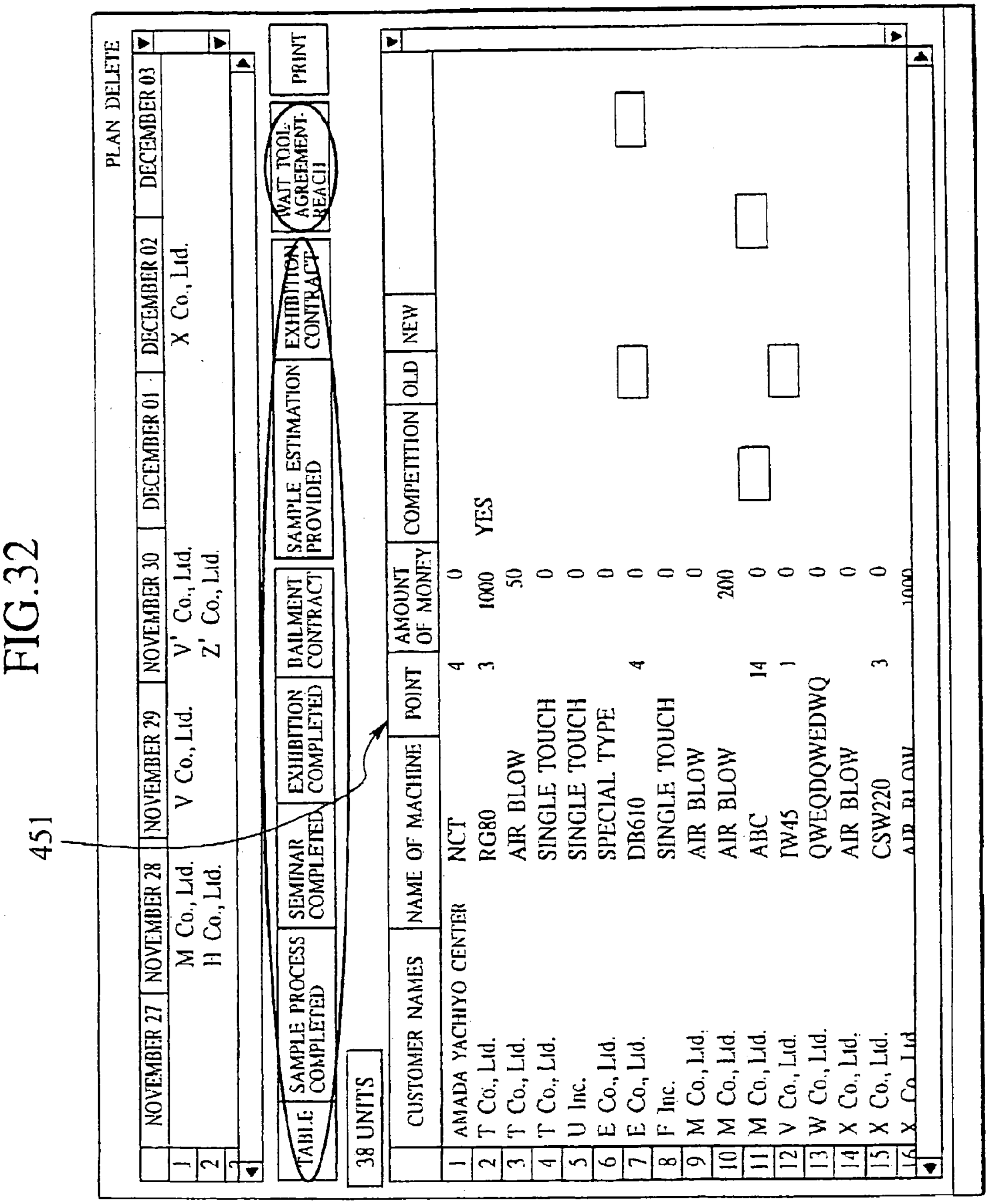

FIG.32

| | NOVEMBER 27 | NOVEMBER 28 | NOVEMBER 29 | NOVEMBER 30 | DECEMBER 01 | DECEMBER 02 | DECEMBER 03 | PLAN DELETE |
|---|---|---|---|---|---|---|---|---|
| 1 | | M Co., Ltd. | V Co., Ltd. | V' Co., Ltd. | | | X Co., Ltd. | |
| 2 | | H Co., Ltd. | | Z' Co., Ltd. | | | | |

| TABLE: | SAMPLE PROCESS COMPLETED | SEMINAR COMPLETED | EXHIBITION COMPLETED | BAILMENT CONTRACT | SAMPLE ESTIMATION PROVIDED | EXHIBITION CONTRACT | WAIT TOOL- AGREEMENT- REACH |
|---|---|---|---|---|---|---|---|

PRINT

38 UNITS

| | CUSTOMER NAMES | NAME OF MACHINE | POINT | AMOUNT OF MONEY | COMPETITION | OLD | NEW |
|---|---|---|---|---|---|---|---|
| | AMADA YACHIYO CENTER | NCT | 4 | 0 | | | |
| 1 | T Co., Ltd. | RG80 | 3 | 1000 | YES | | |
| 2 | T Co., Ltd. | AIR BLOW | | 50 | | | |
| 3 | T Co., Ltd. | SINGLE TOUCH | | 0 | | | |
| 4 | U Inc. | SINGLE TOUCH | | 0 | | | |
| 5 | E Co., Ltd. | SPECIAL TYPE | | 0 | | | |
| 6 | E Co., Ltd. | DB610 | 4 | 0 | | | |
| 7 | F Inc. | SINGLE TOUCH | | 0 | | | |
| 8 | M Co., Ltd. | AIR BLOW | | 0 | | | |
| 9 | M Co., Ltd. | AIR BLOW | | 200 | | | |
| 10 | M Co., Ltd. | ABC | 14 | 0 | | | |
| 11 | V Co., Ltd. | TW45 | 1 | 0 | | | |
| 12 | W Co., Ltd. | QWEQDQWEDWQ | | 0 | | | |
| 13 | X Co., Ltd. | AIR BLOW | | 0 | | | |
| 14 | X Co., Ltd. | CSW220 | 3 | 0 | | | |
| 15 | X Co., Ltd. | AIR BLOW | | 1000 | | | |

451

SALES SUPPORT SYSTEM

FIELD OF TECHNOLOGY

This invention is related to a support system for sales of commodities, products, services and the like of machine tools for metal processing machinery.

BACKGROUND TECHNOLOGY

In general, in machines for metal processing, for instance dies, punch bodies, guides and the like and other parts to begin with, various kinds of parts tools are replaced according to the object of the process and also must be replaced by new ones because of wear.

Also the users of processing machines will be in need of new parts and tools according to the products to be processed. In these cases, the appointed time of delivery is usually prescribed. Therefore the users will demand that the new parts and tools be procured in a short time.

Formerly therefore, the salesperson in charge of the makers which design and produce these kind of commodities, frequently visited the users to consult whether it is necessary to supplement products, whether new products are necessary and after the order is made based on these consultations, design, production procedures were taken according to the order and shipped and delivered.

This heretofore method however had the following variety of problems.

That is, when the salesperson in charge receives a request for a quotation, he had to return and request the personnel in charge for preparing a quotation and then it was necessary for him to visit the user again to present the quotation or communicate by phone and the like. Therefore considerable time was consumed for the user to obtain the results of the quotation requested.

Furthermore, the salesperson receiving the order will have to take the order back to the company and have the personnel in charge of receiving orders go through the formalities to formally confirm the order and this will delay the order to be placed to the design and manufacture division.

The order to the manufacture division will also be delayed as non-standard products will have to be designated. Also, as the manufacture division does not have the function to choose the most suitable factory of the maker or outside supplier and instruct production, the capability possessed by the maker cannot be made most of and excessive time will be spent for the product to be made.

Furthermore, excessive time will be spent for delivery to the user as at the shipment division, as overall consideration of the weight of the product, the area, shipment time and the like are not taken in determining a transportation company.

OUTLINE OF THE INVENTION

The object of this invention is to provide a sales support system that reduces the delivery time (date of delivery) of the sales objects including commodities, products or services.

Hereon, the aforementioned user will be called customers.

To achieve the objective, the sales support system of the invention comprising, a terminal system 51 which is provided with means to input information on sales objects from the customers and means to display information of the sales objects to the customers, the information on sales objects from the customers including purchase order of the sales object; and a information management system 53 connected to said terminal system to communicate therewith, the information management system receiving purchase order of the sales object from the terminal system and determining a facility that can provide the ordered sales object.

Here sales objects include sales of material and immaterial products and services.

Also in the terminal system 51, when the sales object is a product (that is when the sales object is a physical product or commodity), it is desirable to have a memory device to store product data on standard and patterned special type products.

Here standard products are products of the product category that are normally produced in large numbers. For standard articles, the form of the structure and size are standardized. In more detail, one product has one form (shape) and the dimensions of the form have fixed values.

The patterned special type products are not classified as standard among the products belonging to the product category but products produced in relatively large numbers classified according to shape. The products belonging to patterned special type products have specific forms for respective specially patterned species. However although the species are fixed, the size of these patterned special type products are not fixed. Therefore for the patterned special type products, the size is a parameter and form size is determined by specifying this parameter. In more detail, in a suitable mode, the patterned special type products may, for example, be presented as patterned special type products menu and by choosing one of the menus, the final form may be determined by specifying the size parameter of the form pattern.

That is, patterned special type products are products that are specified by the size parameter of the form pattern.

The product data of the standard products and the patterned special type products are as follows. The data for the standard products include, for instance, product numbers to specify the standard product. The data for the patterned standard type products include form numbers to specify the form of the patterned special type products. This data also includes parameters that define the size of the patterned special type product. Also this product data may include defining method numbers when there is more than one defining method of the patterned special type product size.

Also in the terminal system, it is preferable to provide means to account for primary quotations for the standard products and patterned special type products.

The quotation should preferably include the price and date of delivery and also preferably include the tolerance for processing the product.

Tolerance for processing is to judge when the product is a tool to process work pieces and when the product is a patterned special type product, whether the product tool has the strength to perform work on the desired process.

It is preferable for the information management system 53 to possess a second method for preparing quotations for non-patterned special type products that do not belong to the standard products and patterned special type products. Non-patterned special type products are goods or products which belong to one of the categories but are not standard products or do not have the shape defined for patterned special type products. Therefore the non-patterned special type product is a new product that does not exist in the past.

In the second means for quotation, it is preferable to have means to store prices of similar products. Here the similar products are existing products that have shapes similar to the non-patterned special type products.

A suitable embodiment of this invention also has the following benefits. It may provide a sales support system that may lower sales cost of the sales object (including products and services).

It may provide a sales support system that may solve complaints from customers.

The other object of the invention is to provide a visit support system that supports visits of business managers to customers.

This visit support system comprises: a memory means 75 which stores product possession information of products that each customer possess, and visit records to each customer; and means to calculate weight coefficients 77 of each customer based on said product possession information and visit records; and a customer visit selection device 79 to select customers to be visited, based on the weight coefficients.

The following benefits may be gained by a favorable embodiment of this invention.

Visits to many or preferably all customers who are in potential need of sales objects including products or services may be made.

In case there are a variety of types of business offices (business units) for visits to customers, customers to be visited may be selected according the business unit type.

Another aspect of the invention is provision of other sales support systems. This sales support system is structured so that a server is furnished for the entities, to which an information terminal which has a client function carried by the personnel in charge of visiting customers may communicte, and by use of this information terminal, he may realize his business of introducing products, quotations, receipt of orders and consultation at the place of visit.

In this way, by performing the work of introducing products, quotations, receiving orders and consultations at the place of visit by use of the information terminal connected to the server of the company, up-to-date contents of products may be introduced and also by communicating with the information terminal and the server, requests for quotations and answers to the requests may be obtained and orders may be received directly at the place of visit.

Also this invention is organized so that by placing a server at the management division of product design and manufacture and sales, and by placing a client at the dealer who may communicate with the server, various work requests and answers between the management division and dealers may be realized immediately.

By use of this communication function between the server of the management division and the client at the site operation division, various kinds of business requests and replies between the management department and work-site operations may be realized immediately allowing the businessmen to make full use of the business capacity they possess and may provide goods and services requested by the customer at the shortest time possible.

Moreover this invention is structured so that besides furnishing a server for the design and production and sales people, a client who can communicate with the server is placed at the customer so that by use of the communication function between the server and the client, various business requests and replies between the businessmen and customer may be realized immediately.

By utilizing the communication function between the server of the business people and clients of the customer in this way, various business requests and replies to the requests between the business people and customers may be realized immediately allowing full use of business capacity the business people possess and allowing provision of merchandise service requested by customers in the shortest time possible.

The other aspect of this invention is a quotation and design system which may be connected to a portable terminal for providing quotations for standardized (patterned) standard custom made articles and non-standardized (non-patterned) custom made articles, which are provided with means to receive requests for quotations for the standardized fixed form (patterned) custom made articles of the non-fixed form (non-patterned) custom made articles from the portable terminal; and means to perform quotations for the date of delivery or price automatically based on the information for request for quotations of fixed form custom made article received; and an analogous article search means to search and extract information on analogous articles analogous to the non-fixed form custom made articles from the design data base, based on the received information for request of quotation for non-fixed form custom made articles; and a quotation input means to input a date of delivery or price of the non-standardized form custom made articles estimated based on information on the design and manufacturing of the analogous article; and a quotation reply means which transmits as a reply to quotations to the portable terminal quotations inputted from the automatic quotation device and the quotation input device, a quotation and design system equipped with the functions.

By the structure, when customers visit the business base or when the salesperson visits the customers, requests for quotations may be inputted directly on the spot to the quotation and design system connected to a fixed terminal or a portable terminal without help from others which will expedite requests for quotations, prevent data input misses and will save time for data input.

If the article requested for quotation is a fixed form (patterned) custom made article, the quotation and design system will, for instance by use of parametric design, automatically estimate the price and date of delivery of the article and return the results immediately to the fixed terminal or the portable terminal carried by the salesperson.

In this way, quotations may be presented to the customers promptly and accurately promoting receipt of orders and efficiency of business operations.

Another aspect of this invention is an automatic decision method to determine automatically the most adequate factory (facility) where, based on the customer's demand for the date of delivery, the product may be made at the lowest cost and time within the requested date of delivery.

This method comprises a process to determine the manufacturing factor decision index of each factory based on the status of the capacity, number, stored material information of each tool the factory presently possess and the factory load percentage based on the operation rate per designated time of the machine tools; and a process to detect the factory which is located at a distance at a distance where the cost for transportation is the lowest by comparing the location of the customer and the locations of each factory; and a process to read the manufacture order data and to judge from the manufacturing factory decision index whether it is possible for the factory detected to manufacture the product indicated in the manufacture order data; and a process to designate the factory as the most suitable factory and transmit the manufacture order to the most suitable factory, if it is judged that the factory detected may manufacture the manufacture order data.

Another aspect of the invention is a visiting support system where the server and the client are connected by a network in which the client requests or sends information of the place of visit or information on visitors such as who, when and on what kind of business the visit was made.

In this visiting support system the client, there are arranged operating buttons for the operator to transmit to or collect various data such as state of activities of the operator for the client in accordance with the business hours of the operator of the client; and by pressing these buttons, the input screen corresponding to the operating button is displayed; and the information (information of the place visited or information of the visitor) inputted on the input screen is transmitted to the server or accumulated information corresponding to the request is collected from the server; and the collected data is displayed on the screen in a designated form. On the other hand, the server deciphers the type of information transmitted from the client, and if the deciphered result indicates a variety of data, they are stored according to types, and also if the decipher indicates a collection of the stored information, the stored information will be transmitted to the client according to the type of collection.

BRIEF EXPLANATION THE FIGURES

FIG. 11 is an illustration explaining the layout of files in the first embodiment.

FIG. 14 is an illustration of production order data of standard products.

FIG. 15 is an illustration of production order data for fixed form standard products.

FIG. 16 is an illustration of production order data for non-fixed form custom made products.

FIG. 30 is an illustration explaining the input screen for expected kinds of products, contents of the visit, amount of money and the like.

FIG. 31 is an illustration explaining the target extraction screen.

FIG. 32 is an illustration explaining the list of prospects.

EMBODIMENTS OF THE INVENTION

In the following, modes of implementation of the sales support system of this invention will be explained with reference to the drawings.

The embodiment of this sales support system is a sales support system for sales of goods or tools as products (in particular punches and dies for turret punch press or press break punches and dies).

Figure 1:
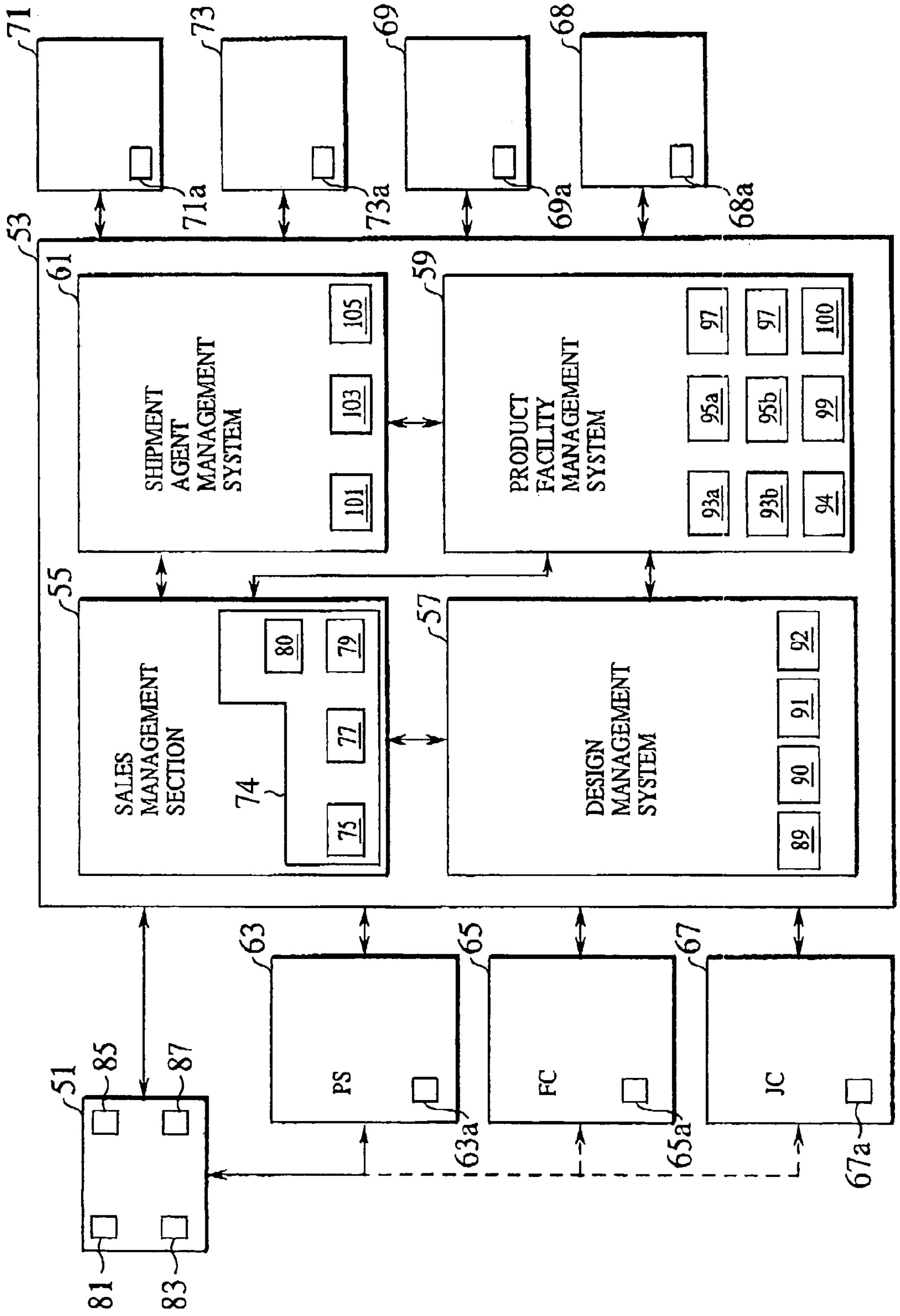
FIG. 1 is a block diagram of the embodiment of the sales support system of the invention.

FIG. 1 is a block diagram showing the outline of the embodiment.

As shown in FIG. 1, this sales support system has a terminal system 51, which is provided with an input means 81 into which information related to products, provided from customers may be inputted and a display means 83 that displays information related to the product to the customer. Here information related to products from the customers includes a purchase order for the product.

This sales system also includes an information management system 53 that is connected to and may mutually communicate with the terminal system 51 and product facilities 68, 69, 71, and 73 that may provide various products including the ordered product. On receipt of the purchase order by the information management system 53 from the terminal 51, the product facilities 68, 69, 71, 73 which may provide the ordered product is selected and also orders are transmitted to the product facilities 68, 69, 71, 73 to provide the product.

In more detail, the information management system 53 includes the sales management system 55 that manages various information and data related to sales and has a sales support system 54 that manages various information and data related to sales and also supports sales by the salesperson, and a design management system which manages design data (information) of the products and supports design, and a production management system 59 which sends orders and, based on product (merchandise) data from the terminal system 51 or the design management system 57, selects production facilities such as factories and sends to the production facility (manufacture factory) instructions to provide the product, and a transport management section 61 which selects a shipping (transportation) agency to transport the product to the customer from the factory of the production facility.

This sales support system also has a product housing facility terminal system 68*a* provided at product housing facilities 68 from which ordered products are shipped, a production factory terminal system 69*a* provided at the production factory 69 which is selected by the production facility management system 59 and produces ordered products, material supply facility terminal system 71*a* provided at the material supply facility 71 where materials for producing the product are stored, and a shipping agent terminal 73*a* provided at the shipping agency 73 which transports the products.

With this organization, product numbers (for standard products) or product data from the terminal system 51 or the design management system 57 will be transmitted to the terminals 68*a*, 69*a* of the product housing system 68, 69 that is selected as a facility to supply or produce the ordered products. Also information or data that specify the type and quantity of materials necessary to produce the product will be sent to the terminal system 71*a* of the material supply facility 71.

Also, data on the weight of the products or address of the customer or the date of delivery and the like will be sent to the terminal system 73*a* of the shipping agent 73 from the information management system 53.

Details are as follows.

The terminal system 51 has an input device 81 for entering information from customer on the products, a display device 83 which displays information related to products, a memory device 85 which stores product data of standard products and pattern specified products and a first quotation means 87 for computing quotations for the standard products and pattern specified products.

Furthermore the quotation includes the product price, time of delivery and tolerance of processing.

With the arrangement stated above, the businessman can search the product number of the product indicated by the customer if it is a standard product. Also if the ordered product is a patterned special order product, the data may be inputted readily by specifying the form pattern and setting the parameters to determine the form (including size) of the ordered die.

Thereupon, a quotation including price, date of delivery and tolerance of processing may be presented to the customer by the quotation computation means 87 through the display means 83.

Also, if the customer consulting the quotation places a purchase order, the businessperson may input the order to the terminal system 51 via the input means 81 to the terminal system 51. This purchase order is forwarded immediately to the information management system 53 by appropriate communication means. Thereby the receipt of order documents that confirm receipt of the purchase order for the product will be made out by the system 53 and presented to the customer. These purchase order papers may be outputted from the printer (not shown in the figure) or may be issued from the information management system 53. When the order papers are issued from the information management system 53, the order papers will be relayed to the customer by, for instance, facsimile.

Furthermore, the terminal system 51 may be a computer provided at the customer's facility and the like. In this case, the customer may personally operate the terminal system 51 and carry out the prescribed quotation and order of the product by communicating with the information management system 53.

The sales management system 55 receives product data from the terminal system 51. The product data includes product form (shape) data for the quotation. For special form products, this product form data includes data that designate the shape pattern described later and the values of parameters and shape data itself in the case of non-pattern special type products. The product data includes various order data when orders are received. This order data includes product numbers for standard products, data that designate shape patterns and values of parameters for patterned special type products and shape data themselves for non-patterned special type products. Furthermore in case specific ID numbers are given to the patterned special type products and non-patterned special type products, the ID numbers may be included in place of the data that specify shapes.

The design management system 57 manages design data at least for patterned special type products based on the order data from the terminal system 51 and the sales management system 55.

This design management system 57 has a second quotation computation means 89 that calculates quotation for prices and the like for non-patterned special type products, the products other than the standard products and patterned special type products.

The design management system 57 has a similar product data memory means 90 that stores prices of products similar in shape to the non-patterned special type products. Therefore the quotation means 89 may evaluate the price of said non-patterned special type products based on the prices of similar products stored in the memory means 90.

Furthermore, based on the structure drawing of the non-patterned special type product, the second computation method 89 may also compute the price of non-patterned special type products.

The design management system 57 has a design support system 91 that supports designing of the non-patterned special type products. This design support system 91 presents analogous products from the similar product data memory means 90 to the designer who designs the non-patterned special type product. Therefore the designer may design the non-patterned special type product with reference to data of the similar products.

Also the design management system 57 has a process tolerance evaluation means 92 which judges whether the design of the non-patterned special type product can perform the process (that is judgment as to whether the patterned special type product can perform the desired process on a work).

Also the quotations and design data for price or the date of delivery or the tolerance evaluation for work evaluated by the design management system 57 will be forwarded to the terminal system 51 by adequate transmission routes. Therefore the businessperson may also present for the non-patterned special type products, the results of quotation and design data promptly by the display means 83. In case the customer makes an order based on these quotations and the like, data on the purchase order will be forwarded by means of the input means 81 to the information management system 53 immediately.

In case it will take time for the design of the non-patterned special product at the management system 57, the design data will be forwarded to the customer by facsimile from the information management system 53.

Moreover, as will be described later, means to execute evaluation of quotations, means for automatic design and automatic check of drawings (including tolerance evaluation for work) for patterned special type products may be provided at the design management system 57.

The product facility management system 59 may search product facilities that may possess the product based on the order data from the sales management system 55 or design data (in case of patterned special type products and non-patterned special type products) from the design management system 57.

In more detail, the product facility management system 59 has a product facility data memory means 93*a* that stores the kind and quantity of products in stock at the product housing means 68 or factory 69. Also the product facility management system 59 has a product-facilities determining means 95*a* that determines the housing facility 68 or the production factory 69 which possess the ordered product by reference to the stored data of the product facility data memory system 93.

When the product facilities determining means 95*a* confirms that the ordered product is in stock at the product housing facility 68 or the production factory 69, it selects the housing facility 68 or the production factory 69 which may make the delivery to the customer in the shortest period or at the lowest cost and instructs shipment to the facility or the factory 68, 69.

The product facility management system 59 also has products in stock management means 96 to supervise the sort and quantities of stored products stored in the product housing facility 68 or the production factory 69 and issues instructions to supplement the quantity in stock.

If the ordered product is not in stock, the product facility management system 59 searches a production facility 69 which may produce the product based on the order data or the design data (for non-patterned special type products) from the terminal system 51 or the design management system 57.

In more detail, the product facility management system 59 has a said memory system 93*b* which stores kinds of products which may be manufactured and the time required for production and the like at the production factory 69. The product facility management system 59 also has the product facility determining means 95*b* that determines the production factory 69 where the ordered product is to be produced by reference to the data from the memory system 93*b*. In this case, the product facilities determining means 95 selects, for instance, the production factory that may produce the ordered product within the date of delivery requested by the customer.

Also the determining means 95 gives priority in selection to the production factory 69 which possess the materials to produce the ordered products. The materials include half-finished products or half-finished goods that may be processed into various products including the ordered product.

Also in case there are plural numbers of production factories that satisfy the aforementioned conditions, the determination means 95 gives priority in selection the production factory 69 which may produce the product at the lowest cost.

When the product facility 68 or the factory 69 which possess the ordered product or when the production factory where the ordered product may be produced is determined as stated above, the product facility management system 59 sends orders to the product facility 68 or the production factory 69 to ship, or produce and ship the product.

The product facility management system 59 also supervises the production process in the production factory and has an alarm signal generation system 97 to send an alarm when delay in the date of delivery is anticipated.

With the organization described above, this sales support system may shorten the time of delivery, lower the sales cost and also dispel claims from the customers.

The product facility management system 59 also has a time of delivery computation means 99 to compute the time of delivery of the product taking into account the production period of the production factory 69 when there are no ordered product in stock and must be produced at the production factory 69.

This time of delivery is sent to the terminal system 51 via the communication route between the information management system 53 and the terminal system 51 and is displayed to the customer by the display device 83. Therefore the sales support system of this embodiment may present the date of delivery to the customer taking also into account the production period of the production factory.

The information management system 53 has a shipping agency management system 61 that manages the shipping (transportation) agencies that transport the products shipped from the storage facilities 68 or from the production factory 69.

This shipping agency management system 61 has a shipping agency data memory means 101 where various data concerning a plural number of shipping agencies are stored. In this memory means 101, geographic locations or transport ability such as the number of trucks and the like or the shipment schedule of the shipping agencies and the like are stored as the shipping agency data.

Also, the shipping agency management system 61 has a shipping agent selection (decision) means 103 which by reference to the memory means 101 selects the most adequate shipping agent to transport the ordered product when shipping data related to the product to be shipped is received from the product facility management system 59. This shipping agent selection means 103 selects the most suitable shipping agent that satisfies appropriate shipping conditions. This shipping condition includes, for instance, the weight of the product, or geographical distance between the shipping agent and the customer, or shipment time (shipment schedule) and the like.

Therefore the sales support system of this embodiment may transport the ordered product to the customer at the shortest time possible, which shortens the date of delivery and clears claims from the customer.

The shipping agent management system 61 also has a date of delivery evaluation means 105 that evaluates the date of delivery of the product taking also into account the period of shipment by the shipping agent 73. The date of delivery evaluated by this evaluation means is forwarded to the terminal system 51 via appropriate communication channels. Therefore the businessperson may present by reference to the display of the terminal system 51, the date of delivery taking into account the shipment to the customer.

The sales management system 55 has a visit support system 74 that supports visits of businessmen to the customers.

In more detail, the visit support system 74 has memory means 75 that stores product possession information on products which each customer possess and visit records to each customer, means for calculating weight coefficients 77 for each customer based on said product possession information and visit records; and a customer visit selection means 79 for selecting customers to be visited based on the weight coefficients.

Note the business units that dispatch salespersons may have a plural number of types that play different roles. For instance, the product salesperson office 63, the franchise center (this has about 50 to 100 personnel and aims for complete visits to customers) 65 and the order receipt center (where quotations for products or receipt of orders or advertisement activities are carried out) 67 and the like. In these cases, the weight coefficient (factor) calculation means 77 computes weight coefficients for the customers according to the type of each business unit. Therefore although the products possession information and visit records and the like are the same, the weight coefficients may take different values according to the type of business units.

Also the visit support system 74 has, a map preparation means 81 which indicates the geographical position of the customer to be visited when the customer to be visited selection means 79 selects a customer to be visited.

With the aforementioned organization, the businessperson may make a complete visit of customers in need of the produced tools.

Also by the businessperson belonging to each business offices 63, 65 and 67 jointly owning visit records of the customers through the sales management system 55 or the visit support system 74, double or triple visits to the same customer at the same time by businesspersons belonging to business offices 63, 65, and 67 may be prevented. Also effective and complete visits to the customers may be realized this way.

Also by calculating the customer weight coefficient differently according the nature of the business units, different customers may be visited selectively according to the role of the business office. For instance, the businessperson at the franchise center 65 may make perfect management of the customers by bearing closely to the area and the salesmen belonging to the product salesmen office 63 may conduct business negotiations by utilizing businessmen of the franchise center 65 functioning as an antenna and achieve completion of the negotiation.

Figure 2:
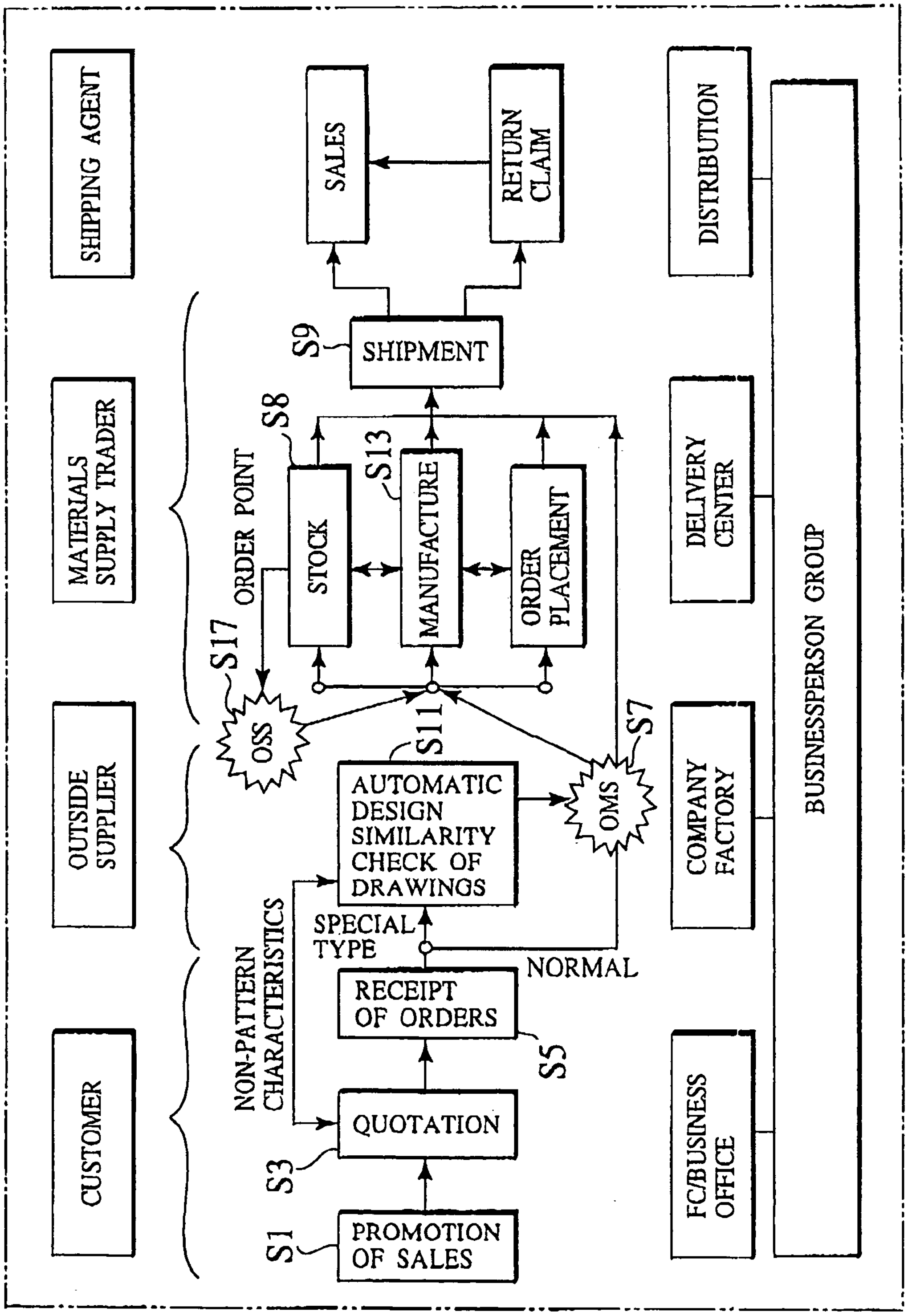
FIG. 2 is an illustration of the operation of the embodiment.

FIG. 2 explains the total process from sales to product shipment by the sales support system of this embodiment. In more detail, FIG. 2 shows the sales process, quotation process, order process, design process, stock facility determination process, shipping agent determination process etc.

As shown in FIG. 2, in step S1, sales activity of the product takes place to the customer at the factory and offices and the like by businesspersons from the offices 63, 65, and 67.

In step S3, quotations will be made by request of the customer of the product (tool). Also, as already mentioned, the price or the date of delivery or the tolerance of processing are included in this quotation. In case the product is a standard product or a patterned special type product, the quotation will be made immediately by the terminal system 51 or the design management system 57. On the other hand, if the product to be quoted is a non-patterned special type product, the quotation will be made by design experts by use of the design management system 57. This quotation will be made by reference to, for instance, prices of analogous products.

If the customer is satisfied with the quotation, the order for the product will be made via the terminal 51 in step S5.

In case the ordered product is a standard product, the storage facility 68 or the production factory 69 which possess the product is determined in step S7 and S8 and the standard product will be shipped from the storage facility 68 or the production factory 69 in step S9.

On the other hand, in case the ordered product is a said patterned special type product or a non-patterned special type product, design and check of the design of the ordered product will be made in step S11. This design check includes the process tolerance evaluation means. As already stated, this design and check of design will be performed by the design management system 57. Also in case the ordered product is a patterned special type product, the design and check of the design will be performed automatically. On the other hand, if the ordered product is a non-patterned special type product, the design will be made based on analogous design of an existing analogous product.

When the ordered product is a patterned special type product or a non-patterned special type product, the production factory that will produce the ordered product will be determined in the next step S7. This step S7 will be performed by the optimum production scheduler (OMS) of the means to determine production facilities 95 provided in the product facility management system 59.

When the production factory to produce the ordered product is determined in step S7, the ordered product will be produced at the designated production factory. The produced ordered product will then be shipped from the production factory to the customer in step S9.

In case the ordered product is a standard product, the ordered product will be shipped from the storage facility 68 or the production factory 69 and after the shipment is made, subsequent amount of goods in stock in the facility will be checked with reference to past shipment records (step S17). If it is judged from the past records that there will be shortage of goods in stock, instruction to supplement stock will be generated and in step S13, the standard product corresponding to the shipped product will be produced to supplement stock. Further the check of conditions of stock and judgment of amount of goods in stock (step S17) will be performed by the optimum stock scheduler (OSS) of the stock management means 96 provided in the product facility management system 59.

Figure 3:
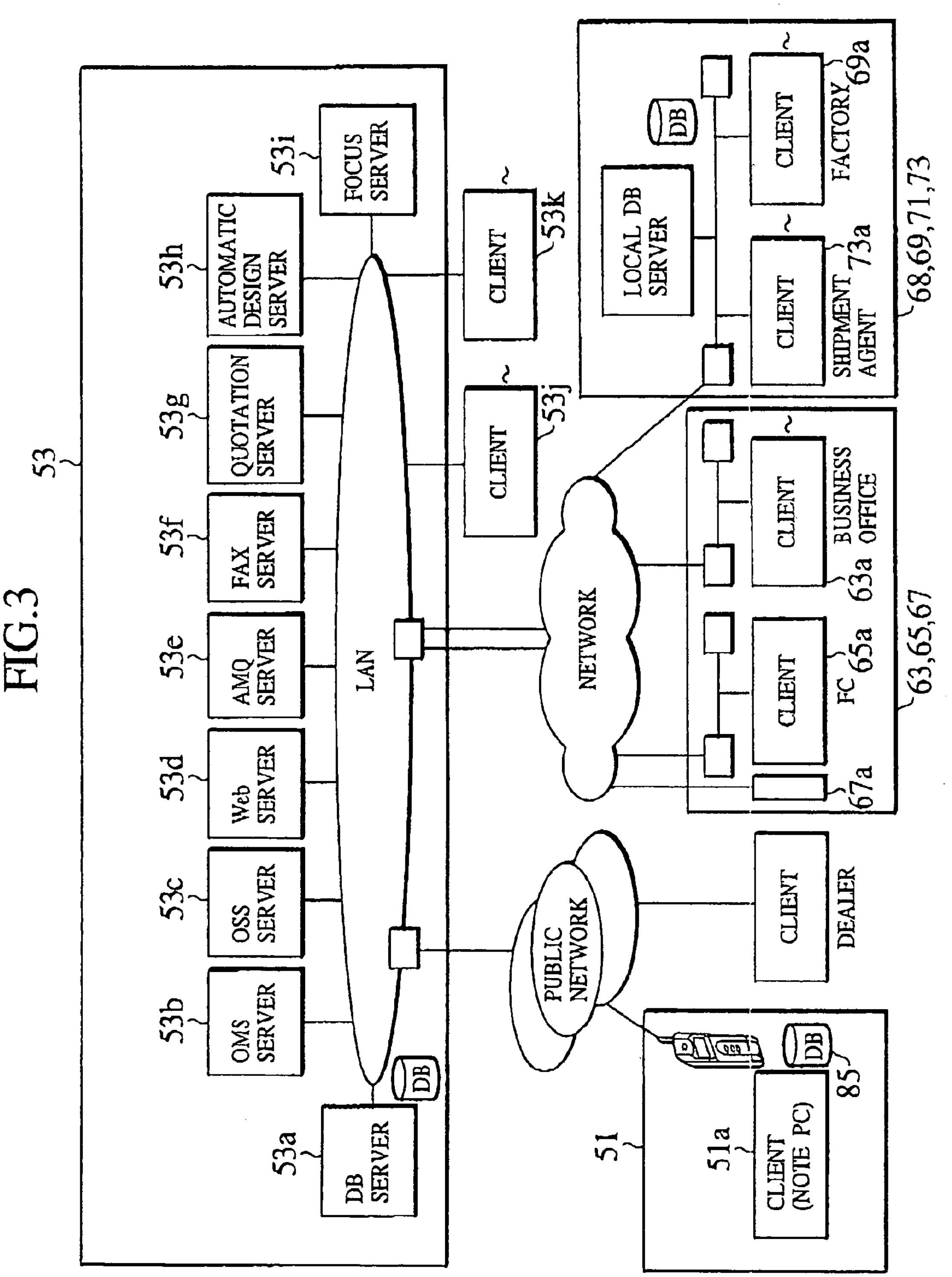
FIG. 3 is an illustration of the physical structure of the embodiment.
Figure 4:
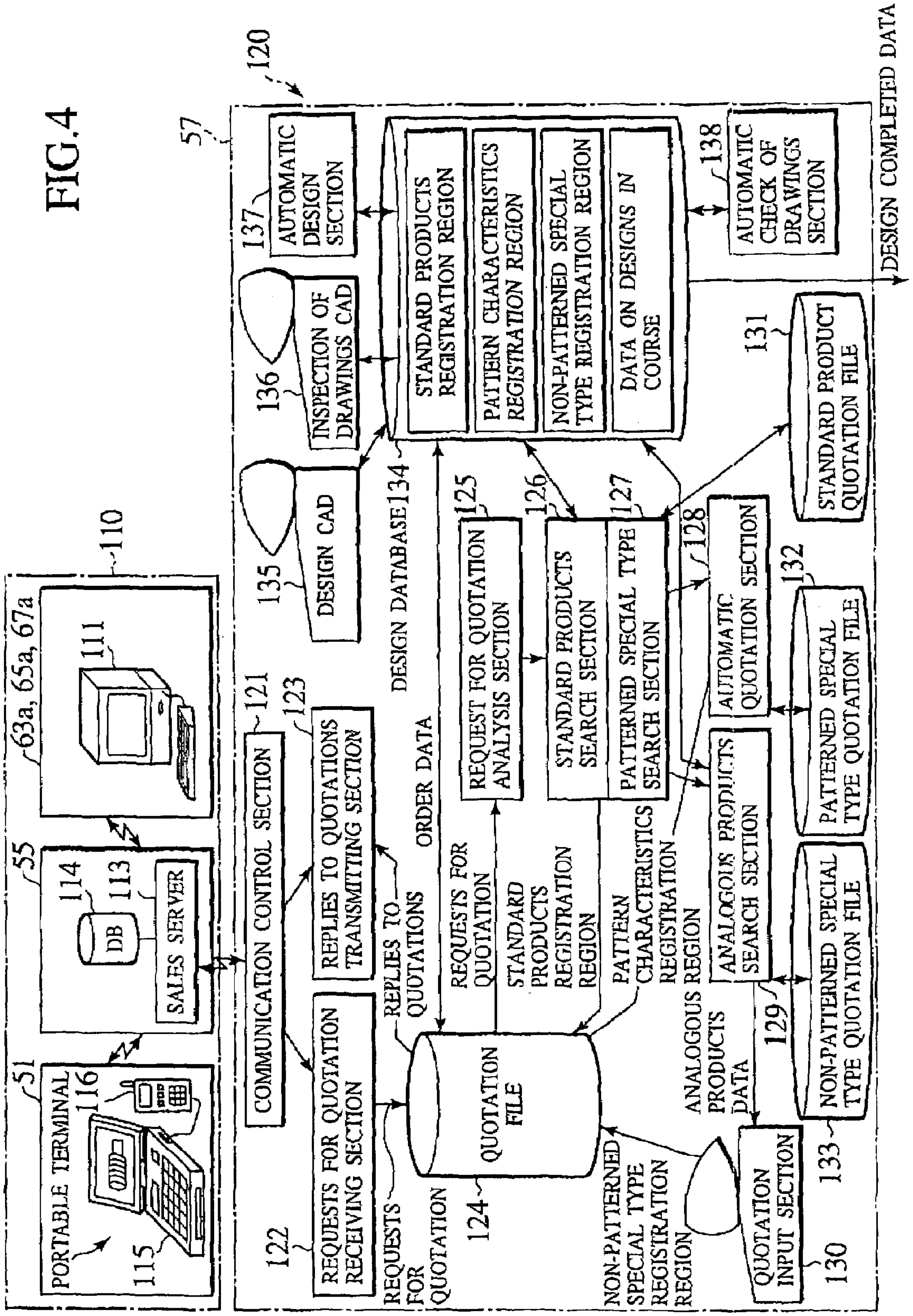
FIG. 4 is a system organization that illustrates the embodiment of quotation and design systems of the present invention.

FIG. 3 describes the actual structure of the sales support system of the embodiment.

As shown in FIG. 3, the information management system 53 consists of a group of servers (data base server 53*a*, OMS server 53*b*, OSS server 53*c*, web server 53*d*, AMQ server 53*e*, fax server 53*f*, quotation server 53*g*, automatic design server 53*h*, focus server 53*i*) and client group 53*i*, 53*k* that are connected to this group of servers by LAN.

The information management system 53 is established at the head office of the company that provides the products or services.

On the other hand, the terminal system 51 includes, for instance a notebook-sized personnel computer 51*a* which is connected by telephone circuit and the like to the group of servers 53*a*~53*i*. A database (DB) is provided as the memory means 85 in this notebook sized personnel computer 51*a*.

The terminal system 51 consists of a mobile computer and the like which is carried by businesspersons who visit customers to sell products or provide services.

Terminal systems 63*a*, 65*a*, 57*a* which are provided at the various business offices 63, 65, 67 are also organized as clients 63*a*, 65*a*, 67*a* connected by the network to the group of servers 53*a*~53*i*.

Furthermore, each terminal 68*a*, 69*a*, 71*a*, 73*a* provided at the storage facility 68, production factory 69, material supply facility 71, shipping agent 73 are also organized as clients 68*a*, 69*a*, 71*a*, 73*a* connected to the group of servers 53*a*~53*i* by the network.

Therefore by this sales support system, the businessperson and head office and product storage facility and product production facility and shipping agents may jointly own various data on quotations and order data etc. Thereby the date of delivery may be shortened and sales costs may be lowered and claims from customers may be cleared.

By reference from FIG. 4 to FIG. 33, the embodiment will be described in detail.

FIG. 4 to FIG. 9 shows in detail the system for quotation or design of products in the embodiment.

As mentioned already, the system that performs quotations and design is composed of sales system 110 and design system 120. The sales system 110 is composed of the terminal system 51, sales management system 55, fixed terminals 111 such as business office terminals 63*a*, 65*a*, 67*a*, and the design system 120 is composed of the design management system 57.

Further in the following explanation, the products are classified into 3 types. That is, products which are already designed and partly produced on basis of expectation are classified as standard products, and special order products which are designed according to the customer's order are classified as special type products and furthermore the special type products are classified as patterned special type products and non-patterned special type products.

The patterned special type products are standard special order products that are standardized in fixed patterns with designated values of parameters determined according to the customer's order. In contrast, non-patterned special type products are products that are not standardized and are produced, if feasible, according to the customer's unrestricted order.

Figure 5:
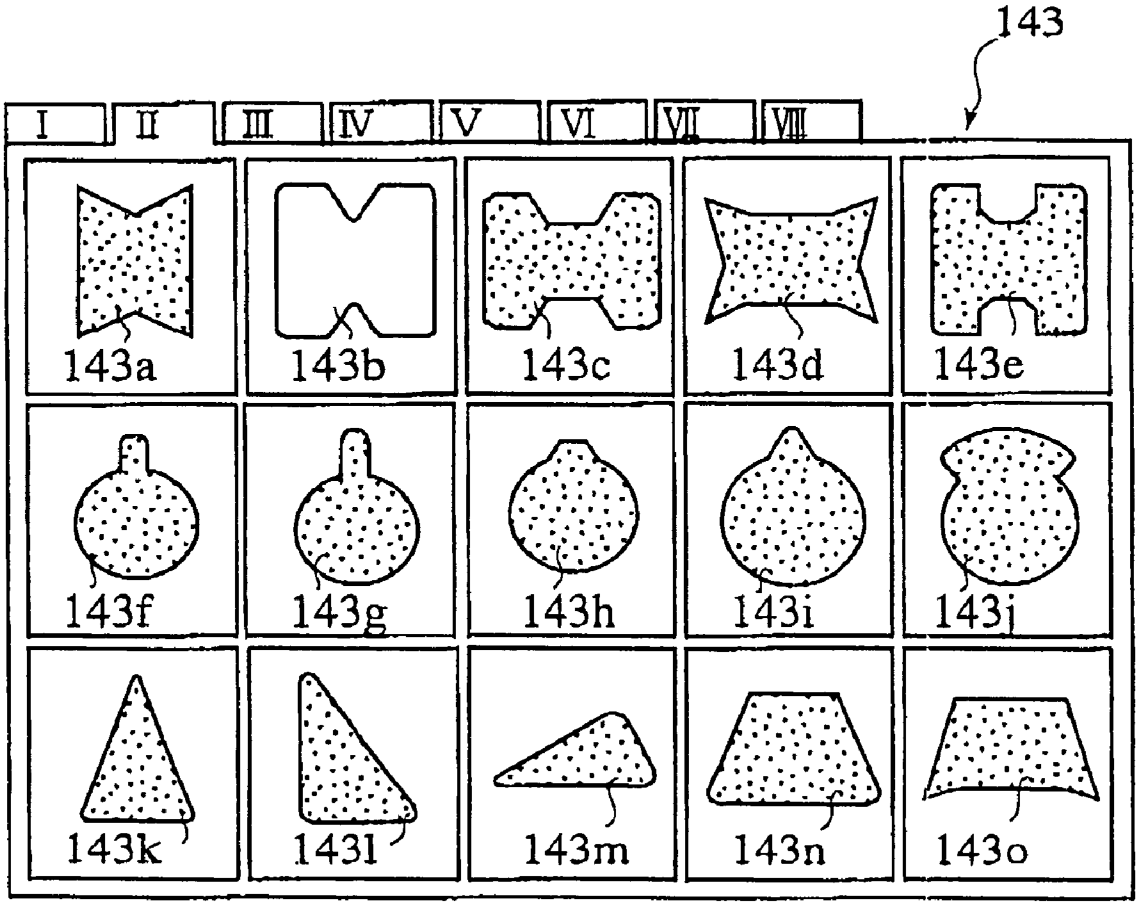
FIGS. 5 and 6 are illustrations of patterned special type products.
Figure 6A:
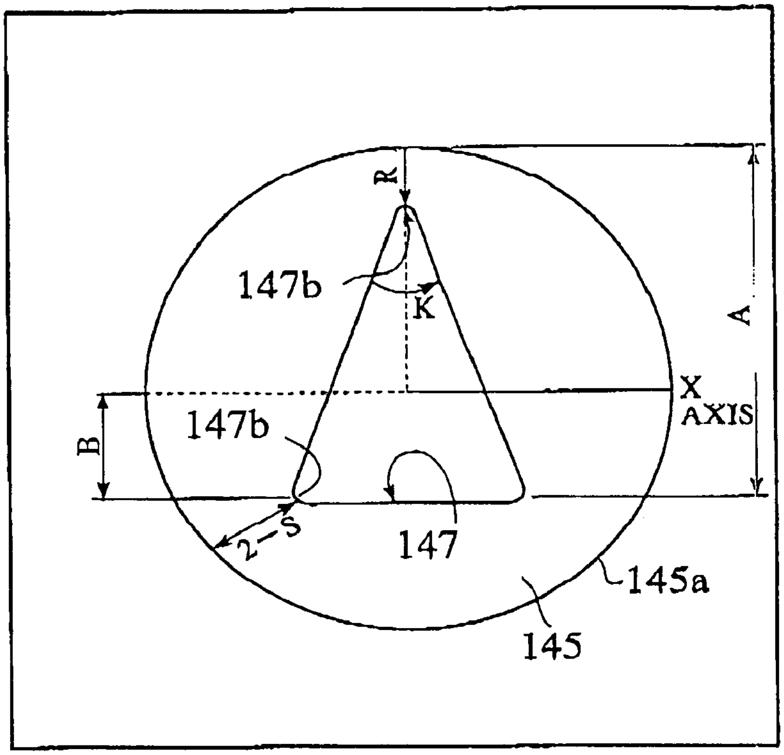
Figure 6B:
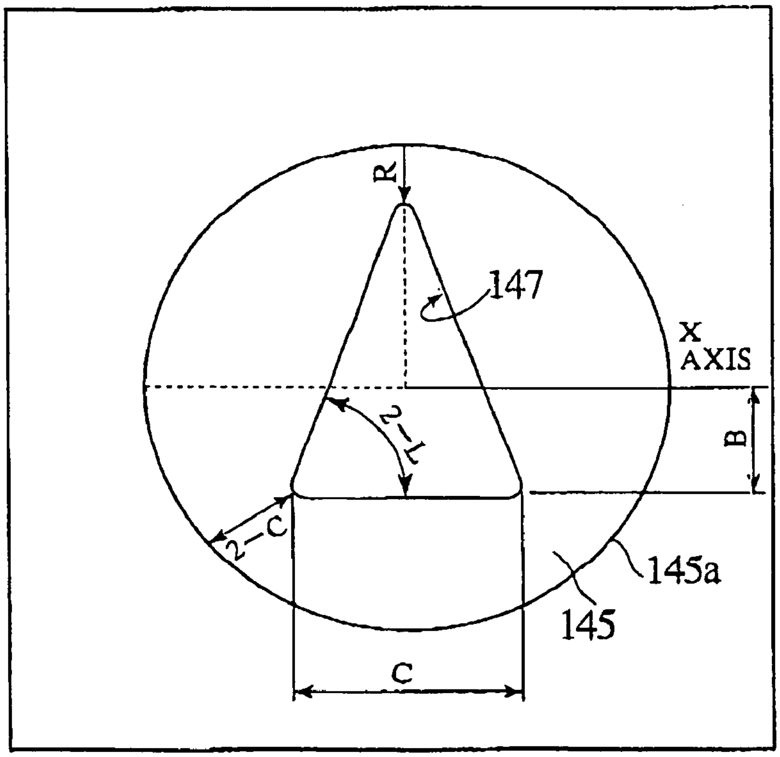

FIG. 5 and FIG. 6 show an example of patterned special type products where the product is a punch of a punch press or a die.

FIG. 5 shows an example of list 143 of various cross section shapes 143*a*~143*o* of the punch or die patterned special type products. When the shape of the tool ordered by the customer has a shape included in this shape list, the shape pattern of the tool may be specified by selecting one said shape from the list of shapes.

FIG. 6(*a*) shows examples of parameters A,B,K,R that determine the size of the shape pattern 143*k* in FIG. 5. Furthermore, in FIG. 6(*a*), parameters R, 2-S indicate, for instance, the distance between the periphery 145*a* of the base 145 of the die and the apex 147*a*, 147*b* of the die hole 147.

FIG. 6(*b*) shows different examples B, C, K, L, R of parameters that determine the size of the shape pattern 143*k* in FIG. 5.

Therefore after the form pattern 143 is selected, the shape of the patterned special product may be specified by specifying the parameters A, B, K, R, S or the parameters B, C, K, L, R etc.

The sales system 110 makes comprehensive management of sales activity by promotion of sales activities in preparing quotations and receiving orders. Therefore data base marketing is realized by integrated management of all the information based on the customer database.

Namely, the sales system 110 is provided with a plural number of portable terminals 51, plural number of fixed terminals 111 provided at the business base, and a sales management system 55 that cooperates with fixed terminals 111 and portable terminals 51. The sales management system is provided with a sales server 113 and a sales database 114 connected to the sales server 113.

The portable terminal 51 consists of, for instance, a notebook personal computer 115 which may be connected to a portable telephone 116 and via portable telephone circuit may be connected to the sales server 113 to exchange information.

The design system 120, besides returning results of quotations to requests for quotations from the sales system 110, performs design and check of the drawings of patterned special type products or non-patterned special type products ordered and transmits drawings checked design completion data to the production management system 59.

To this end, the design system 120 is provided with a communication control section 121 which controls communication between the sales server 113, quotation request receiving section 122, quotation results transmitting section 123, quotation file 124 which stores requests for quotations and answers to quotations temporarily, a quotation analysis section 125, standard products search section 126, patterned special type products search section 127, automatic quote section 128 to make quotations for patterned special type products, a similar product search section 129 to search products similar to non-patterned special type products, a quotation input section 130 to input quotations for non-patterned special type products, standard products quotation file 131, patterned special type products quotation file 132, non-patterned special type products quotation file 133, design data base 134 where data on designs in progress and data on designs completed are registered comprehensively, a design CAD 135 for designing non-patterned special type products, drawings check CAD 136 to check drawings of non-patterned special type products, automatic design section 137 where patterned special type products are designed automatically, and a automatic check of drawings section 138 where design data of patterned special type products are checked automatically.

The sales server 113 manages the sales data base 114 which include data on customers which include credibility of each customer, past record of delivery of goods, information on past record of the machinery delivered, narrows down the targeted customers and manages visit schedules.

The businessperson in charge who visits the customer introduces products, makes quotations and takes orders using the portable terminal 51. The portable terminal 51 is provided with a large capacity memory playback equipment such as CDROM drive, DVD drive and the like and by reproducing the electronic catalog recorded in memory media CDROM, CD-R, CD-RW, DVD and the like, the performance, shape dimensions of the product presented to the customer may be introduced by still pictures, animation, voice and other various functions, and also by proposing solutions to problems which the customer holds, it may make it more easy to select the most fitting product in compliance with the customers wishes by which orders for the product may be promoted.

The portable terminal 51 or the fixed terminal 111 are both provided with a standard product quotation request input screen, a patterned special type product quotation request input screen and a non-patterned special type product quotation request input screen which allow input of each input item of the quotation request by interactive processing.

In particular, the standard product quotation request input screen and the patterned special type product quotation request input screen are arranged so that they are linked to the electronic catalog display screen recorded in CD-ROM and the like making it easier to input quotation requests for standard products or patterned special type products selected from the electronic catalog at the spot of business activity.

The quotation request input items are distinction of standard products, patterned special type products, non-patterned special type products for classifying the products, the name of the product, type, various dimensions which prescribe the shape of the product, quality of the material, quantity, conditions for use and the date of delivery etc.

The request for quotation inputted from the portable terminal 51 or the fixed terminal 111 are transmitted to the sales server 113 and quotation results are transmitted to the portable terminal 51 or the fixed terminal 111. If the result of the quotation is approved by the customer, the order will be settled and the order information will be transmitted from the portable terminal 51 or the fixed terminal 111 to the sales server 113.

The sales server 13 that manages request for quotations and orders from customers will transfer the request for quotation and the result of the quotation in close cooperation with the design system 120. The sales server 113 is also connected to internet so that the customer may make access to the sales server from his personnel computer and extract electronic catalog information, request quotations, receive results of quotation, make an order for the product, etc.

For patterned special type products that may be designed automatically, a parameterized request for quotation information is transmitted to the design system 120 and the design system 120, together with making quotations, will design and make automatic check of drawings.

For non-patterned special products that may not be designed automatically, an analogous product will be searched from existing designed products registered in the design database 134 presented on the CAD terminal. The person in charge of quotations will make a quotation with reference to the analogous product and input the quotation result from the CAD terminal that composes the quotation input section 130.

The order data will also be transferred from the quotation file 124 to the design database as a design parameter and will be registered in the design database 134 as the completed design.

Next the operation of the embodiment will be explained in detail.

Figure 7:
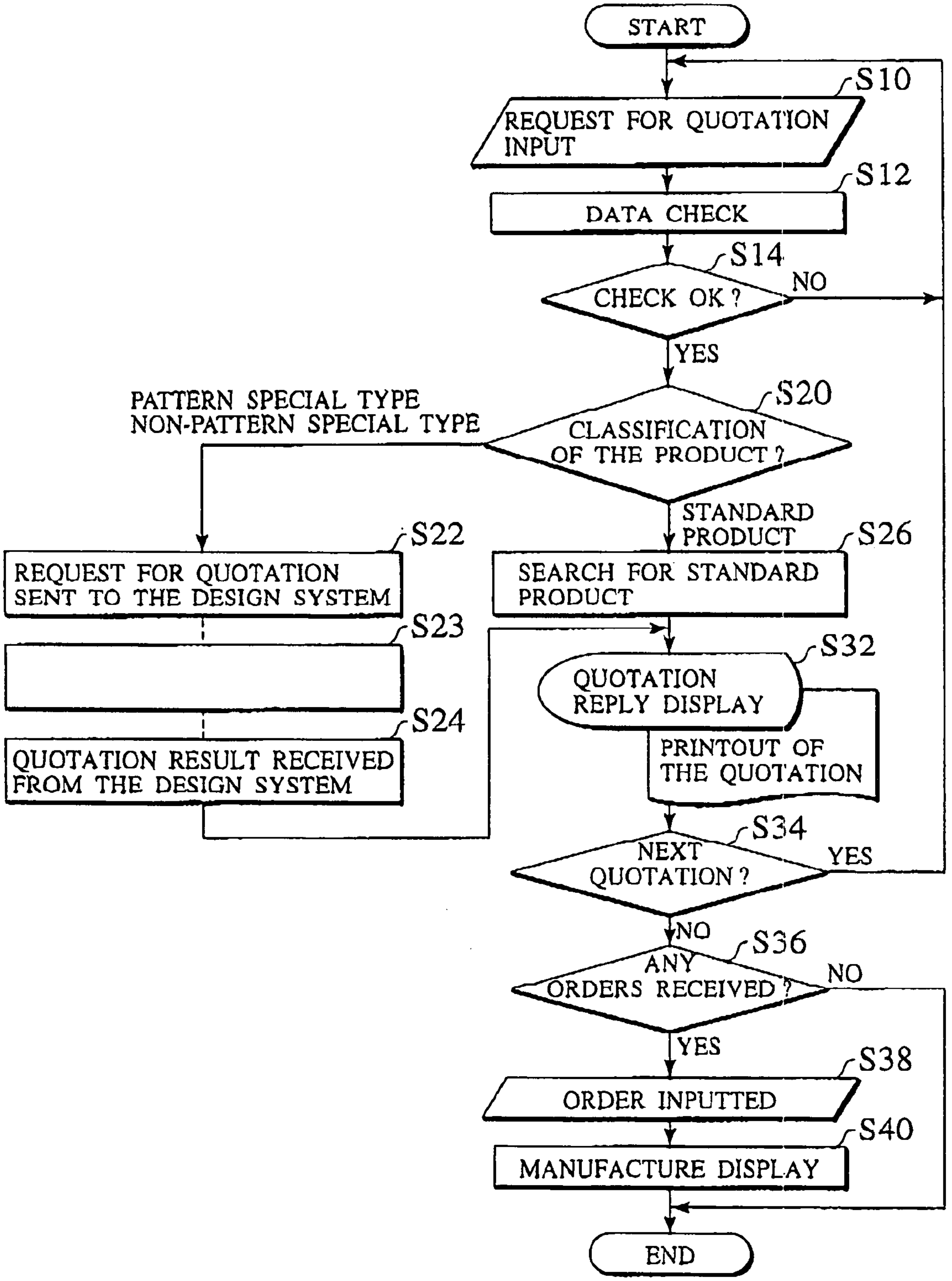
FIG. 7 is a flow chart for explaining the operation of quotations in the embodiment of the quotation and design systems.

FIG. 7 is a flowchart that describes the operation of the sales system 110.

In step S10, the request for quotation is inputted from the portable terminal 51 (or the fixed terminal 111). At this time, data on the nature of the material of the quotation object product, shape, quantity, date of delivery and the like will be included in the request for quotation input.

Next a data check to check whether the data inputted is proper or not will be made (step S12). Next decision will be made on the results of the data check (step S14) and if the data check result is not OK, data improper will be displayed and returned to the request for quotation step S10.

If the check result is OK, judgment will be made on whether the product inputted for request of quotation is a patterned special type product or a non-patterned special type product (step S20). If it is a patterned special type product or a non-patterned special type product, request for quotation will be transmitted to the design system 120 via the sales server (step S22). Upon receipt of the quotation result from the design system (step S24), the process proceeds to step S32.

If it is a standard product, the standard product quotation file, which is not shown in the figure, stored in the portable terminal 51 or the fixed terminal 111, or the standard product quotation file registered in sales data base 114 connected to the sales server 113 will be searched. And the quotation for the standard product will be made (step S26) and the quotation reply will be displayed on the screen of the portable terminal 51 and printed out together with the quotation (step S32).

Next judgment is made whether there is or there is not a next quotation and if there is a next quotation, procedure to the next step S10 will be made. If there is no next quotation, judgment is made whether there is an order or not and if there is no order, the process will be terminated and if there is an order, the order will be inputted (step S38) and instructions for production to the production management system 59 (step S40) corresponding to the order will be made and the process terminated.

Figure 8:
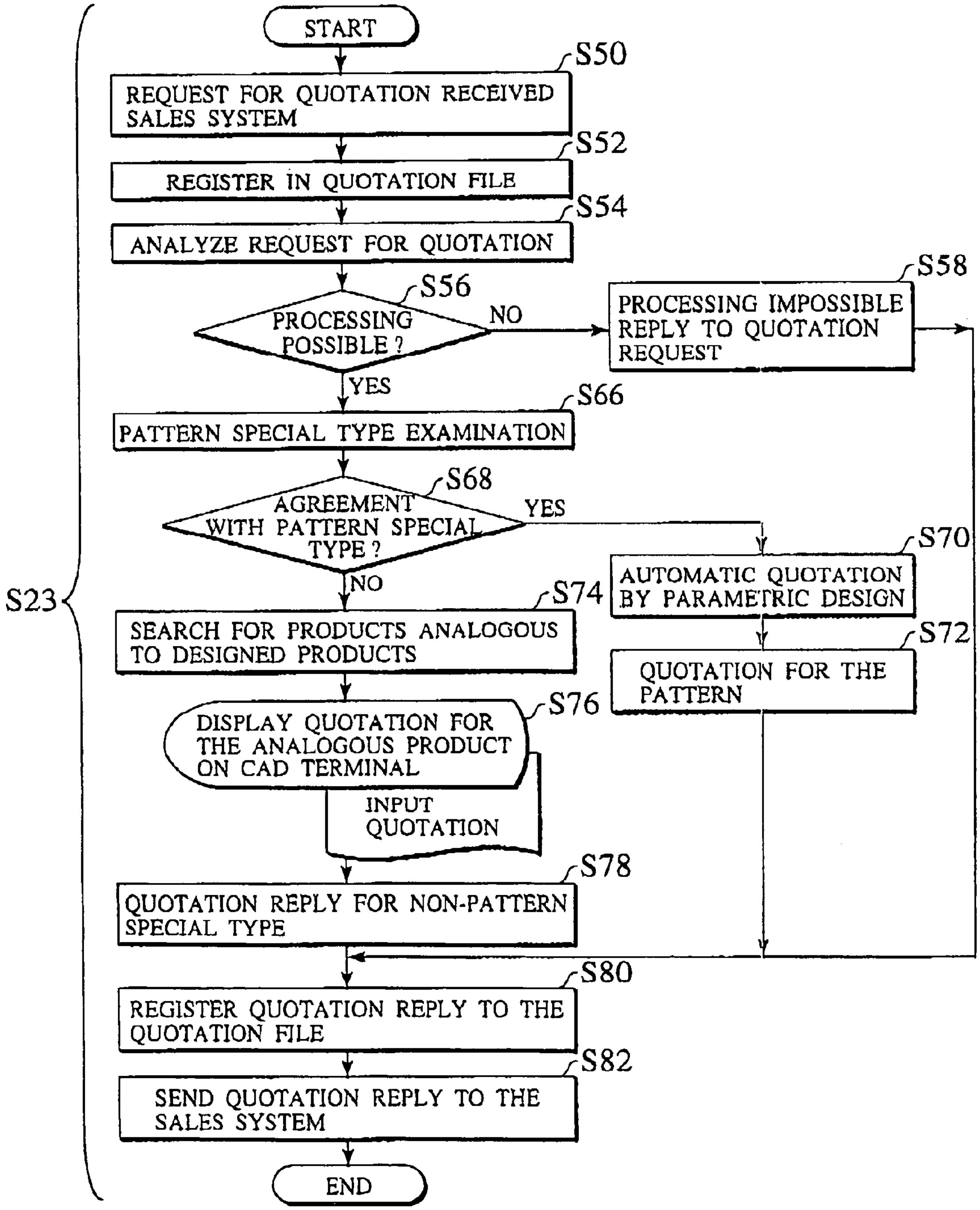
FIG. 8 is a flow chart that explains the operation of quotations of the embodiment.

FIG. 8 is a flow chart that describes quotation procedure made by the design system 120 upon receiving the request for quotation from the sales system 110.

In FIG. 8, firstly when the request for quotation receiving section 122 receives a request for quotation from the sales server 113 of the sales system 110 via the communication control section 121 (step S50), it will be registered in the quotation file 124 (step S52). And the request for quotation analysis section 125 will analyze the request (step S54) and inspect process feasibility (that is whether the ordered tool has the strength to perform the designated process). Next judgment will be made on whether the process is feasible or unfeasible (step S56) and if the process is unfeasible, process unfeasible quotation reply will be made (step S58) and the process will proceed to step S80.

Next, on basis of information on requests for quotation, the patterned special type product registration region of the design database 134 will be searched to seek whether there is a patterned special type product that corresponds to the product requested for quotation (step S66). On basis of the result of this search, it will be judged whether the patterned special type product was detected or not (step S68). In case the patterned special type product was detected, parameters included in the request for quotation information will be inserted in the patterned special type product registered information and a parametric design will be performed. Based on the result of this parametric design, automatic quotation will be performed (step S70). A reply to quotation will then be prepared as the quotation for a patterned special type product (step S72) and the process will proceed to step S80.

As it will be a non-patterned special type product if there is no patterned special type product which coincides, an analogous product is searched automatically from designed products which are registered in the design database and the design data of the analogous product will be transmitted to the quotation CAD terminal which composes the quotation input 130 (step S74).

The personnel in charge of making quotations will display the design data and the price information of the analogous product sent to the quotation CAD terminal on the screen to make an estimate of the non-patterned special type product with reference to the display and input the quotation (step 76). And the quotation reply of the non-patterned special type product will be made (step 78). Next the quotation reply will be registered in the quotation file 124 (step 80), and the quotation reply will be sent to the sales server 113 from the quotation reply transmission section 123 via the transmission control section 121 and the process will be terminated.

Figure 9:
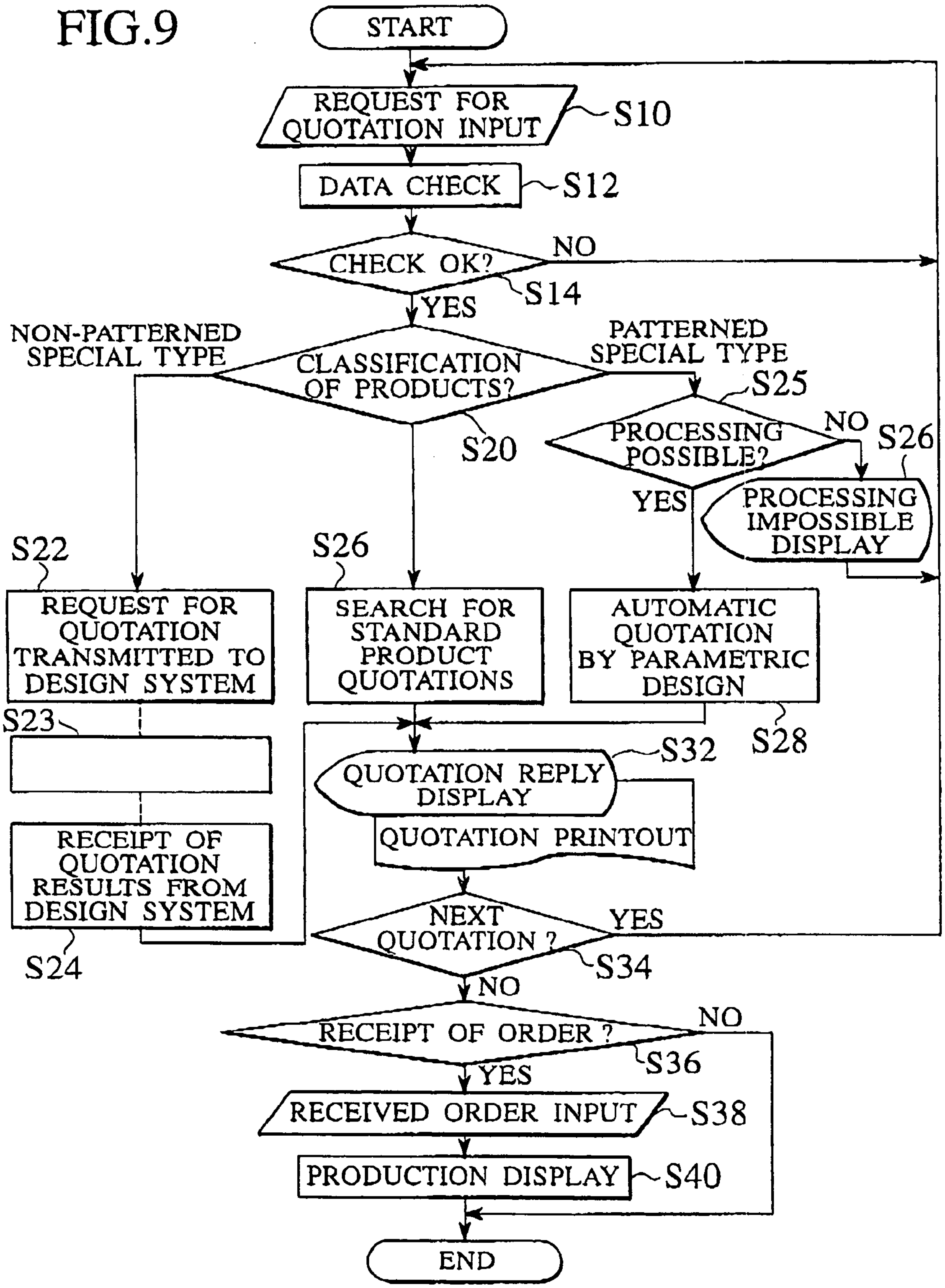
FIG. 9 is a flow chart that explains a variation of operation of quotations of the embodiment.

FIG. 9 is a flowchart that shows a variation of the quotation process of the sales system 110.

This variation differs from the previous embodiment in that it has a system in the terminal system 51 (or the fixed terminal 111) a system where parametric design and automatic estimation are made.

In FIG. 9, steps from the quotation request input (step S10) to the process feasibility judgment (step 16) and the process unfeasible display (step S18) are the same as in FIG. 7.

Next, judgment will be made whether the product inputted for request of quotation may be classified as a standard product, a patterned special type product or a non-patterned special type product (step S20).

In the case of a non-patterned special type product, request for quotation will be transmitted to the design system 120 via the sales server 113 (step S22), and upon receipt of the quotation result from the design system 120, will move on to step S32.

In the case of a standard product, the standard product quotation file will be searched, quotation for the standard product made (step S26) and the quotation reply will be displayed on the screen and also the quotation will be printed out (step S32).

For patterned special type products, quotations will be made automatically (step S28) by parametric design using the automatic design system in the portable terminal 51 (or the fixed terminal 111) and will proceed to step S32.

From a step S32 on, the process is the same as in FIG. 7 except for the fact that the process will be made in the portable terminal 51 (or the fixed terminal 111). In this variation, as the automatic quotation will be made by use of parametric design utilizing the automatic design system provided in the portable terminal 51 (or the fixed terminal 111), the quotation may be made faster as the quotation for the patterned special type product may be completed inside the portable terminal 51 (or the fixed terminal 111).

The following effects were obtained by introducing and employing the quotation and design system 1.

That is, the average date of delivery was reduced by about 20% compared to pre-introduction of the system. Also in comparison to before introduction of the system, the percentage of inferior goods was reduced by about 15%. Also in comparison to pre-introduction of the system, claims on the quality of products were reduced by about 20%. Also considerable reduction in cost was realized.

In the embodiment described above, metal mold parts for sheet metal processing machinery was taken as the product but the product is not limited and may be, for example, blades used in cutting machines and various other products for use in processing machines for metal processing etc.

As explained above, in this quotation and design system, design and quotation (including date of delivery or price or judgment on process feasibility) for standard type custom made products may be made by the personnel in charge of sales by use of the portable terminal he carries. Therefore based on this quotation, order for the product may be received immediately.

Also in this invention, on basis of information accompanying the request for quotation on a non-standard custom made product received from the portable terminal, information on similar products may be searched and extracted from the design data base by use of the similar product search means, and information on reference for quotation may be obtained automatically allowing swift input of quotation for the non-standard custom made product.

Also this invention provides a quotation and design system which allows high level responses to the customer's demands by introduction of products, making quotations and taking orders accurately and swiftly when the personnel in charge of sales visits the customer, and by designing and manufacturing the product ordered precisely and quickly.

FIG. 10 to FIG. 24 shows in detail the system that, together with determining the product facility that provides the ordered product, determines the shipping agent who transports the product manufactured.

The product facility includes a storage facility where ordered products in stock are held and a manufacturing facility (manufacturing factory) where the ordered products may be produced anew.

In general, based on orders received from the customers, this system manages instructions for production, goods in stock, orders to outside suppliers and shipment. The cores of the system are the optimum production scheduler (OMS) and the optimum stock scheduler (OSS) that consist of the product facility management system 59 and the shipping agency management system 61 and may be organized as an expert system structured as a knowledge base for production management and expertise.

This system determines the most suitable provision facility that provides products based on orders from customers. In doing so, priority will be given to facilities which possess the following factors.

Facilities (the product facility or manufacturing facility) that possess ordered products (completed products).

Manufacture facility for ordered products (manufacture facilities (1) which has a large daily production, (2) which possess most suitable materials for partially manufactured products) will be given priority as the manufacturing facility.

The facility that gives the minimum time for delivery (the delivery time is based on the sum of the production period and the delivery period).

This system also selects the most suitable maker automatically and instructs production automatically and also based on the proper amount of storage, manages the optimum point to place an order and when the storage falls below the point to place an order, will issue instructions for production to supplement storage.

This system also automatically selects the most suitable shipping agent and automatically gives orders for shipment and delivery.

The most suitable maker is a factory of the producer or an outside maker that may complete manufacture and delivery within the delivery time requested by the customer, possesses material (including semi-finished products) to produce the product and may produce the product at minimum cost. In more detail, the most suitable maker is selected by considering the following factors with priority given to factors in the listed order.

(1) Delivery may be made within the customer's date (2) The ability to cope with the time necessary for shipment to the customer is high (3) The ability to all processes according to the customer's specifications (4) Possesses in stock materials to be processed adequate for the customer's specification (5) Possesses ability to cope with production loads (6) Possesses ability to cope with shipment to the customer (7) Ability to cope with production costs is high (8) Ability to cope with delivery costs to the customer is high The most suitable shipping agent will be determined by overall considerations of the weight of the product, area, shipment time etc.

Figure 10:
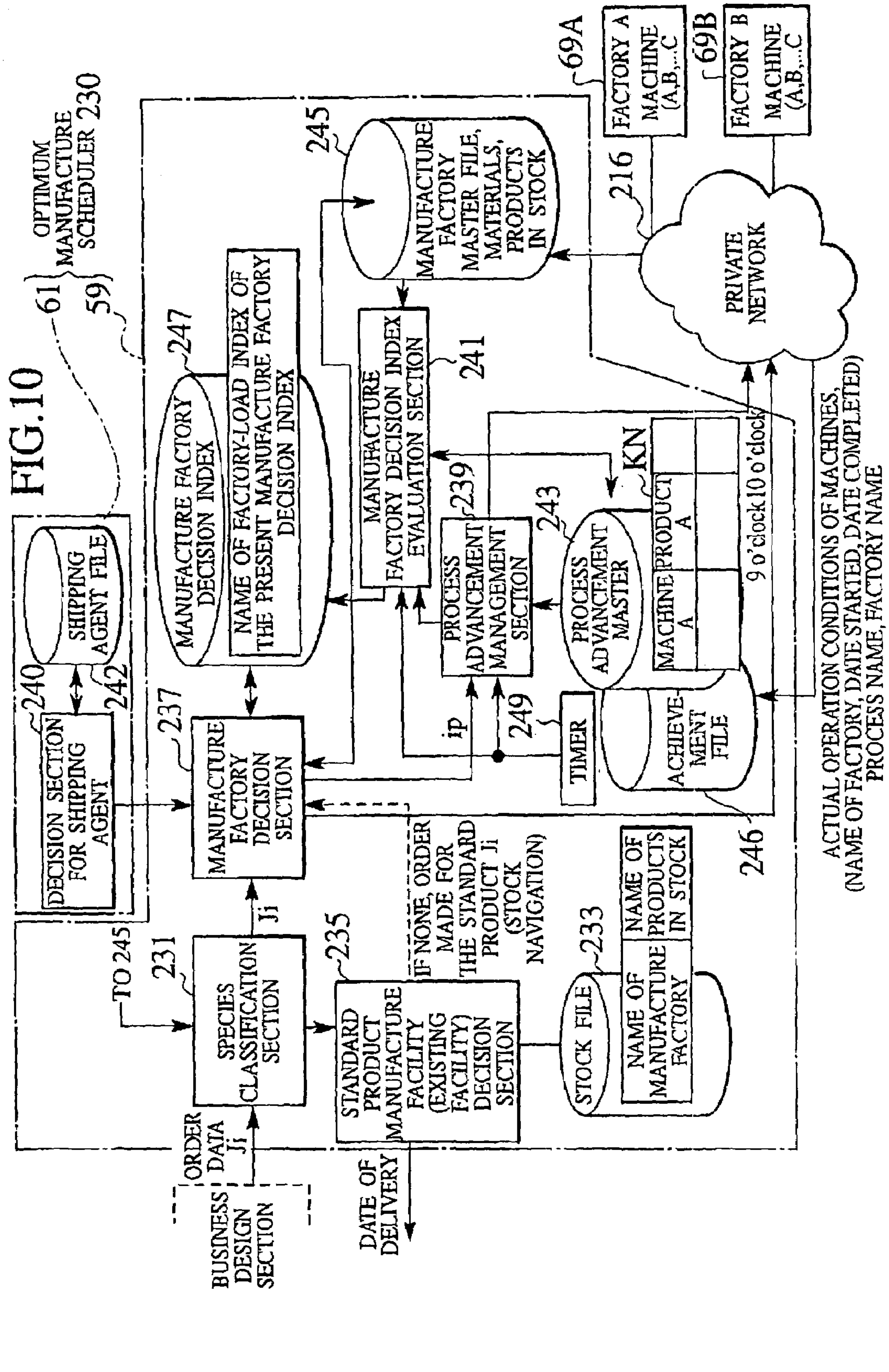
FIG. 10 is a schematic structure of the first embodiment for an optimum production schedule.

FIG. 10 shows the first embodiment of system to determine the production facility that will provide the ordered product and to determine the shipping agent that will deliver the product.

In general, this system is provided with the optimum production scheduler and optimum stock scheduler acting as the product facility management system 59 and a shipping agent management system 61.

The optimum production scheduler 230 shown in FIG. 10 is provided with a program structure described below.

The optimum production scheduler 230 is provided with a species sorting section 231, a standard product manufacture facility decision section 235, a manufacture facility decision section 237, a progress in process management section 239, section for computing manufacture facility determination index 241, a shipping agent decision section and the like and communicates by an exclusive network 216 with each factories A, B, and the like which are the manufacturing facilities and automatically places orders for metal molds (standard products, standard custom made products, non-standard custom made products) to the most favorable factories.

The contents of memory in each file of the optimum production scheduler 230 will be explained. In the shipping agent file 242, the address of shipping agents in each area, delivery capability, standard delivery time, delivery price and the like are stored.

In the process advancement master file 243, the process advancement management table KN formed based on rate of actual operation of machines data and the like forwarded from factories A, B, . . . in respective areas are stored. This process advancement management table KN is a table which shows the names of each machine (process), and when and what kind of product is processed.

Also the state of actual operation of machines (processing) forwarded from factories A, B, . . . which are the manufacturing facilities of each area are recorded in the performance file 246.

The state of actual operation of the machine (name of process) forwarded from the manufacturing facility consists of the factory name (name of the manufacturing facility), name of the processed product, name of the process, the actual starting time, the actual completion time and the like as shown in FIG. 11(*b*).

Figure 12:
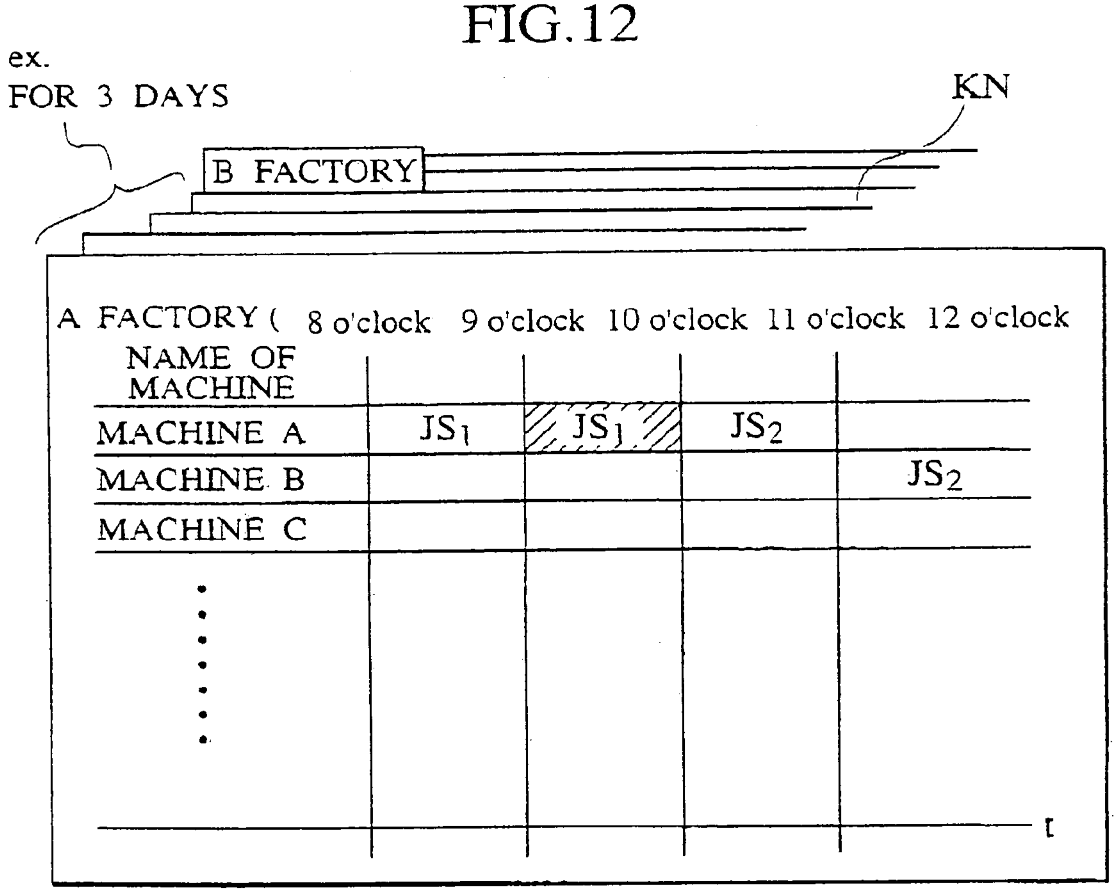
FIG. 12 is an illustration explaining the manufacturing process progress management chart.

Also as shown concretely in FIG. 12, in the process advancement management table NK, in correspondence to the machine names A, B, C, . . . of each factory unit, a time schedule (for instance for one day) in which information on when and what product each machine is processing is laid out.

Also in the stock file 233, the names of the production facilities and standard products are stored as corresponding to goods in stock.

Furthermore names of manufacture facilities, stored materials, production cost, machine capacities, addresses, information on shipping agents (location, number of days for delivery) and the like are stored in the manufacturing facility master file 245.

In the manufacturing facility decision file 247, manufacturing facility decision indices computed by the section for computing manufacturing facility decision indices 241 are stored.

As shown in FIG. 11(*a*), this manufacturing facility decision index consists of the manufacturing facility (factory name), present load index, material index (existence of materials), processing capacity (machine capacity) and cost index.

Also in the manufacturing facility decision file 247, manufacturing facility indices $\beta i$ determined on basis of each index of the manufacturing facility decision indices are stored. As shown in FIG. 11(*d*), to the manufacturing facility indices $\beta i$ the names of the factories (manufacturing facilities) and addresses corresponding to the manufacturing facility indices $\beta i$ are listed.

(Composition of Each Section)

In the species sorting section 231, data on orders received for manufacture Ji (date of delivery, shape, species (standard products, standard custom made products, non-standard custom made products, personnel in charge, number of articles, name of customer and the like) are inputted and these orders received for manufacture Ji will be classified as for standard products, standard or non-standard custom made products.

In the standard product manufacture facility decision section 235, orders received for manufacture Ji for standard products is deciphered and if the order received for manufacture Ji for this standard product is stored in the stock file 233, from addresses and the like of the manufacturing facility of this product in stock (standard product), the manufacturing facility ia most nearest to the customer will be searched.

Also if storage or numbers stored of the standard product for which order was received does not exist in the stock file 233, the standard product manufacturing facility decision section 235 will transfer the order for the standard product received for manufacture data Ji to the manufacture facility decision section 237.

At the manufacture facility decision section 237, for each order received for manufacture Ji (standard products, standard type, non-standard type) inputted, the order received for manufacture Ji will be analyzed and the manufacture facility decision index data will be searched (for indices as high as possible) for facilities which may satisfy the date of delivery (including the date of shipment) and specifications of the order received for manufacture Ji, and manufacture facility with the index will be searched from the manufacture facility master file 245 as the optimum manufacture facility ip and this optimum manufacture facility ip and the order received for manufacture will be transmitted to the process advancement management section 239 via the network.

At the process advancement management section 239, the names of products based on data of orders received for manufacture Ji will be assigned to each process of the process advancement management table KN of the most suitable manufacture facility determined by the manufacture facility decision section 237 and will be forwarded to the manufacture facility as the process schedule for the manufacture facility.

For instance, on the time schedule axis of machine names A,B,C and the like of the factory unit, a process advancement management table KN in which names of products being processed are filled will be formed in the process advancement master file 243.

Also condition of machines in actual operation stored in the achievement file 246 forwarded via the private network 216 is read every fixed time (for instance 10 minutes) and this condition of machines in actual operation is written in the process advancement management file KN of the particular manufacture facility generated in advance.

Also at the process advancement management section 239, the condition of machines in actual operation is compared with the process advancement management table KN of its manufacture facility, and if there is a difference between performance and the scheduler of the process advancement management table KN exceeding a designated value, an alarm is sent to warn possible delay in the date of delivery.

The section for computing manufacturing facility decision index 241 starts synchronously with the process advancement management section 239 and by reading the product allocated to each machine in each factory unit from the process advancement table generated in the process advancement master file 243, finds the factory load percentage.

Then, from the number of materials and the like stored, the machine process capacity, the process cost the date of delivery and the like of that factory stored in the manufacturing facility master file 245, the material index, the process index, the cost index, the delivery index are found and stored in the manufacturing facility decision file 247 as the manufacturing facility decision index data of that factory. Then from each index of the manufacturing facility decision data, the manufacturing facility index $\beta i$ will be found for each manufacturing facility and stored in file 247.

(Explanation of the Operation)

The operation of the embodiment described above will be explained with reference to FIG. 13 to FIG. 21.

Figure 13:
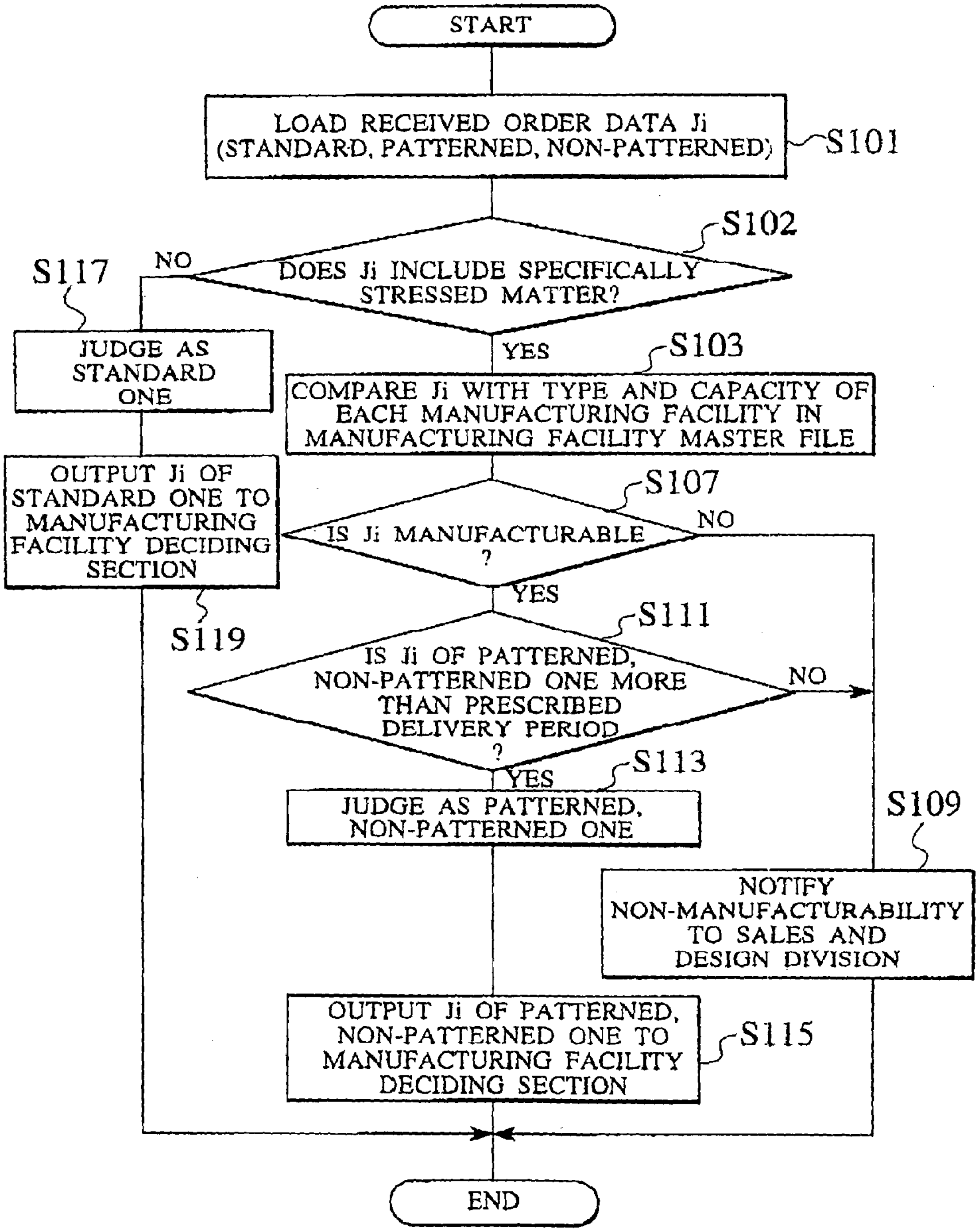
FIG. 13 is an illustration explaining the operation of species sorting system.

As shown in FIG. 13, data Ji (standard products, standard custom made products, non-standard custom made products) on orders received for manufacture from the business or design section is written in the program of the optimum program scheduler 230 (S101). As for drawings however, the pattern number and parameters (or CAD data) will be transmitted for patterned custom made products, and shape data (or handwritten drawings) will be delivered for non-standard products.

This data Ji on orders received for manufacture include the company code, instructed date of delivery and the like in addition to the catalog number Ci.

As shown in FIG. 15, in the case of patterned custom-made products, the data include the catalog number Ci and dimensions, corner R and the like (called in general, dimension data ki).

Also in the design server as the design management system 57, the drawing of this standard (patterned) customer made product is stored in correspondence to the order receipt number.

Figure 17:
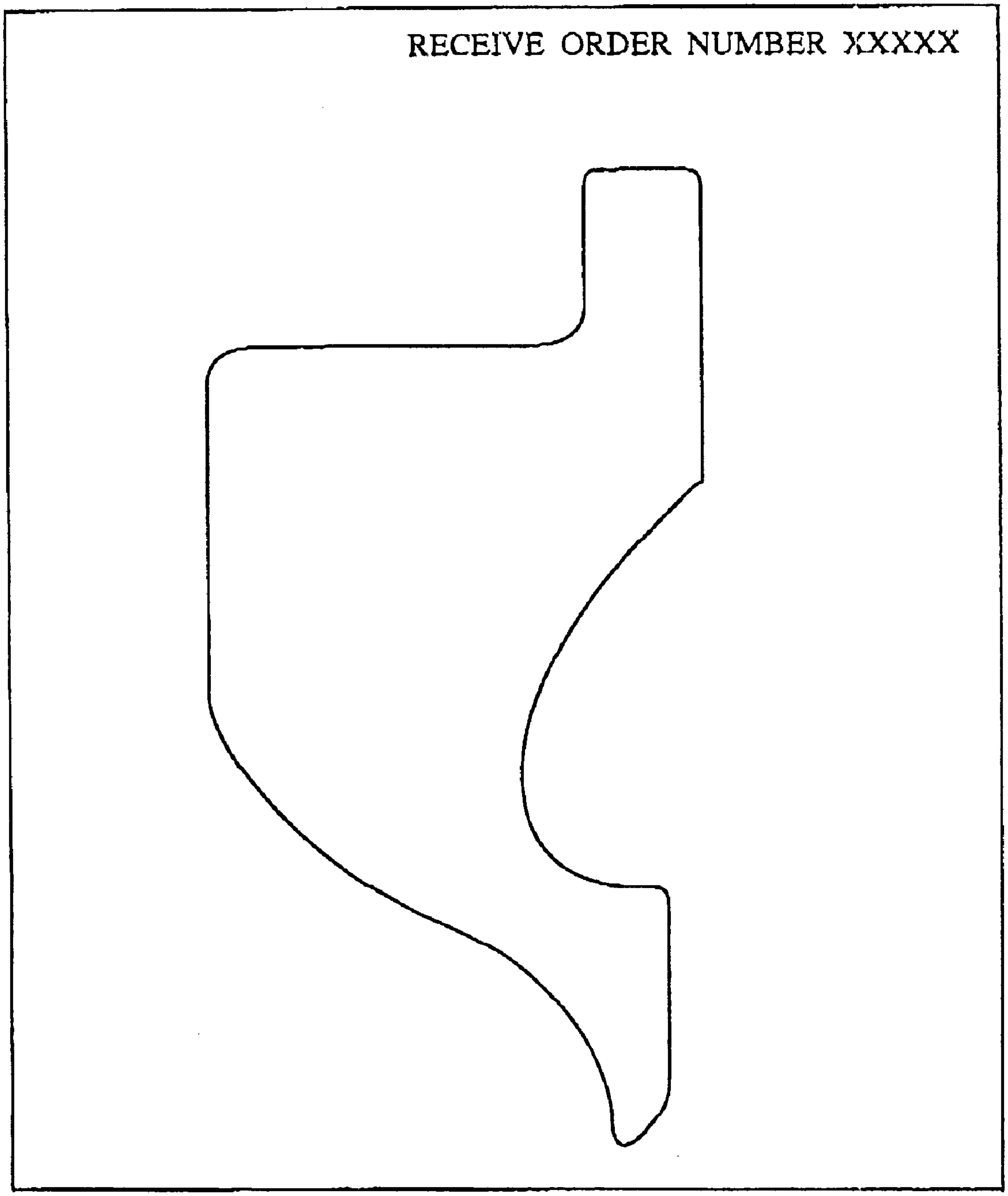
FIG. 17 is an illustration of a drawing of a non-fixed form custom made product.

Furthermore the data (not including the catalog number and dimension data ki) for non-standard products designed at the design section includes similar product numbers mi of the non-standard product as shown in FIG. 16. This non-standard custom-made product data also includes order receipt numbers as shown in FIG. 17.

Next the species sorting section 231 of the optimum production scheduler 230 judges whether there are any matters that should be stressed especially (peculiar note) in the data Ji on orders received for manufacture of the business section or the design section (S103). Matters that should be stressed especially (peculiar note) are dimension data ki or similar product number mi or welding, wire discharge etc.

Next, when it is judged that there are matters which should be stressed especially (peculiar note) in the data Ji on orders received for manufacture in step 103, the species sorting section 231 compares the peculiar notes with the type, capability etc. of each machine stored in the manufacturing master file 245 (S105) and judges whether the data Ji on orders received for manufacture may be processed or not (S107). For instance if wire discharge processing is included in the peculiar note, it is judged that processing is not possible and when the entry is dimension data ki or similar product numbers mi, it is judged that processing is possible.

Also when it is judged that processing is impossible in step S107, processing impossible will be notified to the sender (business or design section) of the data Ji on orders received for manufacture (S109).

That is in steps S103, 105, 107, it is judged whether data on the order received for manufacture Ji is for standard products or an especially stressed matter (peculiar note) standing for standard custom made products or non-standard custom made products.

If it is judged that processing is possible in step S107, judgment is made whether the date of delivery in the data Ji on order received for manufacture is longer than the prescribed date of delivery (for instance 1 day) (S111).

If it is judged that data Ji on the order received for manufacture (manufacture order data Ji) shows that the date of delivery is longer than prescribed in step S111, it is judged that the manufacture order data Ji is for standard (patterned) custom made products or non-standard (non-patterned) custom made products which may be manufactured (S113) and this manufacture order data Ji for standard or non-standard is sent to the manufacture facility decision section 37 (S115). Also if it is judged in step S603 that there are no peculiar notes in the manufacture order data Ji, it is judged that the manufacture order data Ji is for standard products (S117) and this manufacture order data Ji is sent to the standard products manufacture facility decision section 35 (119).

At the standard products manufacture facility decision section 235 (also called the stock scheduler), stock information for each manufacture facility is read from the stock file 233 and the manufacture facility which possess the number of standard products ordered in the manufacture order data Ji is determined.

Also if the ordered standard product does not exist in each storage facility (manufacture facility), the manufacture order data Ji of the standard product is sent to the manufacture facility decision section 237 to determine the most suitable manufacture facility.

Also each time the manufacture facility where the standard product of the manufacture order data Ji is determined, the standard product manufacture facility decision section 235 judges the number of left over and, if there is a shortage, will order production of the standard product automatically. This process will be explained below with reference to the flow chart of FIG. 18.

Figure 18:
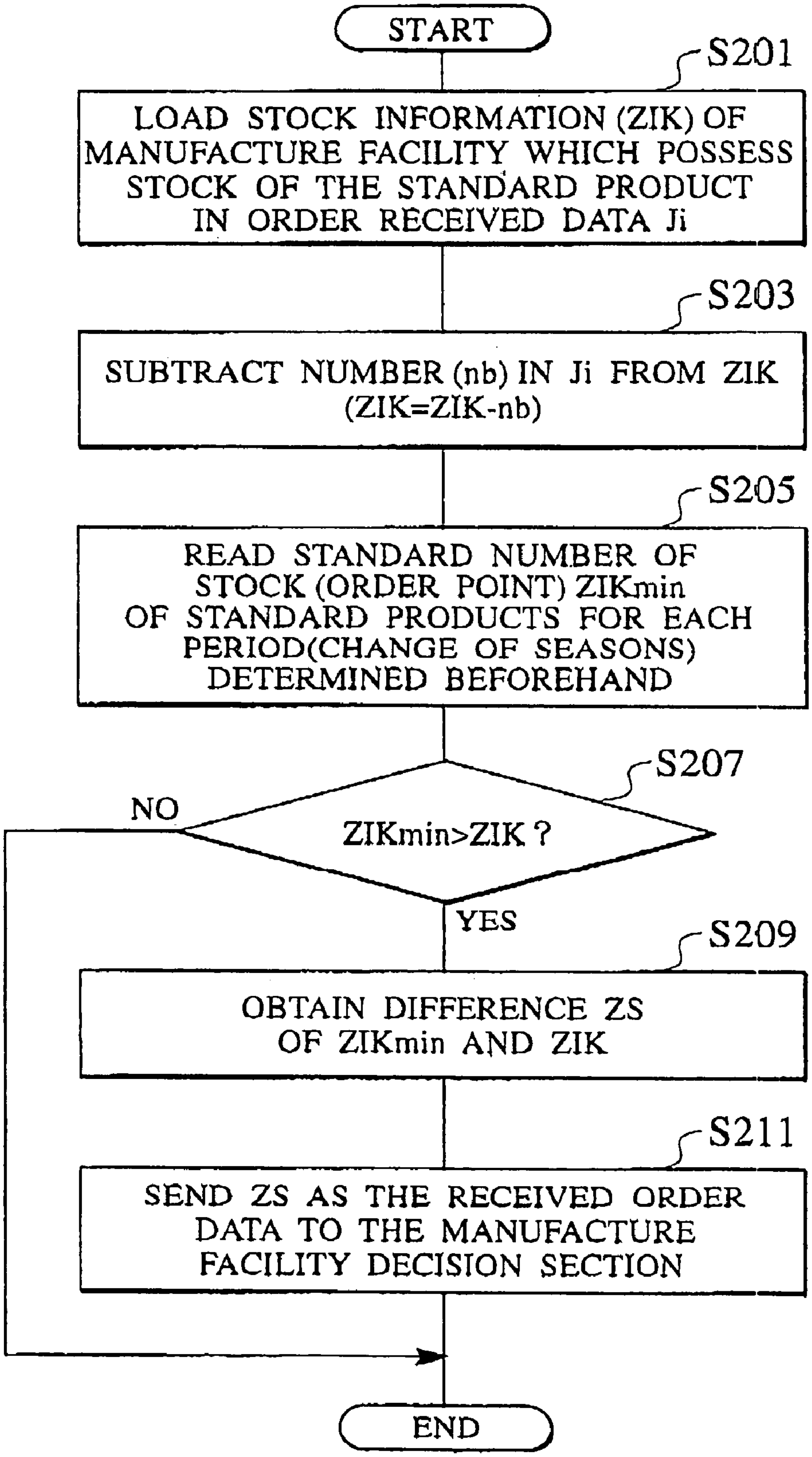
FIG. 18 is a flow chart explaining the operation of a section for determining production facilities for standard products.

As shown in FIG. 18, following the decision of the manufacture facility where the standard product is in stock, the standard product manufacture facility decision section 235 will load the stock information (ZIK) of the manufacture facility where the standard product of the manufacture order data Ji is in stock (S201).

Next the number (nb) of standard products ordered for manufacture Ji is subtracted from the stock information (ZIK) of the manufacture facility (S203).

Then the standard number in stock (Zikmin) of standard products for each term found beforehand is read (S205). This standard number in stock (also called order point) for each term is the standard number in stock which must be stored according to, for example, seasons when orders for standard products are numerous and seasons when few and are found beforehand by standard number in stock maintenance process not shown in the figure for each designated term.

Next the standard number in stock (ZIKmin) of standard products for each term and the stock information (ZIK) of the manufacture facility are compared and judgment is made whether the stock information (ZIK) of the manufacture facility is less than the standard number in stock (ZIKmin) of standard products (S207).

If in step S207 the stock information (ZIK) of the manufacture facility is less than the standard number in stock (ZIKmin) of standard products, the difference in number ZS between the stock information (ZIK) of the manufacture facility and the standard number in stock (ZIKmin) of standard products is found (S209). Next this difference number ZS is outputted to the manufacture facility decision section 237 as the data on orders received for manufacture Ji (S211) and have it determine and place an order to the manufacture facility which at present may manufacture the difference number ZS of standard products. The customer's name of this order received for manufacture Ji may be, for instance, the production section of the company.

Figure 19:
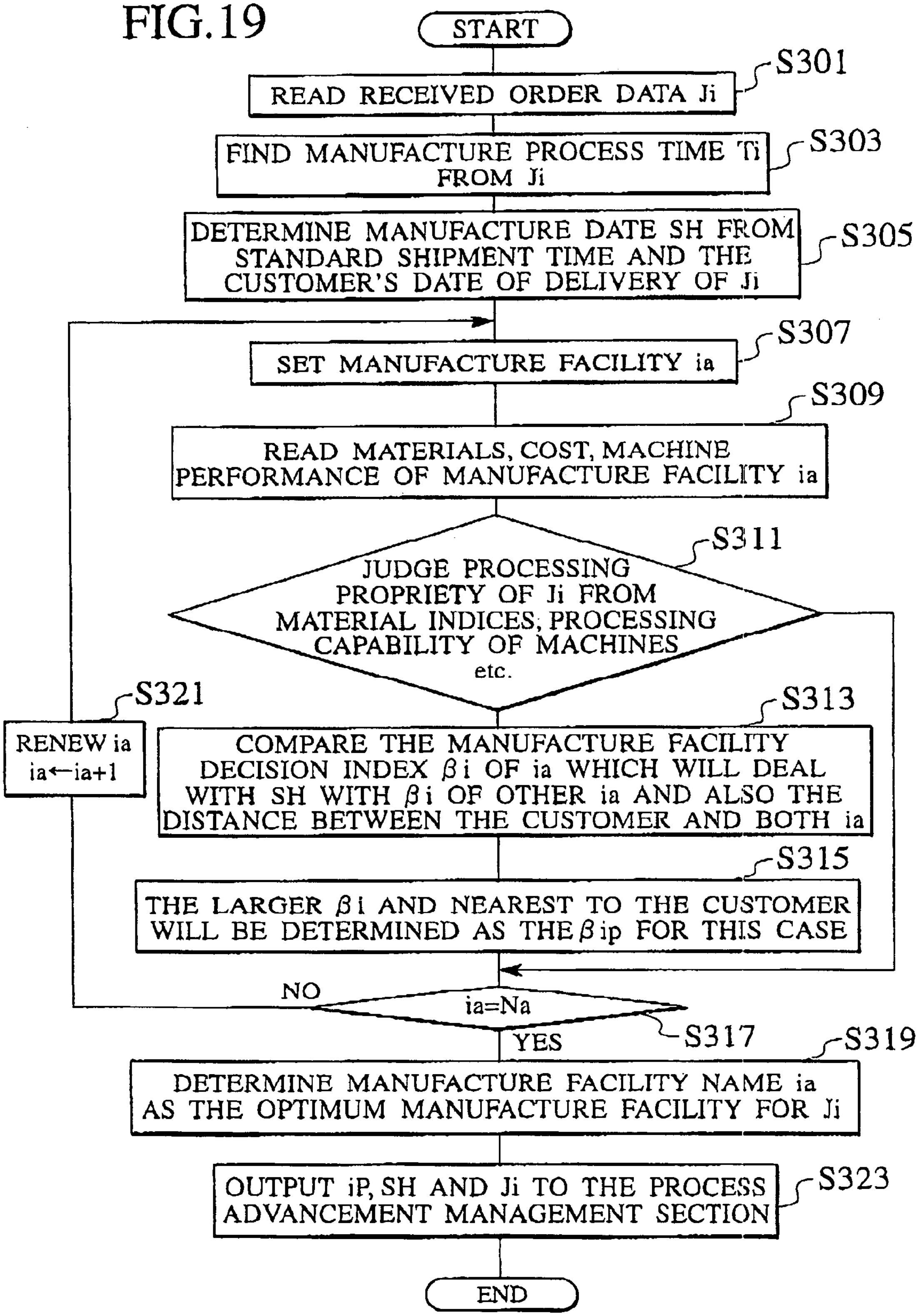
FIG. 19 is a flow chart explaining the operation of a section for determining production facilities.

Next processing in the manufacture facility decision section 237 will be explained using the flow chart shown in FIG. 19.

The manufacture facility decision section 237 reads the order data received for manufacture Ji (standard product, fixed form product, non-fixed form product) inputted (S301) and finds the manufacture processing time Ti from the manufacture order data Ji (S303).

Next from the standard time for shipment and the customer's date of delivery of the manufacture order data Ji and the manufacture processing time Ti, the date for manufacture SH is determined (S303). For instance if the customer's date of delivery is October 10, the standard time for shipment 48 hours (2 days) and the manufacture processing time Ti 3 hours, the date for manufacture will be set to October 7.

Then the manufacture decision section 237 will assign a number ia to the manufacture facility of the manufacture facility master file 245 (in the following will be simply denoted manufacture facility ia) (S307) and read out the material index, production cost index, processing capacity index of the machine etc. found in the section for computing facility decision indices 241 and stored in the manufacture facility decision index file as shown in FIG. 11(*a*) (S309).

The material index is an index determined from the number of materials in storage, the material species, length etc. The production index is determined from labor costs, area of location etc. and is different for standard products, fixed form products, non-fixed form products.

Also the machine processing capacity index is determined by the machine type and number of machines.

Next the manufacture facility decision section 237 judges from the material index, production cost index, machine processing capacity index etc. of the manufacture facility ia set in step S307 whether it is possible for the manufacture facility ia to process the manufacture order data Ji (S311).

If in step S311 it is judged that processing is possible at manufacture facility ia, the manufacture facility decision index βi which is stored in the manufacture facility decision index file 247 as shown in FIG. 11(*d*) is compared to the manufacture facility decision index βi of other manufacture facilities ia and the distance between the customer and both manufacture facilities will be also compared (S313).

Next from the comparisons made in step S313, manufacture facility decision index of the manufacture facility closer to the customer and with a larger value of the manufacturing facility decision index βi will be chosen as the manufacture facility determined index β1p for the time being (S315). That is, the manufacture facility that may process the manufacture order data Ji with low cost, low shipment cost and with unoccupied machines is located.

Next, it is judged whether other manufacture facilities ia exist in the manufacture facility master file 245 (S317) and if there are, the manufacture facility ia is renewed and the process is returned in step S307 (S321). And judgment is made whether the new manufacture facility ia can perform the process, whether the production cost is low and whether there are unoccupied machines.

If it is judged in step S307 that there are no other manufacture facilities ia, the manufacture facility determined index βip determined in step S315 will be determined in this case as the optimum manufacture facility ip for the data on orders received for manufacture (manufacture order data) Ji (S319). In other words, from a plural number of manufacture facilities, the most suitable manufacture facility which may process the manufacture order data Ji with low cost and has unoccupied machines will be searched automatically.

Upon determination of the most suitable manufacture facility ip, for fixed form custom made products and standard products, the manufacture facility decision section 235 reads from the figure file (not shown in the figure) figure data which corresponds to the order number from the manufacture order data Ji and sends this figure data to the most suitable manufacture facility. For fixed form custom made products, this figure data is transmitted as a drawing data as shown, for instance, in FIG. 21. Together with this drawing data, the work instruction number, the specified date of delivery, name of the manufacture facility etc. will be transmitted.

Then the manufacture facility decision section 235 forwards the optimum manufacture facility ip (name or number), date of manufacture SH determined in step S305 and the data on order received for manufacture Ji to the process advancement management section 239 (S323).

Figure 20:
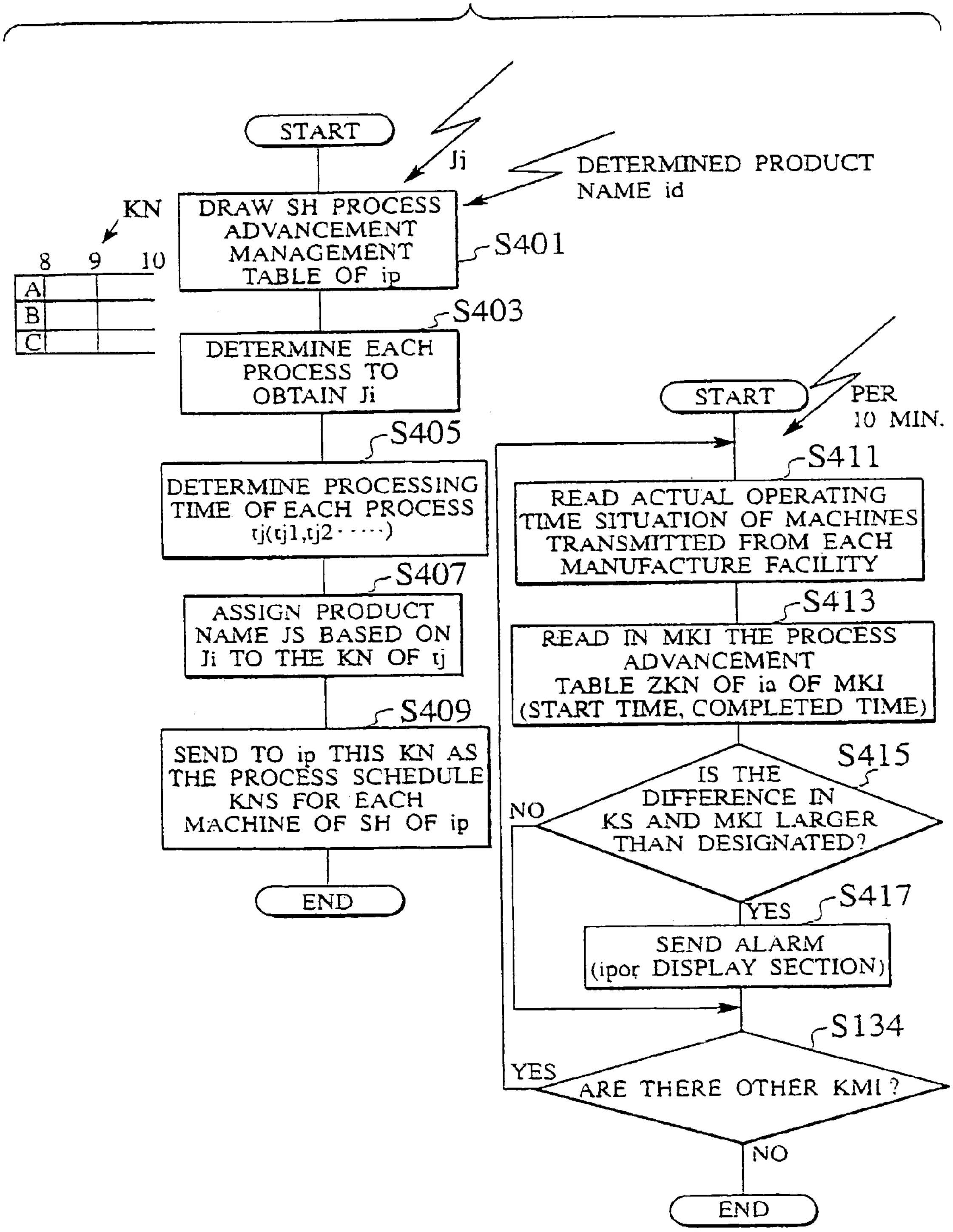
FIG. 20 is a flow chart explaining the operation of the work progress management section.
Figure 21:
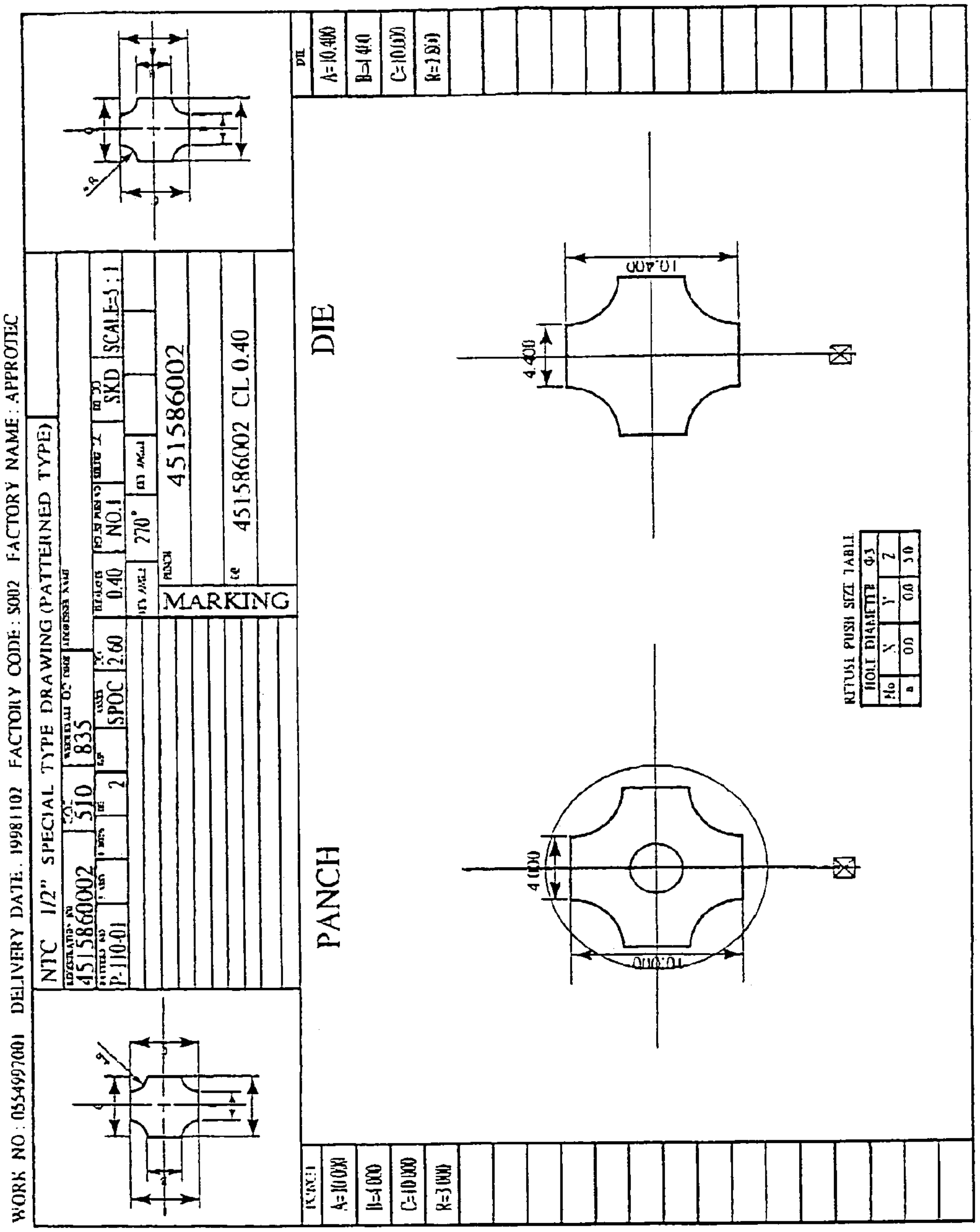
FIG. 21 is a drawing illustrating a diagram data of a fixed form custom made product.

Next the operation of the process advancement management section 239 will be described by use of the flow chart shown in FIG. 20.

The process advancement management section 239 selects from the manufacture facility decision section 239, the process advancement management chart KN which corresponds to the date of manufacture SH of optimum manufacture facility ip (S401).

Next the type of process (the type of machine) to produce the product according to the manufacture order data Ji is found (S403).

Then the periods of processing time tj (tj: t1, t2, and the like) to produce the product based on each process of the manufacture order data Ji is found (S405) and to each period of processing tj corresponding to the period of time in the process advancement management chart KN, the name of the products JS based on the manufacture order data Ji (it may be the product number, order number) are assigned (S407). For example, the product JS based on the manufacture order data Ji may be assigned to each machine on the time schedule axis of each machine name A, B, C, and the like of each factory as shown in FIG. 12.

Next the process advancement management table KN made in step 407 is sent to the optimum manufacture facility ip as the process schedule KNS of each machine on the date of manufacture SH at the optimum manufacture facility ip (S409).

Also the process advancement management table KN will be renewed based on the actual state of operation of the machines as follows. For instance, every 10 minutes measured, the actual state of machine operation MKI sent from each manufacture facility is read (S411) and the actual state of machine operation MKI (manufacture facility name, product name, date and time started, date and time completed) for each process (machine) from the manufacture facility is read into the process advancement management table KN of the manufacture facility ia of the actual state of machine operation MKI (S413).

The date started and the date completed will be inputted by the worker on the site and together with the date started or completed, the manufacture facility name, product name and the process name will be inputted as a bar code and transmitted to system 53 as the actual state of machine operation MKI.

In other words, the process advancement management table KN in step S401 indicates the present state of operation of each machine at each manufacture facility. For instance FIG. 12 shows an example of the results of the actual state of machine operation reflected onto the process advancement management table KN for the case when machine A is assigned to product JS1 from 8 to 9 o'clock and shows that the product JS1 was completed at 10 o'clock (part with diagonal lines).

Next the process advancement management section 237 judges whether the difference in the process scheduler KNS for each machine of the optimum manufacture facility ip produced in step S409 and the actual state of machine operation MKI read in the process advancement management table KN is larger than designated (S415). If the difference is larger than designated, an alarm that signals that processing in this stage of work is delayed than planned will be sent out (S417).

This alarm is displayed on the process terminal of the optimum manufacture facility ip or the terminal at the production management section or the display of the server together with the data on orders received for manufacture Ji.

Next it is judged whether there are other actual state of machine operation MKI transmitted (S419) and if there are other actual state of machine operation MKI transmitted, the procedure is returned to step S411 and the actual state of machine operation is written in to the process advancement management table KN.

The section for computing manufacture facility decision indices 241 reads this process advancement management table KN for each manufacture facility and evaluates the load index of the manufacture facility.

Also the optimum production scheduler 230 accumulates the actual process cost etc. (for example accumulates in the achievement file) and sends this to the design system 57, judges the completion of production of fabricated products from the process achievement management table KN and, at the time of completion of production, automatically issues shipment order slips to the shipment section of the manufacture facility and automatically issues delivery order slips to the transport section so that delivery may be made in time for the customer's date of delivery.

Figure 22:
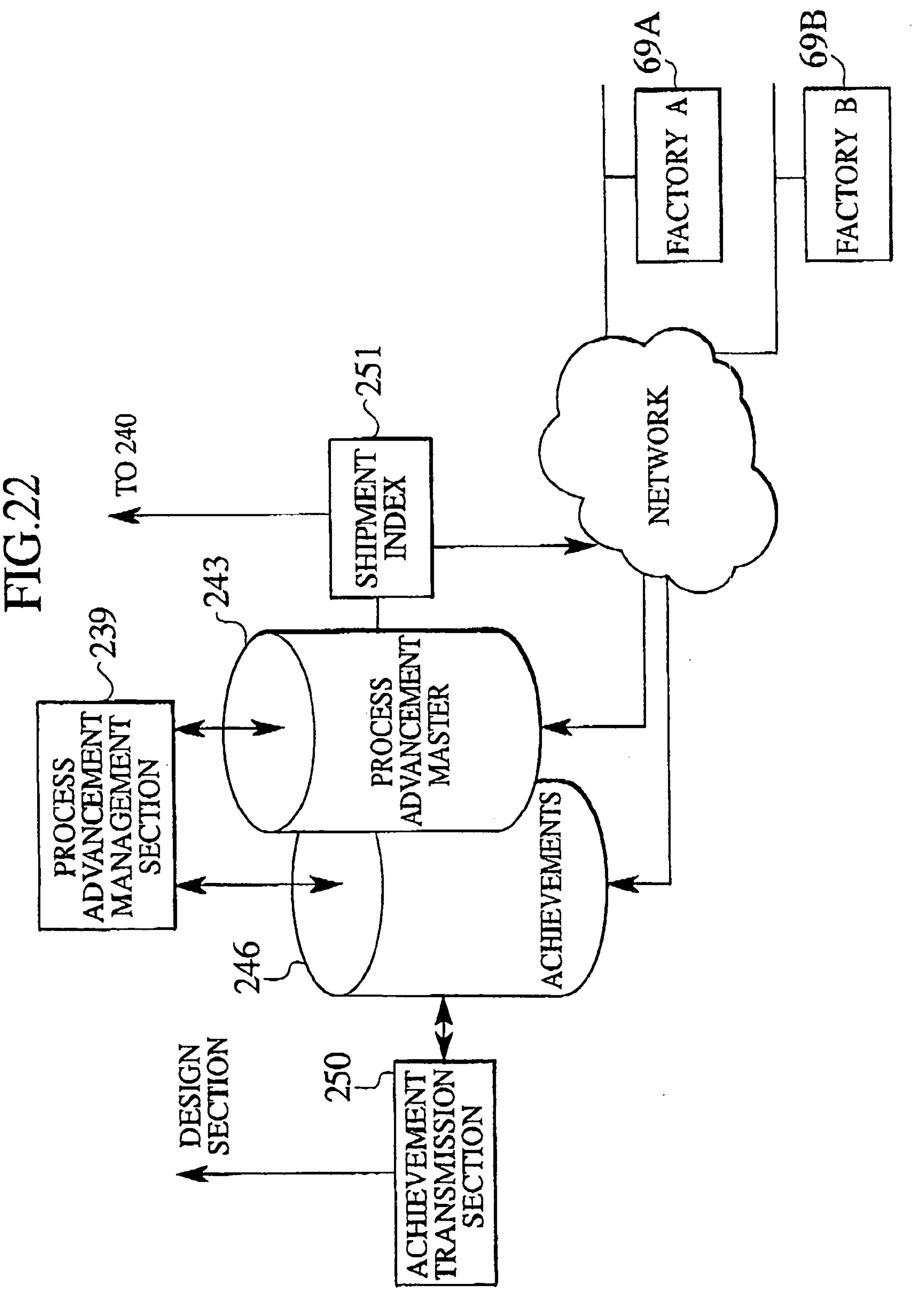
FIG. 22 is a drawing illustrating the operation for the first embodiment.

FIG. 22 is an operation description figure that shows the operation of the embodiment.

As shown in FIG. 22, the achievement transmission section 250 transmits the actual machine operation condition (name of manufacture facility, name of process, name of product, actual time of commencement, actual time of completion) and the actual unit cost of each process to the design management system 57 each designated period and reflects it on the design quotation.

Also the shipment instruction section 251 observes conditions of the process advancement management table KN of each manufacture facility of the process advancement master 243 and forms a shipment voucher (order number, customer's date of delivery, date of delivery, customer's name, etc.) for products which have gone through each process and fabricated and transmits it to the manufacture facility.

Along with formation of the shipment voucher, the shipment instruction section 251 transmits delivery instructions which consists of the factory shipment date, product number, order number, number of products, weight of the product, customer's name, address, etc. to the shipment agent decision section 240 and has the fabricated product delivered not later than the customer's date of delivery.

In other words, by reading in data on orders received for manufacture Ji to the optimum manufacturing scheduler 1, this system chooses the most suitable manufacture facility (including orders to outside suppliers) and manages shipment.

Figure 23:
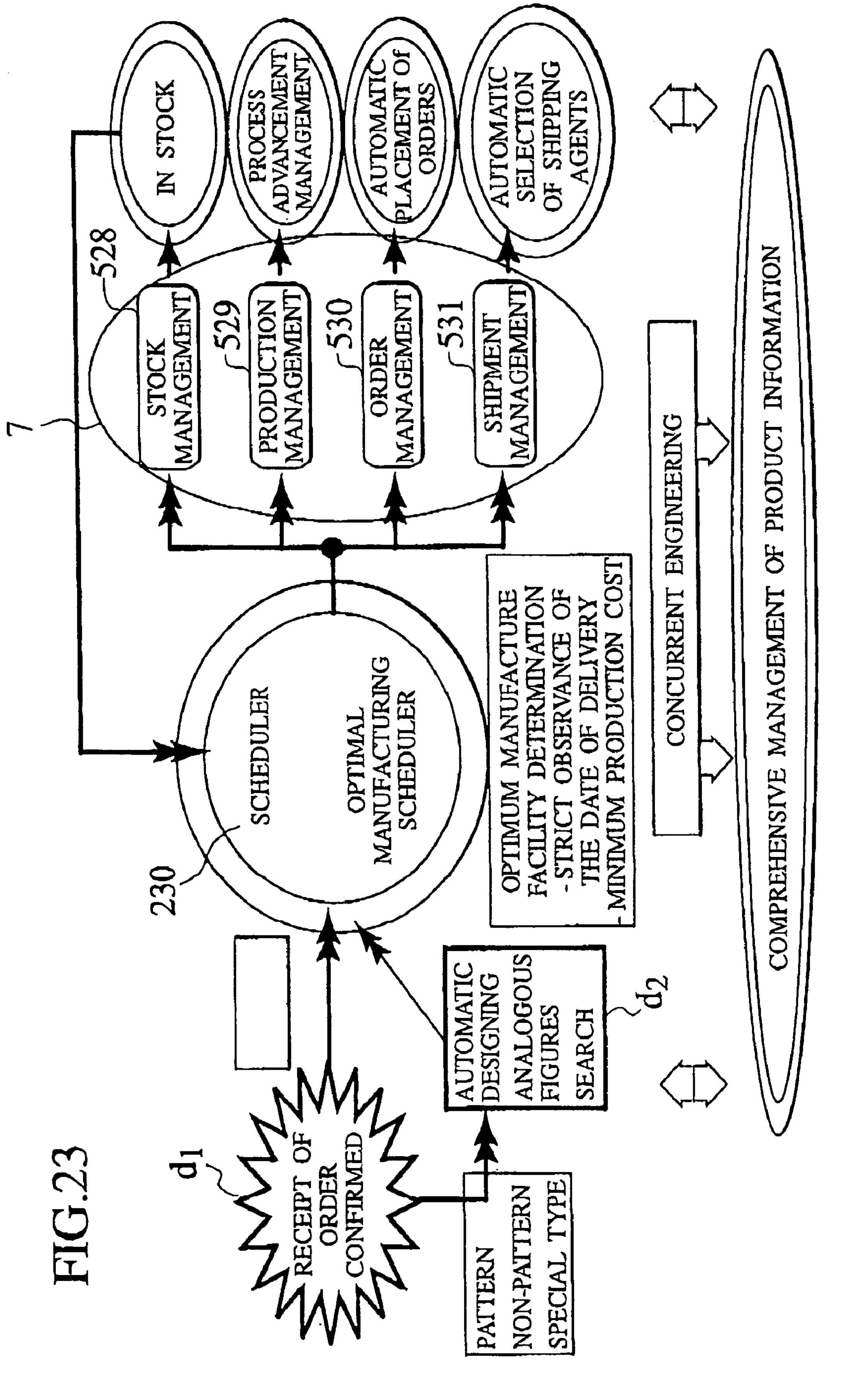
FIG. 23 is a drawing illustrating the overall operation of this embodiment.

FIG. 23 illustrates the total operation of the optimal manufacturing scheduler 230.

As shown in FIG. 23, when the order received is fixed (d1), the data on the order received for manufacture is classified into standard products or fixed form custom made products (also called patterned special type products) or non-fixed form metal molds (also called non-patterned special type products) according to the type of the metal mold. In the case of standard products, the data on the order received for manufacture Ji is sent automatically to the optimal manufacturing scheduler 1.

In case the data on the order received is for patterned or non-patterned special type products, judgment is made at the design management system 57 whether automatic designing is possible or not. In more detail, for patterned special type products, automatic design will be made by use of similar type drawings and for non-patterned special type products, design drawings will be made by use of similar type drawings. The drawings and the data on orders received for manufacture Ji will then be sent to the optimal manufacturing scheduler 230 (d2).

The data on orders received for manufacture Ji will then be read into the optimal manufacturing scheduler 1 and on basis of the manufacturing facility decision indices (which consist of factory load rate based on the machine unit operational conditions, processing capability, storage index based on materials in stock etc.) the selection of the manufacturing factory (including outside suppliers) and shipment will be managed. In more detail, from various information in the stock management file 528, production management file 529, order management file 530 and the shipment management file 531, the manufacturing facility will be determined automatically and shipment will be made to the customer automatically.

As described above, according to the scheduler 230, in compliance with the customer's date of delivery and amount of products ordered, data on the order received for manufacture which contains information on the production of the product will be inputted and the manufacture facility which has the highest manufacture facility decision index and which is most nearest to the customer will be selected as the most suitable manufacture facility. Therefore by use of the scheduler 230, the product may be provided within the customer's date of delivery at low cost and as soon as possible.

Figure 24:
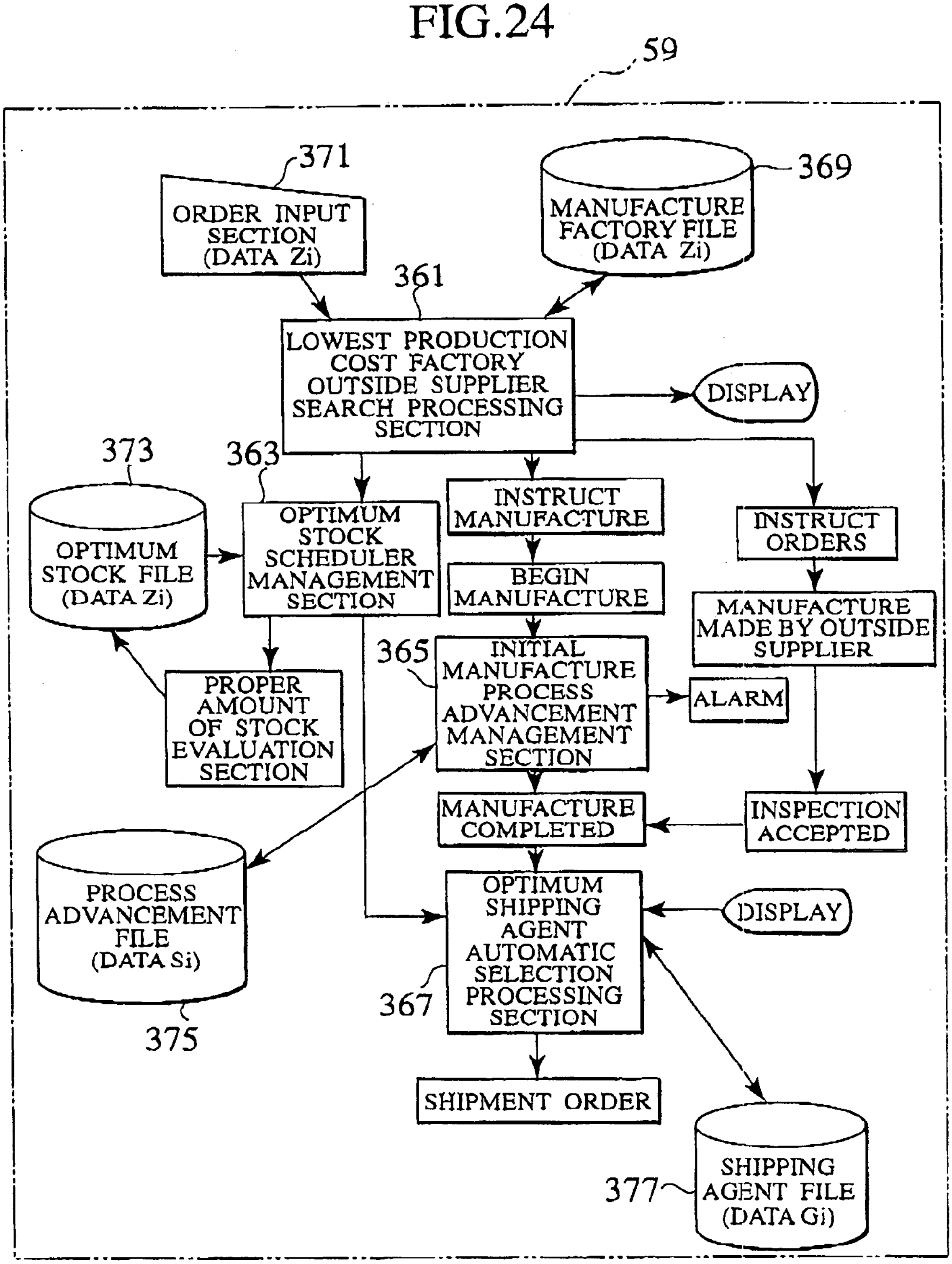
FIG. 24 is a schematic structure of the 2$^{nd}$ embodiment for an optimum production scheduler.

FIG. 24 shows another embodiment 360 of the optimal manufacturing scheduler.

As shown in FIG. 24, this embodiment 360 includes a processing section 361 which retrieves firm factories and outside supplier facilities which may produce the ordered product at the lowest cost, optimal stock scheduler processing section 363, manufacturing process advancement management processing section 365 and optimal shipment agent automatic selection processing section 367.

The firm factories and outside supplier retrieval processing section 361 reads the data Mi which is stored in the manufacturing factory file 369 into the program and judges from the data Ji inputted from the order input section 371 and details of processing, whether stored products should be used or manufactured in the firm or an order should be placed to an outside supplier.

The data Mi in the manufacturing factory file 369 includes items such as name of the manufacturing factory, the present load rate, location of the factory, processing capability of the factory, process cost etc in 1 record. Also the data Ji inputted from the order input section includes data on the name of the product, date of delivery, location of delivery, name of delivery destination etc.

The optimal stock scheduler-processing section 363 reads into the program data Zi stored in the optimal stock file 373 and judges whether on drawing out a stored product, the amount of that product stored becomes less than proper and if it becomes less than proper, data Zi will be rewritten.

The data Zi in the optimal stock file 373 stores in 1 record items such as names of products stored, present number stored, proper number in stock etc.

The process advancement supervision management section 365 reads data Si stored in the process advancement file 375 and if advancement is made in processing the metal mold parts, data Si will be revised and if the designated process is not completed in the planned schedule, an alarm will be sent out to give a warning.

The data Si in the process advancement file 375 stores in 1 record, items such as the name of the processed product, judgment of the start and completion of process 1, judgment of the art and completion of process 2 etc.

In the optimum shipping agent automatic selection processing section 367, data Gi stored in the shipping agent file 377 is read into the program and decision is made on the optimum shipping agent who may deliver the completed metal mold parts in the shortest time and instructed to ship.

The data Gi in the shipping agent file stores in 1 record items such as the names of the shipping agents, locations, average shipment time etc.

According to the scheduler 360, when the order for manufacture data which consists of the customer's date of delivery, number of the product ordered and information on manufacture of the product is inputted, the manufacture facility with the highest manufacture facility index and most nearest to the customer will be chosen as the most suitable manufacture facility. Therefore the product may be provided within the customer's date of delivery at low cost and at the earliest date.

FIG. 25 to FIG. 33 shows details of the visit support system that support salespersons visits to the customers.

Figure 25:
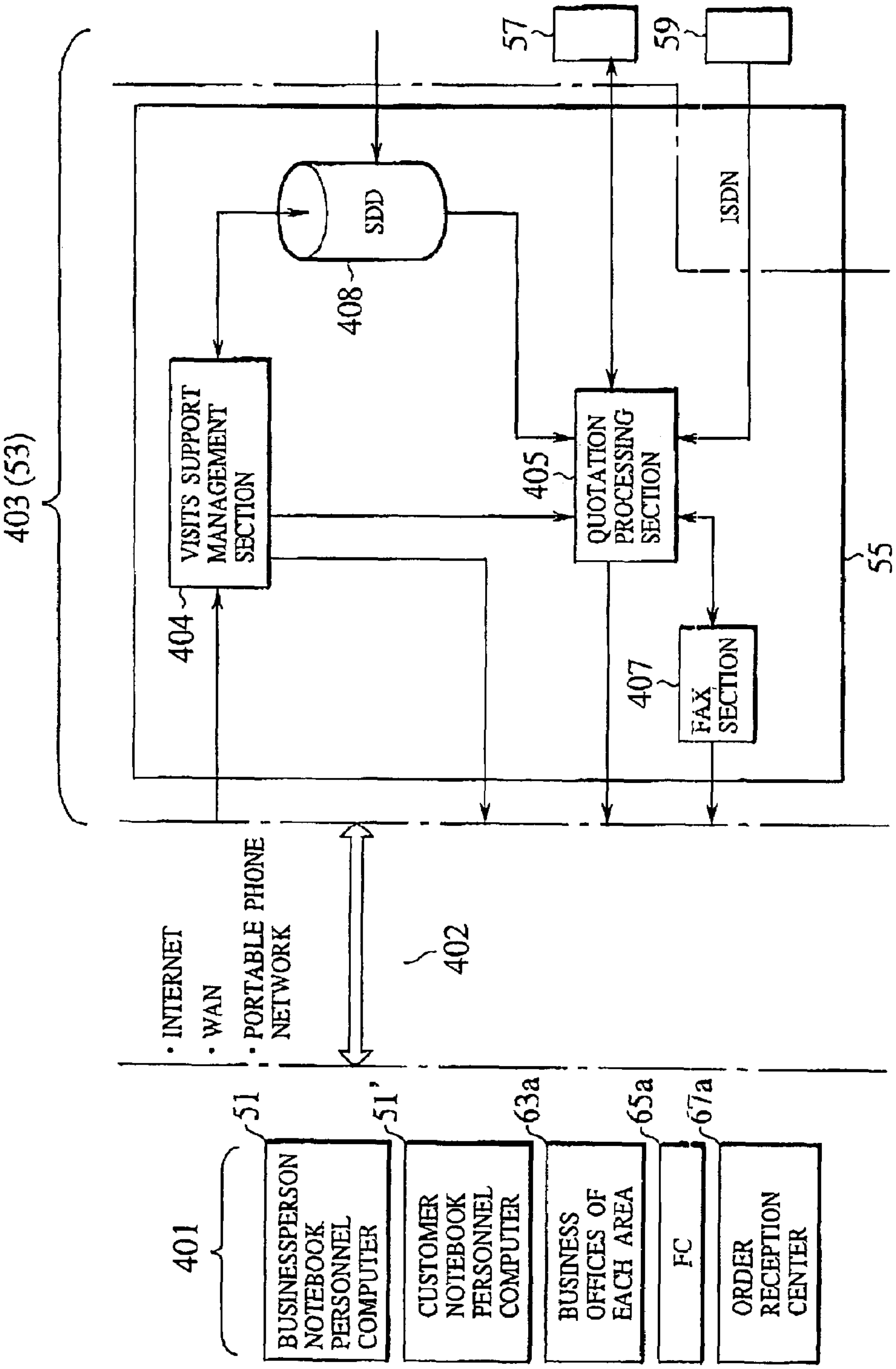
FIG. 25 is a schematic structure of an embodiment for the visit support system.

As shown in FIG. 25, the environment of the visit support system used in the visit support system 53 of this embodiment is as follows.

That is, the notebook-sized personnel computer 51 of the salesperson as the client 401, the business office at various areas, orders reception center etc. 63*a*, 65*a*, 67*a* acquire information desired from the server 403 at the main office which acts as the information management system 53 through network 402 (internet, WAN, mobile phones etc.). The main office server 403 sends to the salesperson in charge of the area, all the information related to the customer (in the following called business activity support information) and the map information of the area. Following instructions, the client 401 displays the visit support display using information sent from the main office server.

The server 403 acting as the information management system 53 is provided with visit support management section 404 and database 408 and facsimile section 407 and sales management system 55 that is provided with a quotation management section 405.

In the database 408, staff information (results of visits, visit schedule etc.) that corresponds to the staff code to specify each salesmen and customer information (basic information of the customer, payment information etc.) and promotion information (including business points) etc. are stored.

The visit support management section 404 receives daily information (day of visit, code of salesperson in charge, customer's code, content of visit, result of visit, next scheduled day of visit, comments etc.) and draws the staff information, customer information and promotion information (including business points) stored in the database 408. Then based on the daily information, designated data in the information will be renewed. The renewed data include day of the visit, results of the visit and business points.

Upon request from the client 401, the visit support management section 404 will forward business activity support information of the area and price information of standard products, special type products from database 408.

Upon request for quotation received from the client 401, the quotation processing section 405 will compare the request for quotation and the standard product data in the database 408 and if data on standard product which agree exists, it will notify the client 401 that request for quotation is for a standard product.

If there is a request from the client 401 for quotation of custom made products (standard type, non-standard type), the sales support management section 404 transmits the request for quotation data (date of delivery, shape etc.) to the design management system 57. Then together with transmitting the quotation result from the design management system 57, the diagram produced at the design management system 57 will be sent to the customer from the facsimile section 407.

Figure 26:
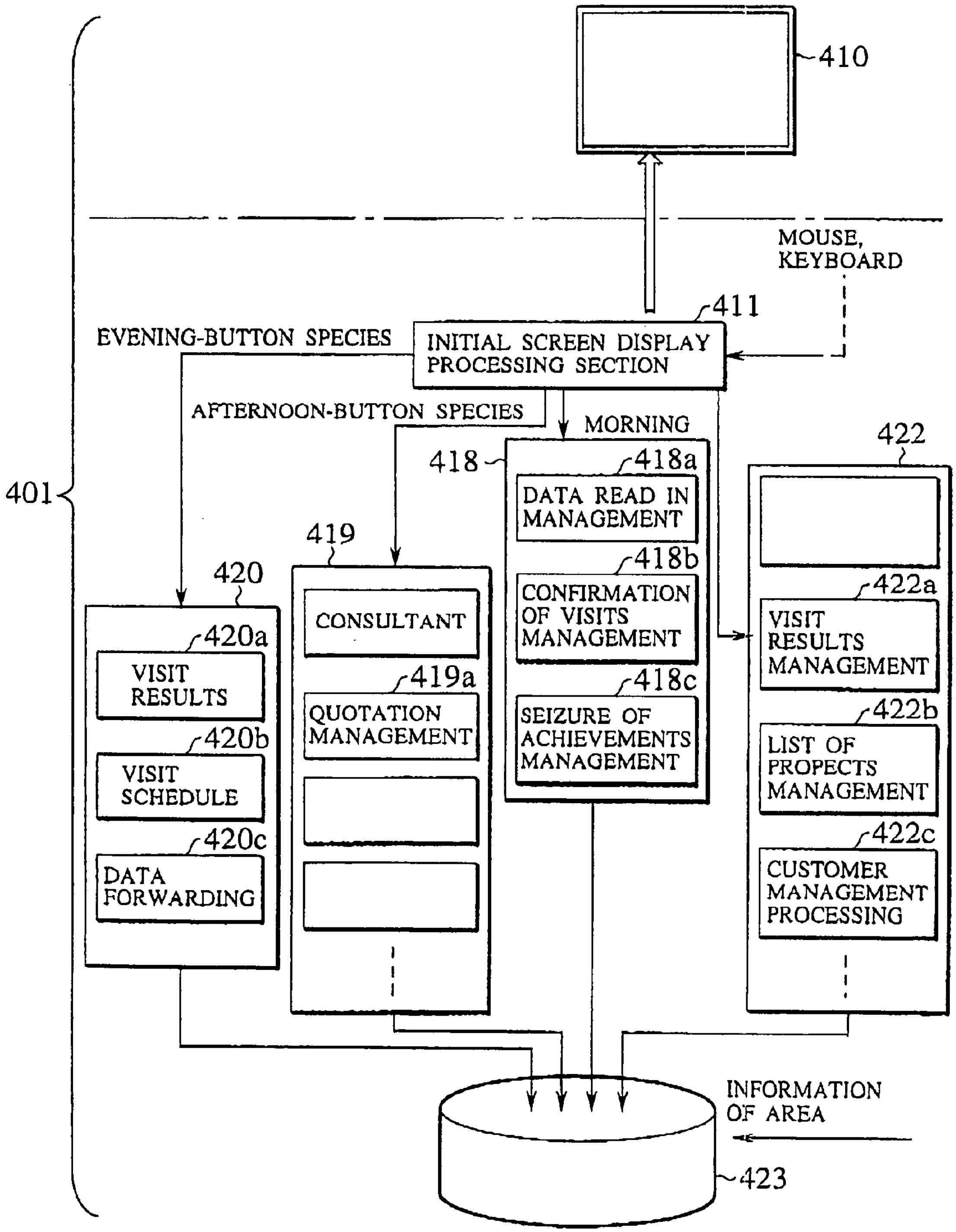
FIG. 26 is a schematic illustration of the client in the visit support system.

FIG. 26 shows the outline of the client 401 structure. In this embodiment, the client 401 consists of a notebook-shaped personal computer that the businessperson carries.

As shown in FIG. 26, the notebook-sized personal computer is provided with a initial screen display processing section 411 that displays on the screen of the display section 410, an initial display which is divided into morning area, afternoon area and evening area.

Figure 28:
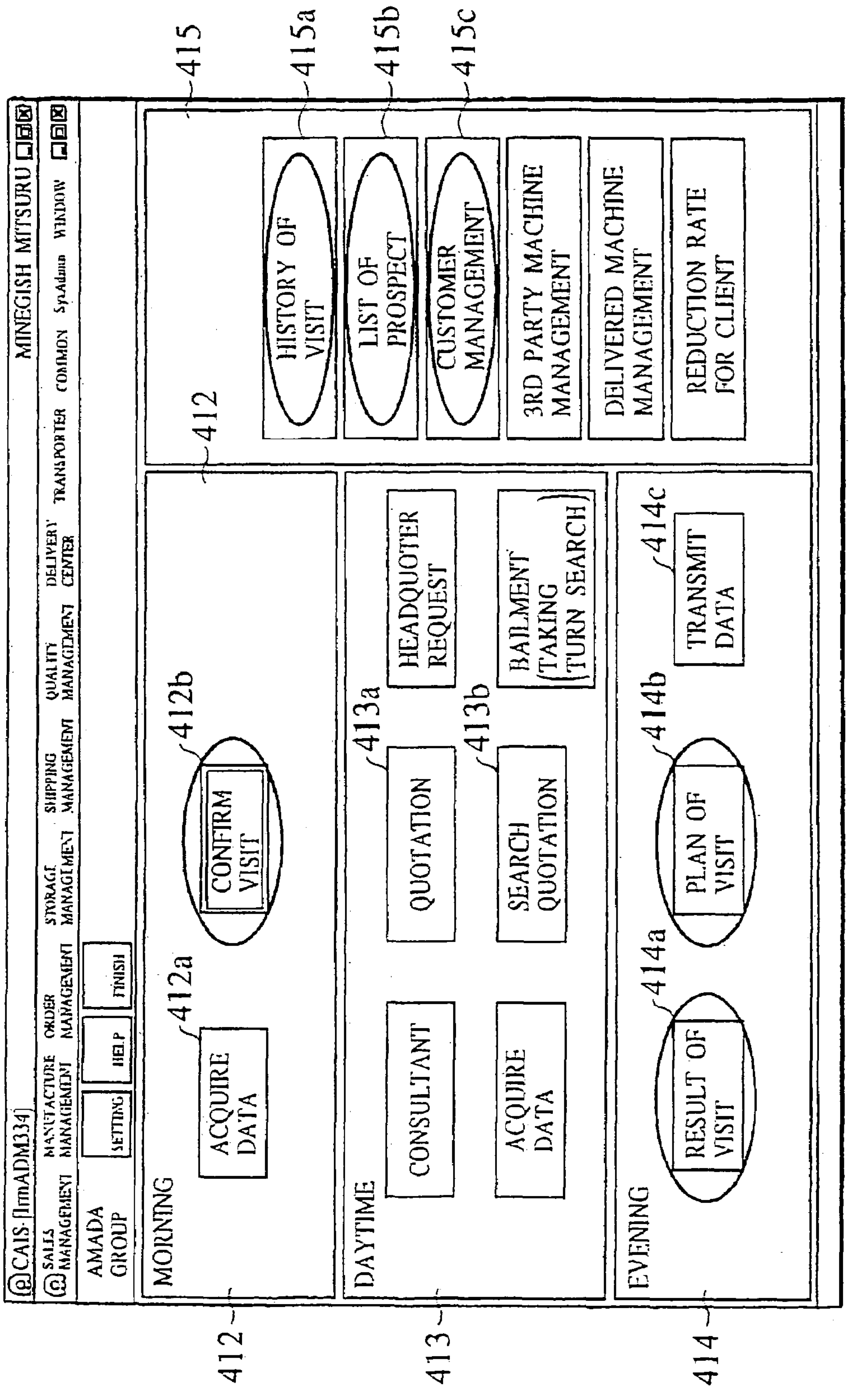
FIG. 28 is an illustration explaining the initial screen of the personnel computer that is the client.

As shown in FIG. 28, on the morning area 412 of the initial display, data read in button 412*a*, visit confirmation button 412*b* etc. are provided. The afternoon area 413 displayed below the morning area 412 is provided with a quotation button 413*a*, a quotation search button 413*b* etc.

The evening area 414 displayed in the lowest end of the initial display is provided with visit result button 414*a*, visit schedule button 414*b* and a data forwarding button 414*c*.

Also visits history button 415*a*, list of prospects button 415*b*, customer management button 415*c* etc. are provided in the right hand side area 415 of the initial display.

The businessperson selects one of the areas and one of the function buttons in the initial display by use of a mouse. When the selected area and the function buttons are selected, the type of the area and the function button is decoded and the morning work process section 418, the afternoon work process section 419, the evening work process section and other process sections 422 shown in FIG. 26 will be started up.

These process sections 418~422 are connected to the database 423. In the database 423 are stored staff members of the company (businesspersons) and all business activity support information to the customers related to customer information of the area. This support information includes contents of the visits to customers, the results of visits to customers, comments, visit schedules etc.

The morning work management section 418 is provided with a data input processing section 418*a* which transmits employed terminal code, businessman code, area code etc. to the server at the main office 403 and the visits confirmation management section 418*a* which reads number of visits made by all businesspersons and edits and displays it in a designated screen display form. This visits confirmation management section 418*a* displays, for instance, names of the businesspersons and in correspondence with the month and day calendar, the number of visits made to the customer by whom and what day.

Figure 29:
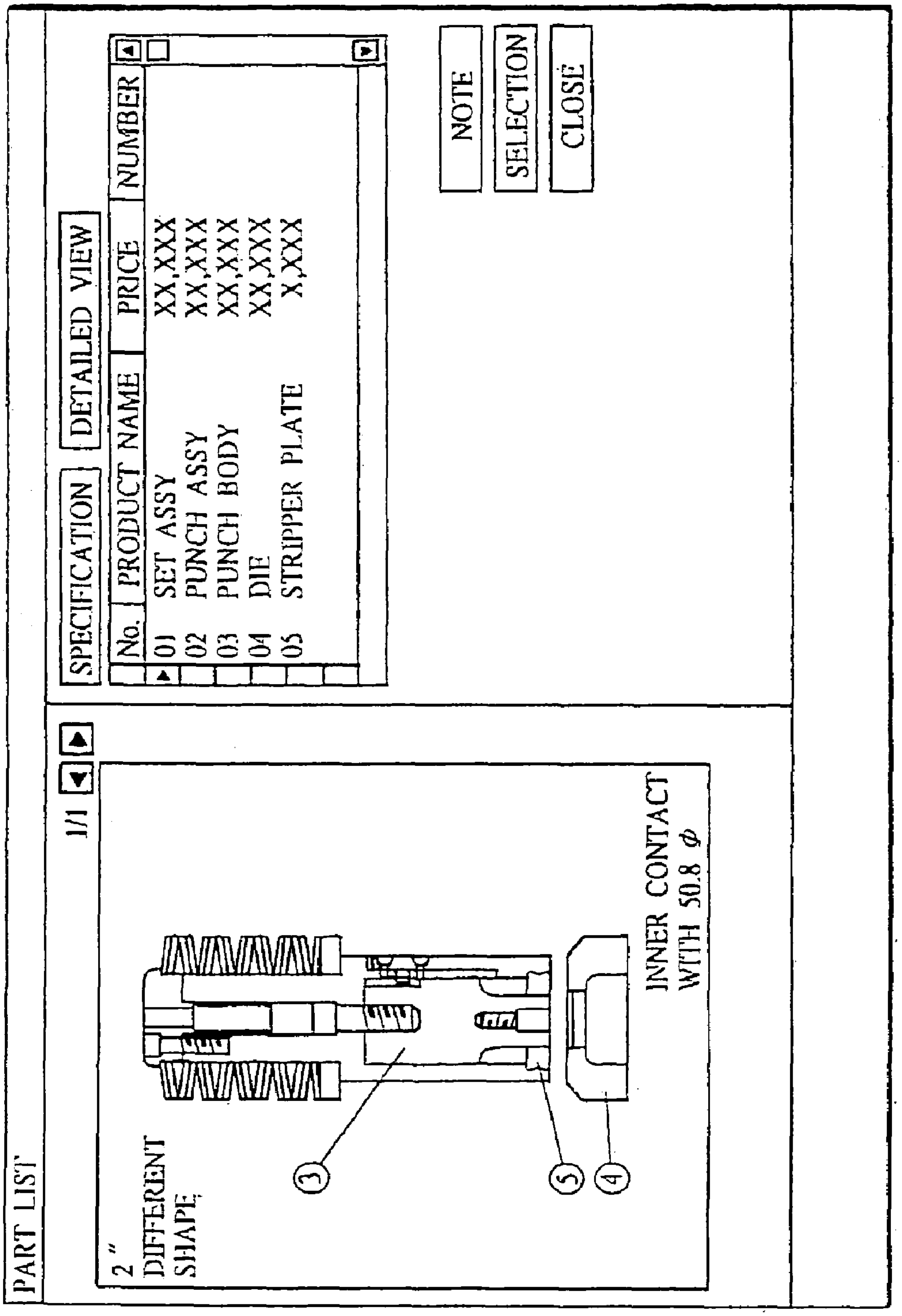
FIG. 29 is an illustration explaining the quotation-processing screen.

The afternoon work management section is provided with a quotation processing section 419*a*, consultation process etc. The quotation processing section 419*a* displays list of parts not shown in the figure on the screen and when one of the parts of the parts list is selected, information on quotations in the data base 423 is drawn and the quotation processing screen is displayed as shown in FIG. 29. As shown in FIG. 29, this quotation-processing screen displays a figure of the part on the left hand side and the result of the quotation on the right hand side.

Figure 30:
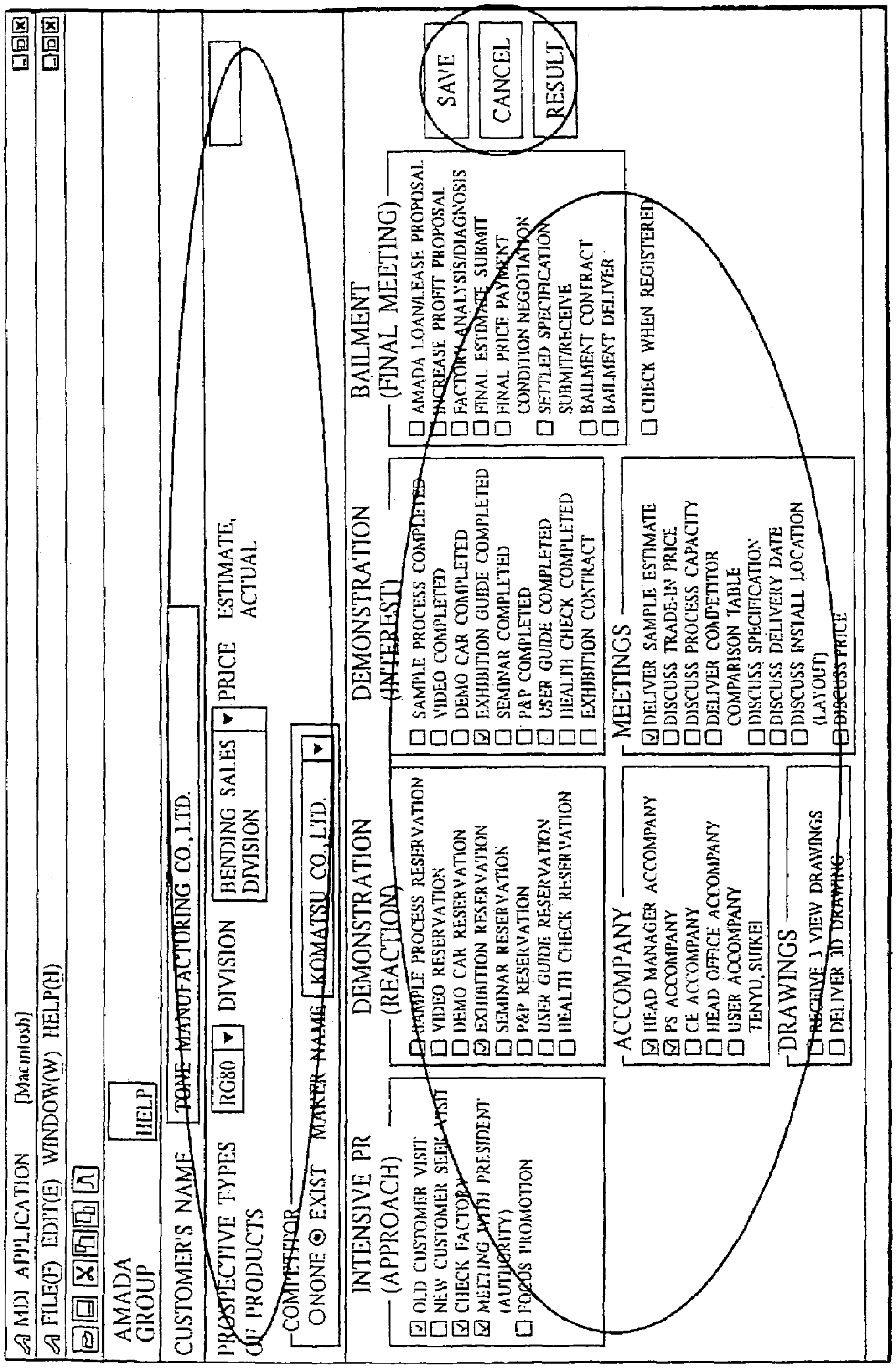

The evening work management section 420 is provided with a visit result management 420*a* and by this visit result management 420*a* a daily report input screen is displayed to input information of the customer that the businessperson visited that day. This daily report input screen has a calendar screen onto which the customer's name (customer's code), name of the businessperson (businessperson code), contents of the visit etc. may be inputted (FIG. 30). As shown in FIG. 30, this screen has columns into which prospective types of products, contents of the visit, amount of money etc. may be inputted. Information inputted from this screen is stored in database 423 as a daily report.

The evening management section 420 is also provided with a visit schedule management section 420*c*. This visit schedule management section 420*c* displays a visit schedule screen (not shown if the figure) that notes the date of visit and the customer's name. This visit schedule screen is provided with a list by area button that shows the delivery conditions of machine types to the customer of each region of the area and a target extraction button etc. to display information to select the customer to be visited.

When the target extraction button is selected, the visit schedule management section 420*c* reads out the customer's name, the number of visits made to this customer etc. from the database 423 and displays the target extraction screen shown in FIG. 31. As shown in FIG. 31, this target extraction screen displays in color what types of machine tools (punch press, press brake) have been delivered and displays in numbers how many visits have been made within a number of months. Also the payment situation is displayed. Namely the extraction screen displays from data on past purchase of products results etc., customers that may presently be in need of products.

Therefore the businesspersons may judge which customer to target during the present month.

Moreover when the list of prospects button in the initial screen is selected, the prospects management section 422*b* in other management section 422 reads out the business achievement information (points, contents of reception to the customer etc.) corresponding to the businessperson code inputted and displays list of prospects screen shown in FIG. 32. The point 451 of this list of prospects are points calculated from the number of visits to the customer and contents of reception to the customer etc. and enables one to seize from the points whether purchase of machines may be soon or whether there are any problems. In more detail, the points will be given by the sum of, for instance, 1 point for an interview with the authority, 2 points for invitation to an exhibition, 3 points for consultation on the date of delivery and 4 points for the presentation of a quotation.

Also when the data-forwarding button is selected, the evening work management section 420 transmits the daily report made by the visit results management section 420*a* to the main office server 403 with addition of the terminal code.

Figure 33:
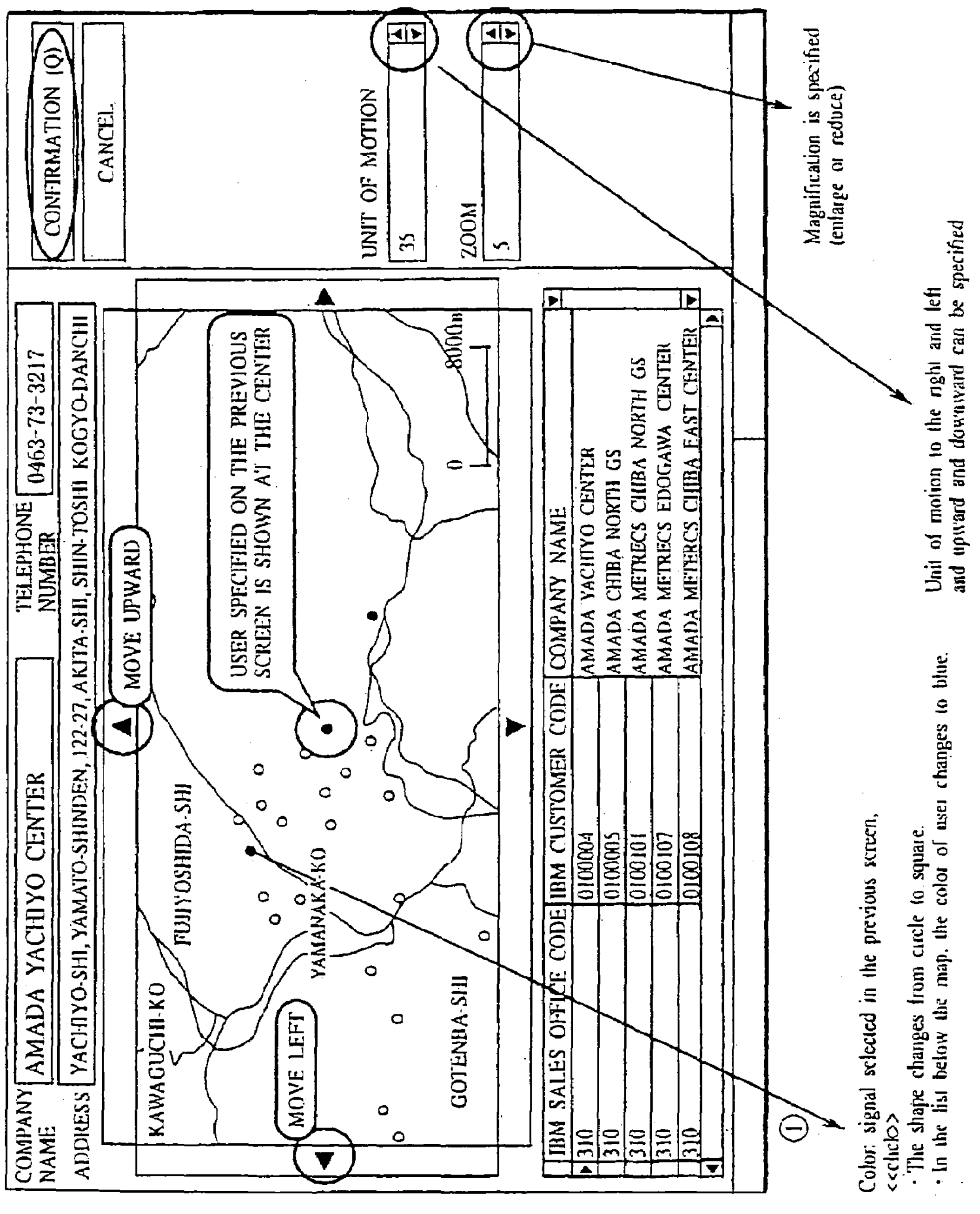
FIG. 33 is an illustration explaining a map screen.

Also the visit schedule management section may display a map showing the location of the customer as shown in FIG. 33.

Figure 27:
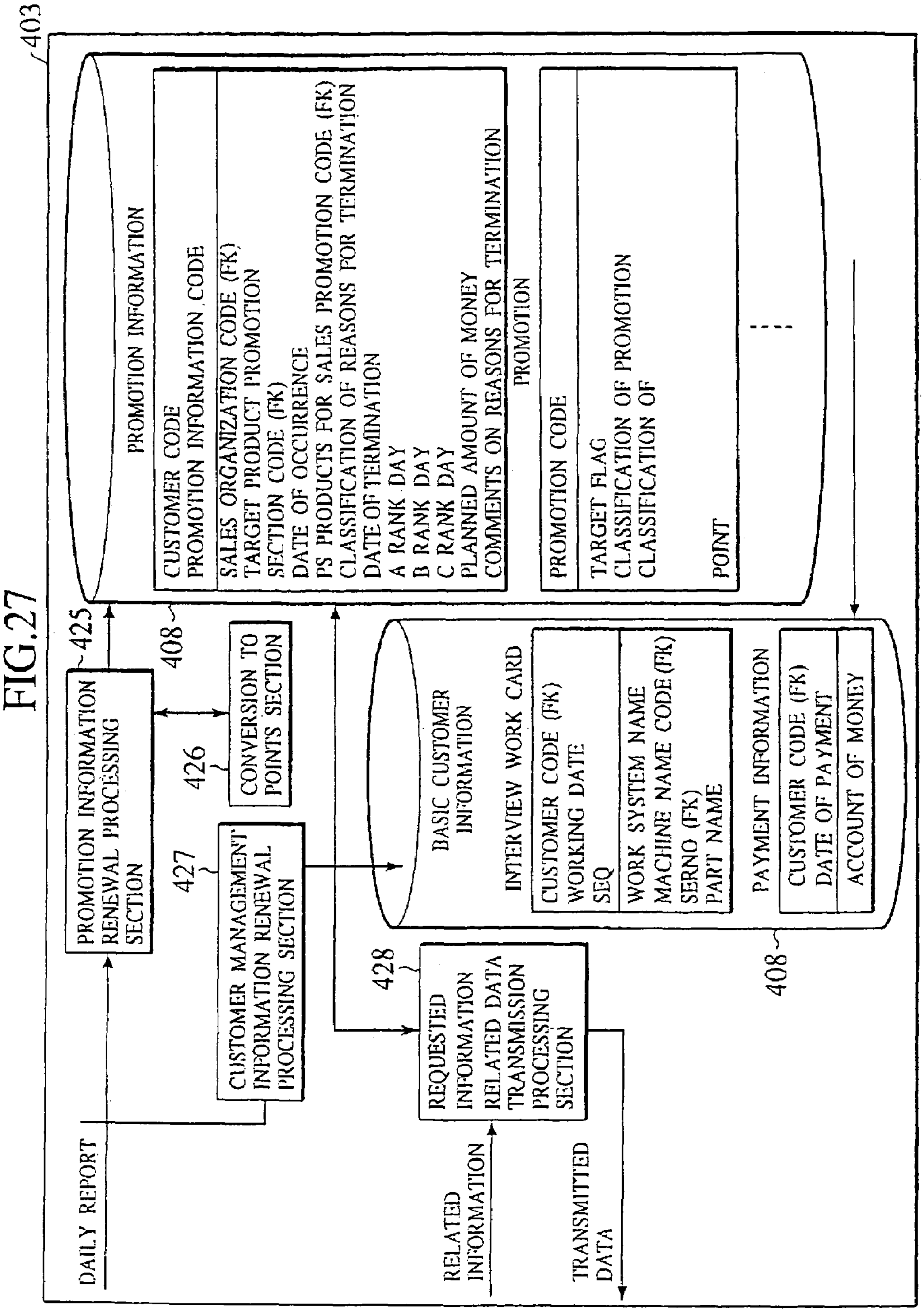
FIG. 27 is a schematic illustration of the visit support processing system.

FIG. 27 shows an outline of the support of visits management section 404.

As shown in FIG. 27, the support of visits management 404 is provided with a promotion information renewal management section 424 which renews the promotion information stored in the database 408 by deciphering daily reports from the notebook-sized personal computer 401, a conversion to points section 426 where business contents (new developments, visits to promote delivery, reservation for video of machines, reservation for seminars, accompaniment of a specialist, reservation for processing a sample etc.) of the daily report are converted into points (numbers), a customer management information renewal processing section 427 which renews the date of visits etc. to the customer in the daily reports and a requested information related data transmission processing section 428 which deciphers requested information and transmits all promotion information, customer information, staff information etc. related to the requested information to the notebook-sized computer.

In the database 408, businessperson information (businessperson code, portable phone number, customer in charge etc.) and promotion information which consists of products under promotion etc., customer code, day of occurrence (day of visit) and promotion information which consists of promoted products etc., work table of the businessmen, payment information etc. are stored mutually related to each other.

That is, based on daily reports, the promotion information renewal management section 423 renews the day of visits, points, business contents etc. and the renewed information is transmitted to the notebook-sized personnel computer 401 every morning.

Further the registration of data to the database 408 is made by communication between the server (not shown in the figure) at the business office, order reception center and the main office.

The database 408 also stores all the data stored in the database 23 of the notebook-sized personnel computer 401. This data include the product possession information of products possessed by each customer and past records of visits made to each customer. Therefore the database 408 functions as the memory means 48.

Also the visit support management section 404 has a calculation means to calculate all the data displayed in the target extraction display shown in FIG. 31 and the prospects list shown in FIG. 32. This calculation means includes a weight coefficient calculation means 77 which calculates, based on the product possession information and past records of visits, weight coefficients of each customer (for instance point 451 shown in FIG. 32) and visiting customer selection 79 based on the weight coefficients.

Next, the function of the visit support system will be described.

By joint possession of the sales system server customer information, this system realizes complete visits made to customers and may practice proposal business by introducing products in real time and how to cope with various phenomena in processing to the customer. This leads to not only the level up of the businesspersons but also collective management of the customers, development of the next product etc. by possessing in common forefront business information.

Also the businessperson in charge is closely connected by the map information system (GIS) screen used for visits to customers navigation, to all customer information such as the location of the customer, credit rank, contents of the transaction etc. which are managed by integrated customer database.

Catalog information for all products dealt with is provided on internet Web screen. The customer may request quotations and make orders from the catalog on the Web. Electronic business transaction is supported. That is the customer may request quotations and place orders directly on the internet.

Also as the business forefront and support sections may all deal with mobile computing by notebook-sized personal computer (PC) and portable phone, it is possible to request and answer quotations and place orders immediately on the spot (customer's factory or business office) and as the state of all quotations and orders is managed collectively in the sales support system, information required by the customer may be held jointly.

In preparing quotations, there is a display that supports judgment on the spot whether production of specifications requested by the customer is possible or not by coordinated application of the parametric CAD software for PC use.

In accord with the function of the visits support system, the design management system 57 parameterizes the product information immediately on receipt of the order that will need drawings in processing. Design and check of drawings will be made without help from other people and the design information will be sent to the manufacture management system 59 when the design is completed. The design management system 57 will also output the drawing into a plotter furnished at the factory and will also send the design information in DXF form to the outside supplier.

As described, the client as the businessperson terminal may readily acquire various data necessary according to the work time. The main office server will send to the businessperson terminal as the client, information and data on conditions of the related place of visit and activity of the businessperson according to the request.

Also the main office server will send similar information to the business office terminal as the client. Therefore the business office terminal as the client may confirm conditions at the place of visit and activity of the businessperson readily at one glance.

Also as conditions of all places visited and the activities of the businesspersons may be displayed on the screen in this embodiment, the businessperson may judge which place of visit is most suitable. In other words the place to visit may be narrowed down.

Also the main office server stores as conditions of activity of the businessperson, at what time who and what kinds of negotiations were made at the place of visit. This information may be displayed on the screen obtained by the client. Therefore this dissolves overlap to the same place of visit at the same time by a plural number of businessmen.

Figure 34:
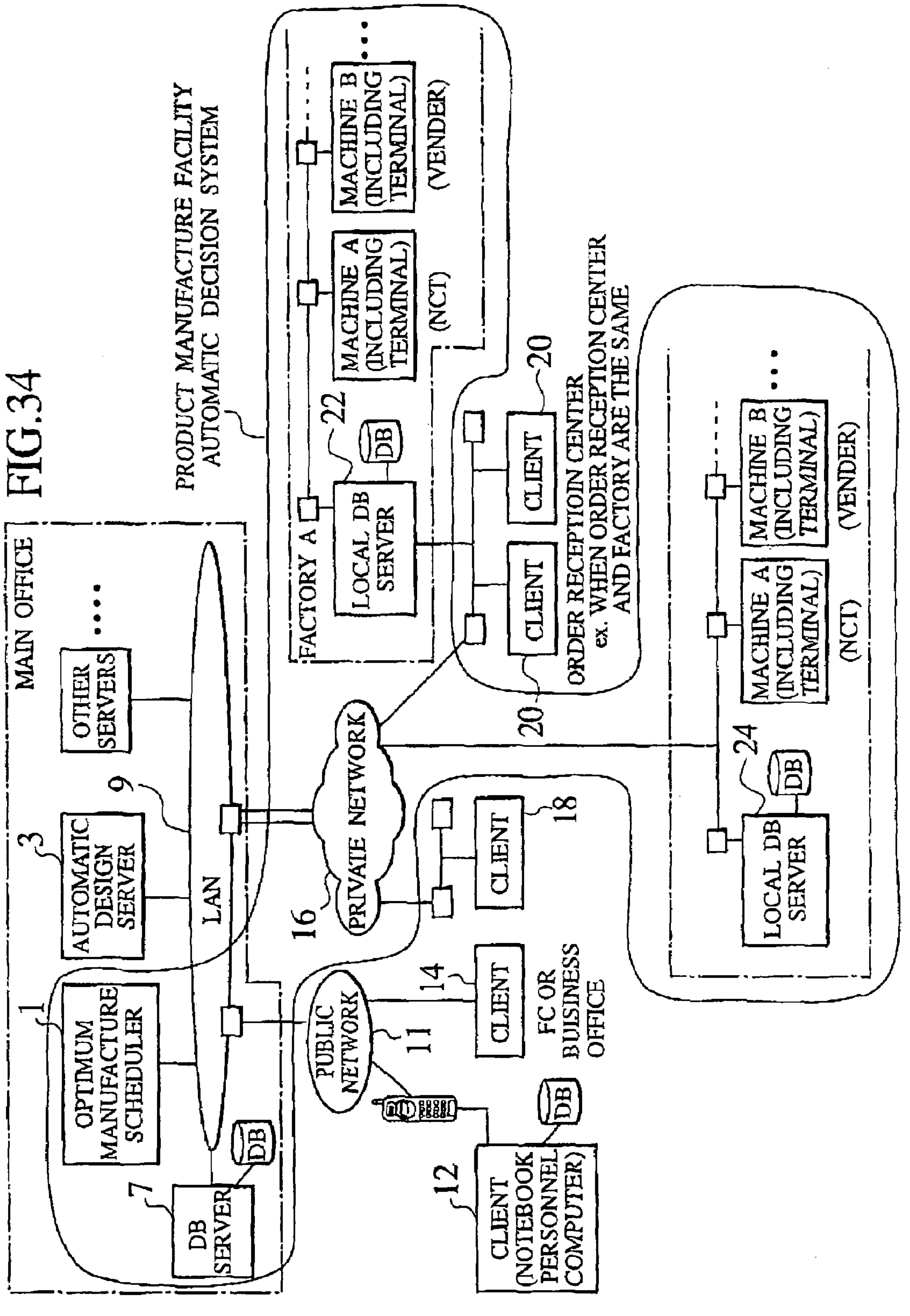
FIG. 34 is a schematic figure of the 2$^{nd}$ embodiment of the sales support system.

FIG. 34 is a conceptual drawing of the product manufacture facility automatic decision system as the second embodiment of sales support system of the present invention.

The product manufacture facility automatic decision system will be explained taking metal mold parts such as dice, punch bodies, guides etc. as the product.

In the product manufacture facility automatic decision system shown in FIG. 34, the optimum manufacture scheduler 1 which searches the optimum manufacture facility (called also factory), the automatic design server 3 and the database server 7 are connected by LAN 9 at the main office (in the following, this network will just be called main office side).

This main office side may communicate by public network 11 (ISDN, portable telephone network etc.) to the notebook-sized personnel computer 12 (also called client 12) which the businesspersons carry and the personnel computer 14 of the dealer (also called client 14) and receives the order for metal mold directly and designs and determines the manufacture facility and prepares quotations (date of deliver, price etc.) automatically and notifies it to the clients 12, 14. Data for quotation of standard products (customer's name, customer's date of delivery, catalog number etc.) will be transmitted to the optimum scheduler server 1 (in the following will be called optimum scheduler) from client 12 and design result data of standard or non-standard products will be transmitted to the optimum scheduler 1 from the automatic design server 3.

These quotation data, design results data (date of delivery, customer's name, dimensions, figures) will be inputted as the manufacture order data by the optimum manufacture scheduler.

Also it is made so that the personal computer 18 (also called client 18) at the franchise or the business office may communicate with the main office by a private network 16 so that the order for the metal mold may be received directly from this client 18, perform designing, determine the manufacture facility automatically, make quotations (date of delivery, amount of money etc.) and inform it back to the client 18.

Also the main office is connected by a private network 16 to factory A which possess plural types of machines (also called machine tool) A,B, . . . , each connected by LAN. There is an order reception center at the location of this factory A and personnel computer at this order reception center (also called client 20) which is connected the LAN of factory A and may communicate with the main office by the private network.

Also factory A is provided with a local database server 22 which stores data of each machine or data sent from the main office, edits it and sends it back to the main office.

The main office is also connected by the private network 16 to factory B which possess plural types of machines (also called machine tool) A,B . . . , each connected by LAN. This factory B is provided with a local database server 24 that stores data of each machine or data sent from the main office, edits it and sends it back to the main office.

The system in which the optimum scheduler 1, database server 7, private network 16, factory A,B, . . . is linked is called the product manufacturing factory automatic decision system in form of the present embodiment.

Further, in the embodiment stated above, metal mold parts for sheet metal processing machine tools were considered as the subject product but it is not limited to this product and may be applied to, for instance, blades used in cutting machines and various products used in other machine tools such as metal processing machines.

The invention claimed is:

1. A support system for sales of products, comprising:

a terminal system including an input system that receives input information on a product provided from a customer and a display for displaying product information on the product to the customer, the input information on the product from the customer including a purchase order of the product; and an information management system connected to said terminal system and product facilities that can provide various products including the ordered product, to communicate therewith, the information management system receiving the purchase order of the product from the terminal system, selecting a product facility that can provide the ordered product, and transmitting to the selected product facility instructions for providing the selected product, the information management system comprising a design management system that manages design data on products, the design management system comprising:

a standard product memory;

a patterned special product memory that stores shapes of a plurality of patterned special products and parameters defining dimensions of the shapes;

a system that determines whether the ordered product is a standard product or a patterned special product on the basis of data for the ordered product entered from the input system of the terminal system and searches a database for price estimates for the patterned special product and retrieves an estimate, based on whether the product is determined to be a patterned special product, by searching for quotations related to similar products;

a display system that displays on the display of the terminal system a shape and parameters of a patterned special product on a patterned special product menu that corresponds to the ordered product when it is determined the ordered product is a patterned special product; and a receiver that receives dimension data for each of the parameters entered from the input system of the terminal system and for outputting the design data for the patterned special product, wherein the standard product has fixed shape and size parameters; and wherein the product facility is connected to at least one product facility, comprising at least one of a standard product facility and a patterned special product facility, wherein the ordered product is a tool or a part of a metal processing machine, wherein the introduction of products includes image representation of electric catalogue and the information terminal presents the customer with potential product malfunctions and instructions on how to avoid the potential product malfunctions, when the customer selects products associated with product malfunctions, and wherein a form of the patterned special product is fixed and a size of the patterned special type product may be varied by the customer.

2. The support system of claim 1, wherein the terminal system includes a memory storing product data on standard and patterned special products, and a first quotation system for calculating quotations for the standard products and patterned special products.

3. The support system of claim 2, wherein the quotation includes the price and date of delivery.

4. The support system of claim 3, wherein the quotation includes a processing tolerance of the product.

5. The support system of claim 1, wherein the input system receives input of a quotation request on the product, and the display displays the quotation on the product to the customer.

6. The support system of claim 1, wherein the information management system includes a design management system that manages design data on at least the patterned special product.

7. The support system of claim 6, wherein the information management system includes a second quotation calculation system for calculating quotations for non-patterned special products which do not belong to the standard products and patterned special products.

8. The support system of claim 7, wherein the second quotation calculation system calculates a price based on a structure figure of the non-patterned special products.

9. The support system of claim 6, wherein the design management system includes a similar product data storage for storing data of similar product of the non-patterned special products.

10. The support system of claim 6, wherein the design management system includes a design support system for supporting designing of the non-patterned special products.

11. The support system of claim 10, wherein the design support system supports the designing of a product belonging to the non-patterned special products based on data of similar products.

12. The support system of claim 10, wherein the design management system includes a processing tolerance calculator for calculating processing tolerance of the non-patterned special products.

13. The support system of claim 1, wherein the information management system includes a product facility management system for selecting a most suitable product storage facility or most suitable product manufacturing facility.

14. The support system of claim 13, wherein the information management system includes a product facility memory storing types and amount of products stored in each product storage facility as stock.

15. The support system of claim 14, wherein the information management system includes a memory storing types of product manufacturable in each facility and a period of time necessary for manufacturing the products.

16. The support system of claim 13, wherein the information management system includes a product facility determining system that selects the product manufacturing facility that can manufacture the ordered product within a date of delivery appointed by a customer.

17. The support system of claim 16, wherein the product facility determining system determines the product manufacturing facility that is provided with material for manufacturing the product, as the product facility.

18. The support system of claim 17, wherein the product facility determining system selects the product manufacturing facility that can manufacture the product with least cost.

19. The support system of claim 13, wherein the information management system includes an alarm signal generator that supervises a product manufacturing process in the product manufacturing facility and generates an alarm signal when it is expected that a delay will postpone the appointed date of delivery.

20. The support system of claim 13, wherein the information management system includes a stock supervisor that supervises the amount of stock of the product, and sends to the product storage facility instructions for replenishing the amount of the stock when it is judged that the amount of the stock is insufficient in view of the shipping result in the past.

21. The support system of claim 13, wherein the information management system includes a date-of-delivery calculator that calculates a date of delivery of the product by taking account of a manufacturing period in the product manufacturing facility.

22. The support system of claim 1, wherein the information management system further includes a transportation agency supervising system that selects a transportation agency that transports the product from the product facility to a customer.

23. The support system of claim 22, wherein the transportation agency supervision system includes a transportation agency determining system for selecting from a plurality of transportation agencies a transportation agency that meets a transportation condition.

24. The support system of claim 23, wherein the transportation condition is determined on the basis of at least one of a weight of the product, a distance between the transportation agency and the customer and shipping time.

25. The support system of claim 22, wherein the transportation agency supervision system includes a delivery time calculator that calculates a delivery time of the product by taking account of a transportation period taken by the transportation agency.

26. The support system of claim 1, wherein the transportation agency supervision system includes a transportation agency data memory that stores various data on a plurality of transportation agencies.

27. The support system of claim 1, wherein the design management system further comprises a non-patterned special product memory, and wherein the determining system determines whether the ordered product is a non-patterned special product on the basis of data for the ordered product entered from the input system of the terminal system.

28. The support system of claim 1, wherein the product comprises a metal mold for a sheet metal processing machine.

29. A sales support system for supporting a design entity, a manufacturing entity or a sales entity of a commodity to provide or procure the commodity or service, the system comprising:

a server for the entities, to which an information terminal which has a client function carried by a user visiting customers may communicate, and by use of this information terminal, the user may facilitate his business of introducing products, quotations, receipt of orders and consultation at a location of a visit, the server including a design management system that manages design data on commodities, the design management system comprising:

a standard commodity memory;

a patterned special commodity memory that stores shapes of a plurality of patterned special commodities and parameters defining dimensions of the shapes;

a system that determines whether an ordered commodity is a standard commodity or a patterned special commodity on the basis of data for the ordered commodity entered from the information terminal and searches a database for price estimates for the patterned special commodity and retrieves an estimate, based on whether the commodity is determined to be a patterned special commodity, by searching for quotations related to similar commodities;

a display system that displays on the information terminal a shape and parameters of a patterned special commodity on a patterned special commodity menu that corresponds to the ordered commodity when it is determined the ordered commodity is a patterned special commodity; and a receiver that receives dimension data for each of the parameters entered from the information terminal and that outputs the design data for the patterned special commodity, wherein the standard commodity has fixed size and shape parameters, wherein the ordered commodity is a tool or a part of a metal processing machine, wherein the introduction of commodities includes image representation of electric catalogue and the information terminal presents the customer with potential commodity malfunctions and instructions on how to avoid the potential commodity malfunctions, when the customer selects commodities associated with commodity malfunctions, and wherein a form of the patterned special commodity is fixed and a size of the patterned special type commodity may be varied by the customer.

30. The sales support system for the commodity or service of claim 29, wherein the server further comprises a manager that manages a customer database and carries out focusing of target customers and management of a visit schedule for in-person appointments between customers and the user.

31. The sales support system for commodity or service of claim 29, wherein when a request for quotation is transmitted from the information terminal to the server, a result of quotation is transmitted from the server back to the information terminal.

32. The sales support system for commodity or service of claim 29, wherein the receipt of order is transmitted from the information terminal to the server.

33. The sales support system for commodity or service of claim 29, wherein the commodity is a machine tool and expendable supplies thereof.

34. The sales support system for commodity or service of claim 29, wherein the commodity is a blade of a cutting machine.

35. A sales support system for supporting a design entity, a manufacturing entity or a sales entity of a commodity to provide or procure the commodity or service, the system comprising:

a client located at a remote division, and a server provided at the management division of the entities, the server communicating with the client so that various work requests and answers between the management division and remote division may be realized immediately, the server including a design management system that manages design data on commodities, the design management system comprising:

a standard commodity memory;

a patterned special commodity memory that stores shapes of a plurality of patterned special commodities and parameters defining dimensions of the shapes;

a system that determines whether an ordered commodity is a standard commodity or a patterned special commodity on the basis of data for the ordered commodity entered from the client and searches a database for price estimates for the patterned special commodity and retrieves an estimate, based on whether the commodity is determined to be a patterned special commodity, by searching for quotations related to similar commodities;

a display system that displays on the client a shape and parameters of a patterned special commodity on a patterned special commodity menu that corresponds to the ordered commodity when it is determined the ordered commodity is a patterned special commodity; and a receiver that receives dimension data for each of the parameters entered from the client and that outputs the design data for the patterned special commodity, wherein the standard commodity has fixed size and shape parameters, wherein the ordered commodity is a tool or a part of a metal processing machine, wherein the introduction of commodities includes image representation of electric catalogue and the information terminal presents the customer with potential commodity malfunctions and instructions on how to avoid the potential commodity malfunctions, when the customer selects commodities associated with commodity malfunctions, and wherein a form of the patterned special commodity is fixed and a size of the patterned special type commodity may be varied by the customer.

36. A sales support system for supporting a design entity, a manufacturing entity or a sales entity of a commodity to provide or procure the commodity or service of the entity, the system comprising:

a client provided at a customer location; and a server provided at the entity, the server communicating with the client so that various work requests and answers between the entity and the customer may be transmitted immediately, the server including a design management system that manages design data on commodities, the design management system comprising:

a standard commodity memory;

a patterned special commodity memory that stores shapes of a plurality of patterned special commodities and parameters defining dimensions of the shapes;

a system that determines whether an ordered commodity is a standard commodity or a patterned special commodity on the basis of data for the ordered commodity entered from the client and searches a database for price estimates for the patterned special commodity and retrieves an estimate, based on whether the commodity is determined to be a patterned special commodity, by searching for quotations related to similar commodities;

a display system that displays on the client a shape and parameters of a patterned special commodity on a patterned special commodity menu that corresponds to the ordered commodity when it is determined the ordered commodity is a patterned special commodity; and a receiver that receives dimension data for each of the parameters entered from the client and that outputs the design data for the patterned special commodity, wherein the standard commodity has fixed size and shape parameters, wherein the ordered commodity is a tool or a part of a metal processing machine, wherein the introduction of commodities includes image representation of electric catalogue and the information terminal presents the customer with potential commodity malfunctions and instructions on how to avoid the potential commodity malfunctions, when the customer selects commodities associated with commodity malfunctions, and wherein a form of the patterned special commodity is fixed and a size of the patterned special type commodity may be varied by the customer.

* * * * *